(12) United States Patent
Lomasney et al.

(10) Patent No.: US 12,227,869 B2
(45) Date of Patent: Feb. 18, 2025

(54) APPLICATION OF LAMINATE AND NANOLAMINATE MATERIALS TO TOOLING AND MOLDING PROCESSES

(71) Applicant: Modumetal, Inc., Seattle, WA (US)

(72) Inventors: Christina Ann Lomasney, Seattle, WA (US); Guohua Li, Bothell, WA (US)

(73) Assignee: MODUMETAL, INC., Snohomish, WA (US)

( * ) Notice: Subject to any disclaimer, the term of this patent is extended or adjusted under 35 U.S.C. 154(b) by 520 days.

(21) Appl. No.: 15/698,522

(22) Filed: Sep. 7, 2017

(65) Prior Publication Data

US 2018/0071980 A1    Mar. 15, 2018

Related U.S. Application Data

(60) Provisional application No. 62/385,795, filed on Sep. 9, 2016.

(51) Int. Cl.
*B29C 64/147* (2017.01)
*B29C 33/04* (2006.01)
(Continued)

(52) U.S. Cl.
CPC ............ *C25D 5/623* (2020.08); *B29C 33/565* (2013.01); *B29C 64/147* (2017.08);
(Continued)

(58) Field of Classification Search
CPC ..... B29C 64/147; B29C 33/565; B29C 33/56; B29C 33/38; B29C 33/04; B29C 49/00;
(Continued)

(56) References Cited

U.S. PATENT DOCUMENTS 1,733,404 A    10/1929    Fahrenwald
1,982,009 A    11/1934    McKinney et al.
(Continued)

FOREIGN PATENT DOCUMENTS

CA    2 559 152 A1    10/2005
CN    1236024 A    11/1999
(Continued)

OTHER PUBLICATIONS

English translation of WO2014/145771A1 (Year: 2014).*
(Continued)

*Primary Examiner* — Galen H Hauth
*Assistant Examiner* — Baileigh Kate Darnell
(74) *Attorney, Agent, or Firm* — Seed IP Law Group LLp

(57) ABSTRACT

Embodiments of the present disclosure provide molds made by additive manufacturing coupled with electrodeposition. Such methods comprise subjected a workpiece to one or more deposition process(es), such as electrodeposition, that provide a coating that possesses desirable chemical, physical, and/or mechanical properties. In some embodiments, the methods further comprise forming at least one workpiece for the mold by, for example, an additive manufacturing process such as three-dimensional printing (3D printing). Additionally, the present disclosure provides methods for the use of a mold for molding polymerizable, settable, thermoplastic, or thermoset materials.

23 Claims, 3 Drawing Sheets

(51) Int. Cl.
- B29C 33/56 (2006.01)
- C23C 18/16 (2006.01)
- C25D 1/10 (2006.01)
- C25D 3/02 (2006.01)
- C25D 5/00 (2006.01)
- C25D 5/10 (2006.01)
- C25D 5/12 (2006.01)
- C25D 5/56 (2006.01)
- B29C 33/38 (2006.01)
- B29C 49/00 (2006.01)
- B29L 31/50 (2006.01)
- C23C 18/20 (2006.01)
- C23C 18/24 (2006.01)
- C23C 18/30 (2006.01)

(52) U.S. Cl.
CPC ............ *C23C 18/1653* (2013.01); *C25D 1/10* (2013.01); *C25D 3/02* (2013.01); *C25D 5/10* (2013.01); *C25D 5/12* (2013.01); *C25D 5/56* (2013.01); *C25D 5/617* (2020.08); *B29C 33/04* (2013.01); *B29C 33/38* (2013.01); *B29C 2033/385* (2013.01); *B29C 33/56* (2013.01); *B29C 49/00* (2013.01); *B29L 2031/50* (2013.01); *C23C 18/2086* (2013.01); *C23C 18/24* (2013.01); *C23C 18/30* (2013.01)

(58) Field of Classification Search
CPC ......... B29L 2031/50; C25D 5/10; C25D 5/12; C25D 3/02; C23C 18/1653
See application file for complete search history.

(56) References Cited

U.S. PATENT DOCUMENTS

| | | |
|---|---|---|
| 2,428,033 A | 9/1947 | Nachtman |
| 2,436,316 A | 2/1948 | Lum et al. |
| 2,470,775 A | 5/1949 | Jernstedt et al. |
| 2,558,090 A | 6/1951 | Jernstedt |
| 2,642,654 A | 6/1953 | Ahrens |
| 2,678,909 A | 5/1954 | Jernstedt et al. |
| 2,694,743 A | 11/1954 | Ruskin et al. |
| 2,706,170 A | 4/1955 | Marchese |
| 2,891,309 A | 6/1959 | Fenster |
| 3,090,733 A | 5/1963 | Brown |
| 3,255,781 A | 6/1966 | Gillespie, Jr. |
| 3,282,810 A | 11/1966 | Odekerken |
| 3,355,374 A | 11/1967 | Brewer et al. |
| 3,359,469 A | 12/1967 | Levy et al. |
| 3,362,851 A | 1/1968 | Dunster |
| 3,429,787 A | 2/1969 | Weinreich |
| 3,483,113 A | 12/1969 | Carter |
| 3,549,505 A | 12/1970 | Hanusa |
| 3,616,286 A | 10/1971 | Aylward et al. |
| 3,633,520 A | 1/1972 | Stiglich, Jr. |
| 3,669,865 A | 6/1972 | Semienko et al. |
| 3,673,073 A | 6/1972 | Tobey et al. |
| 3,716,464 A | 2/1973 | Kovac et al. |
| 3,753,664 A | 8/1973 | Klingenmaier et al. |
| 3,759,799 A | 9/1973 | Reinke |
| 3,787,244 A | 1/1974 | Schulmeister et al. |
| 3,866,289 A | 2/1975 | Brown et al. |
| 3,941,674 A | 3/1976 | Vanmunster |
| 3,994,694 A | 11/1976 | Clauss et al. |
| 3,996,114 A | 12/1976 | Ehrsam |
| 4,053,371 A | 10/1977 | Towsley |
| 4,105,526 A | 8/1978 | Lewellen, Jr. et al. |
| 4,107,003 A | 8/1978 | Anselrode |
| 4,125,447 A | 11/1978 | Bachert |
| 4,191,617 A | 3/1980 | Hurley et al. |
| 4,204,918 A | 5/1980 | McIntyre et al. |
| 4,216,272 A | 8/1980 | Clauss |
| 4,246,057 A | 1/1981 | Janowski et al. |
| 4,269,672 A | 5/1981 | Inoue |
| 4,284,688 A | 8/1981 | Stücheli et al. |
| 4,314,893 A | 2/1982 | Clauss |
| 4,405,427 A | 9/1983 | Byrd |
| 4,422,907 A | 12/1983 | Birkmaier et al. |
| 4,461,680 A | 7/1984 | Lashmore |
| 4,464,232 A | 8/1984 | Wakano et al. |
| 4,510,209 A | 4/1985 | Hada et al. |
| 4,519,878 A | 5/1985 | Hara et al. |
| 4,529,492 A | 7/1985 | Buchholz et al. |
| 4,540,472 A | 9/1985 | Johnson et al. |
| 4,543,300 A | 9/1985 | Hara et al. |
| 4,543,803 A | 10/1985 | Keyasko |
| 4,591,418 A | 5/1986 | Snyder |
| 4,592,808 A | 6/1986 | Doubt |
| 4,597,836 A | 7/1986 | Schaer et al. |
| 4,613,388 A | 9/1986 | Walter et al. |
| 4,620,661 A | 11/1986 | Slatterly |
| 4,652,348 A | 3/1987 | Yahalom et al. |
| 4,666,567 A | 5/1987 | Loch |
| 4,670,356 A | 6/1987 | Sato et al. |
| 4,678,552 A | 7/1987 | Chen |
| 4,678,721 A | 7/1987 | den Broeder et al. |
| 4,702,802 A | 10/1987 | Umino et al. |
| H543 H | 11/1988 | Chen et al. |
| 4,795,735 A | 1/1989 | Liu et al. |
| 4,834,845 A | 5/1989 | Muko et al. |
| 4,839,214 A | 6/1989 | Oda et al. |
| 4,869,971 A | 9/1989 | Nee et al. |
| 4,885,215 A | 12/1989 | Yoshioka et al. |
| 4,904,542 A | 2/1990 | Mroczkowski |
| 4,904,543 A | 2/1990 | Sakakima et al. |
| 4,909,917 A | 3/1990 | Harrison et al. |
| 4,923,574 A | 5/1990 | Cohen |
| 4,975,337 A | 12/1990 | Hyner et al. |
| 4,978,431 A | 12/1990 | Brannan et al. |
| 5,043,230 A | 8/1991 | Jagannathan et al. |
| 5,045,356 A | 9/1991 | Uemura et al. |
| 5,056,936 A | 10/1991 | Mahrus et al. |
| 5,059,493 A | 10/1991 | Takahata |
| 5,073,237 A | 12/1991 | Bacher et al. |
| 5,079,039 A | 1/1992 | Heraud et al. |
| 5,096,564 A | 3/1992 | Jowitt et al. |
| 5,156,729 A | 10/1992 | Mahrus et al. |
| 5,156,899 A | 10/1992 | Kistrup et al. |
| 5,158,653 A | 10/1992 | Lashmore et al. |
| 5,190,637 A | 3/1993 | Guckel |
| 5,228,967 A | 7/1993 | Crites et al. |
| 5,234,562 A | 8/1993 | Uenishi et al. |
| 5,268,235 A | 12/1993 | Lashmore et al. |
| 5,300,165 A | 4/1994 | Sugikawa |
| 5,320,719 A | 6/1994 | Lasbmore et al. |
| 5,326,454 A | 7/1994 | Engelhaupt |
| 5,352,266 A | 10/1994 | Erb et al. |
| 5,364,523 A | 11/1994 | Tanaka et al. |
| 5,378,583 A | 1/1995 | Guckel et al. |
| 5,413,874 A | 5/1995 | Moysan, III et al. |
| 5,431,800 A | 7/1995 | Kirchhoff et al. |
| 5,461,769 A | 10/1995 | McGregor |
| 5,472,795 A | 12/1995 | Atita |
| 5,489,488 A | 2/1996 | Asai et al. |
| 5,500,600 A | 3/1996 | Moyes |
| 5,547,096 A | 4/1996 | Kleyn |
| 5,527,445 A | 6/1996 | Palumbo |
| 5,545,435 A | 8/1996 | Steffier |
| 5,620,800 A | 4/1997 | De Leeuw et al. |
| 5,660,704 A | 8/1997 | Murase |
| 5,679,232 A | 10/1997 | Fedor et al. |
| 5,738,951 A | 4/1998 | Goujard et al. |
| 5,742,471 A | 4/1998 | Barbee, Jr. et al. |
| 5,775,402 A * | 7/1998 | Sachs ..................... B22C 9/065 164/4.1 |
| 5,783,259 A | 7/1998 | McDonald |
| 5,798,033 A | 8/1998 | Uemiya et al. |
| 5,800,930 A | 9/1998 | Chen et al. |
| 5,828,526 A | 10/1998 | Kagawa et al. |
| 5,912,069 A | 6/1999 | Yializis et al. |
| 5,930,085 A | 7/1999 | Kitade et al. |
| 5,942,096 A | 8/1999 | Ruzicka et al. |

(56) References Cited

U.S. PATENT DOCUMENTS

| | | |
|---|---|---|
| 5,952,111 A | 9/1999 | Sugg et al. |
| 5,958,604 A | 9/1999 | Riabkov et al. |
| 6,036,832 A | 3/2000 | Knol et al. |
| 6,036,833 A | 3/2000 | Tang et al. |
| 6,071,398 A | 6/2000 | Martin et al. |
| 6,143,424 A | 11/2000 | Jonte et al. |
| 6,143,430 A | 11/2000 | Miyasaka et al. |
| 6,193,858 B1 | 2/2001 | Hradil et al. |
| 6,200,452 B1 | 3/2001 | Angelini |
| 6,203,936 B1 | 3/2001 | Cisar et al. |
| 6,212,078 B1 | 4/2001 | Hunt et al. |
| 6,214,473 B1 | 4/2001 | Hunt et al. |
| 6,284,357 B1 | 9/2001 | Lackey et al. |
| 6,312,579 B1 | 11/2001 | Bank et al. |
| 6,344,123 B1 | 2/2002 | Bhatnagar |
| 6,355,153 B1 | 3/2002 | Uzoh et al. |
| 6,398,937 B1 | 6/2002 | Menini et al. |
| 6,409,907 B1 | 6/2002 | Braun et al. |
| 6,415,942 B1 | 7/2002 | Fenton et al. |
| 6,461,678 B1 | 10/2002 | Chen et al. |
| 6,466,417 B1 | 10/2002 | Gill |
| 6,468,672 B1 | 10/2002 | Donovan, III et al. |
| 6,482,298 B1 | 11/2002 | Bhatnagar |
| 6,537,683 B1 | 3/2003 | Staschko et al. |
| 6,547,944 B2 | 4/2003 | Schreiber et al. |
| 6,592,739 B1 | 7/2003 | Sonoda et al. |
| 6,725,916 B2 | 4/2004 | Gray et al. |
| 6,739,028 B2 | 5/2004 | Sievenpiper et al. |
| 6,777,831 B2 | 8/2004 | Gutiérrez, Jr. et al. |
| 6,800,121 B2 | 10/2004 | Shahin |
| 6,884,499 B2 | 4/2005 | Penich et al. |
| 6,902,827 B2 | 6/2005 | Kelly et al. |
| 6,908,667 B2 | 6/2005 | Christ et al. |
| 6,923,898 B2 | 8/2005 | Yoshimura et al. |
| 6,979,490 B2 | 12/2005 | Steffier |
| 7,285,202 B2 | 10/2007 | Rumpf |
| 7,581,933 B2 | 9/2009 | Bruce et al. |
| 7,632,590 B2 | 12/2009 | Punsalan et al. |
| 7,736,753 B2 | 6/2010 | Deligianni et al. |
| 8,084,564 B2 | 12/2011 | Kano et al. |
| 8,128,752 B2 | 3/2012 | Kim |
| 8,152,985 B2 | 4/2012 | Macary |
| 8,177,945 B2 | 5/2012 | Arvin et al. |
| 8,192,608 B2 | 6/2012 | Matthews |
| 8,253,035 B2 | 8/2012 | Matsumoto |
| 8,293,077 B2 | 10/2012 | Vacheron |
| 8,585,875 B2 | 11/2013 | Cummings et al. |
| 8,617,456 B1 | 12/2013 | Pechenik et al. |
| 8,814,437 B2 | 8/2014 | Braun |
| 8,871,065 B2 | 10/2014 | Vacheron |
| 8,916,001 B2 * | 12/2014 | Pryce Lewis ............ B29C 33/56 118/724 |
| 9,005,420 B2 | 4/2015 | Tomantschger et al. |
| 9,056,405 B2 * | 6/2015 | Sato ........................ B29C 33/42 |
| 9,080,692 B2 | 7/2015 | Tomomori et al. |
| 9,108,506 B2 | 8/2015 | Whitaker et al. |
| 9,115,439 B2 | 8/2015 | Whitaker |
| 9,211,658 B2 * | 12/2015 | Price Lewis ............ B29C 33/56 |
| 9,234,294 B2 | 1/2016 | Whitaker et al. |
| 9,273,932 B2 | 3/2016 | Whitaker et al. |
| 9,732,433 B2 | 8/2017 | Caldwell et al. |
| 9,758,891 B2 | 9/2017 | Bao |
| 9,783,907 B2 | 10/2017 | Cai et al. |
| 9,938,629 B2 | 4/2018 | Whitaker et al. |
| 10,041,185 B2 | 8/2018 | Sukenari |
| 10,253,419 B2 | 4/2019 | Lomasney |
| 10,266,957 B2 | 4/2019 | Sugawara et al. |
| 10,472,727 B2 | 11/2019 | Lomasney |
| 10,513,791 B2 | 12/2019 | Lomasney et al. |
| 10,544,510 B2 | 1/2020 | Lomasney |
| 10,662,542 B2 | 5/2020 | Caldwell et al. |
| 10,689,773 B2 | 6/2020 | Whitaker et al. |
| 10,695,797 B2 | 6/2020 | Andreae et al. |
| 10,781,524 B2 | 9/2020 | Whitaker et al. |
| 10,808,322 B2 | 10/2020 | Whitaker et al. |
| 10,844,504 B2 | 11/2020 | Sklar |
| 10,851,464 B1 | 12/2020 | Kobayashi et al. |
| 10,961,635 B2 | 3/2021 | Whitaker |
| 11,118,280 B2 | 9/2021 | Lomasney et al. |
| 11,168,408 B2 | 11/2021 | Sklar |
| 11,180,864 B2 | 11/2021 | Lomasney |
| 11,242,613 B2 | 2/2022 | Lomasney |
| 11,286,575 B2 | 3/2022 | Lomasney et al. |
| 11,293,272 B2 | 4/2022 | Lomasney |
| 11,365,488 B2 | 6/2022 | Morgan et al. |
| 11,519,093 B2 | 12/2022 | Lomasney et al. |
| 11,560,629 B2 | 1/2023 | Whitaker et al. |
| 2001/0003384 A1 * | 6/2001 | Morita ..................... G11B 5/82 264/219 |
| 2001/0037944 A1 | 11/2001 | Sanada et al. |
| 2002/0011419 A1 | 1/2002 | Arao et al. |
| 2002/0070118 A1 | 6/2002 | Schreiber et al. |
| 2002/0100858 A1 | 8/2002 | Weber |
| 2002/0179449 A1 | 12/2002 | Domeier et al. |
| 2003/0134142 A1 | 7/2003 | Ivey et al. |
| 2003/0234181 A1 | 12/2003 | Palumbo |
| 2003/0236163 A1 | 12/2003 | Chaturvedi et al. |
| 2004/0027715 A1 | 2/2004 | Hixson-Goldsmith et al. |
| 2004/0031691 A1 | 2/2004 | Kelly et al. |
| 2004/0067314 A1 | 4/2004 | Joshi et al. |
| 2004/0154925 A1 | 8/2004 | Podlaha et al. |
| 2004/0178076 A1 | 9/2004 | Stonas et al. |
| 2004/0211672 A1 | 10/2004 | Ishigami et al. |
| 2004/0232005 A1 | 11/2004 | Hubel |
| 2004/0234683 A1 | 11/2004 | Tanaka et al. |
| 2004/0239836 A1 | 12/2004 | Chase |
| 2005/0002228 A1 | 1/2005 | Dieny et al. |
| 2005/0109433 A1 | 5/2005 | Danger et al. |
| 2005/0181192 A1 | 8/2005 | Steffier |
| 2005/0205425 A1 | 9/2005 | Palumbo et al. |
| 2005/0221100 A1 | 10/2005 | Kirihara et al. |
| 2005/0279640 A1 | 12/2005 | Shimoyama et al. |
| 2006/0065533 A1 | 3/2006 | Inoue et al. |
| 2006/0135281 A1 | 6/2006 | Palumbo et al. |
| 2006/0135282 A1 | 6/2006 | Palumbo et al. |
| 2006/0201817 A1 | 9/2006 | Guggemos et al. |
| 2006/0243597 A1 | 11/2006 | Matefi-Tempfli et al. |
| 2006/0269770 A1 | 11/2006 | Cox et al. |
| 2006/0272949 A1 | 12/2006 | Detor et al. |
| 2006/0286348 A1 | 12/2006 | Sauer |
| 2007/0158204 A1 | 7/2007 | Taylor et al. |
| 2007/0235890 A1 * | 10/2007 | Pryce Lewis ........... B29C 33/56 264/39 |
| 2007/0269648 A1 | 11/2007 | Schuh et al. |
| 2007/0278105 A1 | 12/2007 | Ettel |
| 2008/0063866 A1 * | 3/2008 | Allen ..................... A61B 5/685 428/389 |
| 2008/0093221 A1 | 4/2008 | Basol |
| 2008/0102360 A1 | 5/2008 | Stimits et al. |
| 2008/0226976 A1 | 9/2008 | Stimits |
| 2008/0245669 A1 | 10/2008 | Yoshioka et al. |
| 2008/0271995 A1 | 11/2008 | Savastiouk et al. |
| 2008/0283236 A1 | 11/2008 | Akers et al. |
| 2009/0004465 A1 | 1/2009 | Kano et al. |
| 2009/0084933 A1 * | 4/2009 | Appleby ................ B22D 29/00 249/119 |
| 2009/0101511 A1 | 4/2009 | Lochtman et al. |
| 2009/0114530 A1 | 5/2009 | Noda et al. |
| 2009/0130424 A1 | 5/2009 | Tholen et al. |
| 2009/0130425 A1 | 5/2009 | Whitaker |
| 2009/0139870 A1 * | 6/2009 | Nagai .................. H01L 21/2885 204/273 |
| 2009/0155617 A1 | 6/2009 | Kim et al. |
| 2009/0283410 A1 | 11/2009 | Sklar et al. |
| 2010/0078330 A1 | 4/2010 | Hyodo |
| 2010/0116675 A1 | 5/2010 | Sklar et al. |
| 2010/0187117 A1 | 7/2010 | Lingenfelter et al. |
| 2010/0304063 A1 | 12/2010 | McCrea et al. |
| 2010/0304179 A1 | 12/2010 | Facchini et al. |
| 2010/0319757 A1 | 12/2010 | Oetting |
| 2011/0068503 A1 * | 3/2011 | Sato ....................... B29C 33/42 264/219 |
| 2011/0111296 A1 | 5/2011 | Berdichevsky et al. |
| 2011/0162970 A1 | 7/2011 | Sato |

(56) References Cited

U.S. PATENT DOCUMENTS

| | | |
|---|---|---|
| 2011/0180413 A1 | 7/2011 | Whitaker et al. |
| 2011/0186582 A1 | 8/2011 | Whitaker et al. |
| 2011/0256356 A1 | 10/2011 | Tomantschger et al. |
| 2011/0277313 A1 | 11/2011 | Soracco et al. |
| 2012/0088118 A1 | 4/2012 | Lomasney |
| 2012/0118745 A1 | 5/2012 | Bao |
| 2012/0135270 A1 | 5/2012 | Wilbuer et al. |
| 2012/0231574 A1 | 9/2012 | Wang |
| 2012/0282417 A1 | 11/2012 | Garcia et al. |
| 2013/0052343 A1 | 2/2013 | Dieny et al. |
| 2013/0071755 A1 | 3/2013 | Oguro |
| 2013/0075264 A1 | 3/2013 | Cummings et al. |
| 2013/0130057 A1 | 5/2013 | Caldwell et al. |
| 2013/0186852 A1 | 7/2013 | Dietrich et al. |
| 2013/0220831 A1 | 8/2013 | Vidaurre Heiremans et al. |
| 2013/0224008 A1 | 8/2013 | Cheung et al. |
| 2013/0270734 A1* | 10/2013 | Sato ................. B29C 33/42 264/219 |
| 2013/0323473 A1 | 12/2013 | Dietsch et al. |
| 2014/0163717 A1 | 6/2014 | Das et al. |
| 2014/0178637 A1 | 6/2014 | Rajagopalan et al. |
| 2014/0231266 A1 | 8/2014 | Sherrer et al. |
| 2014/0272458 A1* | 9/2014 | Ruan ................. C22C 21/00 428/650 |
| 2015/0151459 A1* | 6/2015 | Price Lewis ......... B29C 33/56 425/28.1 |
| 2015/0315716 A1 | 11/2015 | Whitaker |
| 2015/0322588 A1 | 11/2015 | Lomasney et al. |
| 2016/0002790 A1 | 1/2016 | Whitaker et al. |
| 2016/0002803 A1 | 1/2016 | Sklar |
| 2016/0002806 A1 | 1/2016 | Lomasney |
| 2016/0002813 A1 | 1/2016 | Lomasney |
| 2016/0027425 A1 | 1/2016 | Cook et al. |
| 2016/0047980 A1 | 2/2016 | Page et al. |
| 2016/0145850 A1 | 5/2016 | Cook et al. |
| 2016/0159488 A1 | 6/2016 | Roach et al. |
| 2016/0160863 A1 | 6/2016 | Roach et al. |
| 2016/0214283 A1 | 7/2016 | Schick et al. |
| 2016/0298251 A1 | 10/2016 | Kimoto et al. |
| 2017/0016130 A1 | 1/2017 | Testoni et al. |
| 2017/0191179 A1 | 7/2017 | Sklar |
| 2017/0275775 A1 | 9/2017 | Guadarrama Calderon et al. |
| 2018/0016694 A1 | 1/2018 | Bao |
| 2018/0066375 A1 | 3/2018 | Morgan et al. |
| 2018/0245229 A1 | 8/2018 | Whitaker et al. |
| 2019/0309430 A1 | 10/2019 | Sklar |
| 2019/0360116 A1 | 11/2019 | Collinson et al. |
| 2020/0115998 A1 | 4/2020 | Lomasney |
| 2020/0131658 A1 | 4/2020 | Lomasney et al. |
| 2020/0173032 A1 | 6/2020 | Lomasney |
| 2020/0277706 A1 | 9/2020 | Lomasney et al. |
| 2020/0283923 A1 | 9/2020 | Lomasney |
| 2020/0318245 A1 | 10/2020 | Lomasney |
| 2020/0354846 A1 | 11/2020 | Whitaker et al. |
| 2020/0392642 A1 | 12/2020 | Lomasney |
| 2021/0054522 A1 | 2/2021 | Lomasney et al. |
| 2021/0071303 A1 | 3/2021 | Whitaker et al. |
| 2021/0147995 A1 | 5/2021 | Sklar |
| 2022/0081798 A1 | 3/2022 | Collinson et al. |
| 2022/0154357 A1 | 5/2022 | Lomasney |
| 2022/0396893 A1 | 12/2022 | Lomasney et al. |

FOREIGN PATENT DOCUMENTS

| | | |
|---|---|---|
| CN | 1380446 A | 11/2002 |
| CN | 1924110 A | 3/2007 |
| CN | 101113527 A | 1/2008 |
| CN | 101195924 A | 6/2008 |
| CN | 201857434 U | 6/2011 |
| CN | 102148339 A | 8/2011 |
| CN | 203584787 U | 5/2014 |
| CN | 105442011 A | 3/2016 |
| DE | 39 02 057 A1 | 7/1990 |
| EP | 1 688 518 A2 | 8/2006 |
| EP | 2 078 607 A1 | 7/2009 |
| EP | 2 189 554 A1 | 5/2010 |
| GB | 667227 | 2/1952 |
| JP | 47-2005 A | 2/1972 |
| JP | 47-33925 A | 11/1972 |
| JP | 52-109439 A | 9/1977 |
| JP | 58-197292 A | 11/1983 |
| JP | 60-97774 A | 5/1985 |
| JP | 61-99692 A | 5/1986 |
| JP | 1-132793 A | 5/1989 |
| JP | 2-214618 A | 8/1990 |
| JP | H05251849 A | 9/1993 |
| JP | 6-196324 A | 7/1994 |
| JP | 7-065347 A | 3/1995 |
| JP | H09-119000 A | 5/1997 |
| JP | 2000-239888 A | 9/2000 |
| JP | 2001-152388 A | 6/2001 |
| JP | 2001-181893 A | 7/2001 |
| JP | 2002-53999 A | 2/2002 |
| JP | 10 2004 006 441 A1 | 12/2005 |
| JP | 2006-035176 A | 2/2006 |
| JP | 2009-215590 A | 9/2009 |
| KR | 2003-0092463 A | 12/2003 |
| KR | 20-2010-0009670 | 10/2010 |
| KR | 10-2015-0132043 A | 11/2015 |
| SU | 36121 A1 | 4/1934 |
| WO | 83/02784 A1 | 8/1983 |
| WO | 95/14116 | 5/1995 |
| WO | 03/100484 A2 | 12/2003 |
| WO | 2004/001100 A1 | 12/2003 |
| WO | 2004/092436 A2 | 10/2004 |
| WO | 2007/045466 A1 | 4/2007 |
| WO | 2007/138619 A1 | 12/2007 |
| WO | 2008/057401 A2 | 5/2008 |
| WO | 2009/045433 A1 | 4/2009 |
| WO | 2010/139054 A1 | 12/2010 |
| WO | 2010/144509 A2 | 12/2010 |
| WO | 2011/033775 A1 | 3/2011 |
| WO | 2011/110346 A2 | 9/2011 |
| WO | 2012/012789 | 1/2012 |
| WO | 2012/145750 | 10/2012 |
| WO | 2013/010108 | 1/2013 |
| WO | 2013/133762 A1 | 9/2013 |
| WO | 2017/097300 A1 | 6/2017 |

OTHER PUBLICATIONS

Onoda et al., "Preparation of amorphous/crystalloid soft magnetic multilayer Ni—Co—B alloy films by electrodeposition," *Journal of Magnetism and Magnetic Materials*, 126 (1993) 595-598.

"Appendix 1: Literature review (Task 1): Literature review concerning the improvement of galvanneal (GA) coating adherence during shear test of adhesively bonded GA steel sheets," 70 pages, no date.

"Low-temperature iron plating," web blog article found at http:blog.sina.com.cn/s/blog_48ed0a9c0100024z.html, published Mar. 22, 2006, 3 pages. (with English translation).

Adams et al., "Controlling strength and toughness of multilayer films: A new multiscalar approach," *J. Appl. Phys.* 74(2):1015-1021, 1993.

Aizenberg et al., "Skeleton of *Euplectella* sp.: Structural Hierarchy from the Nanoscale to the Macroscale," *Science* 309:275-278, 2005.

Alfantazi et al., "Synthesis of nanocrystalline Zn—Ni alloy coatings," *JMSLD5* 15(15):1361-1363, 1996.

Atanassov et al., "Electrodeposition and properties of nickel-manganese layers," *Surface and Coatings Technology* 78:144-149, 1996.

Bakonyi et al., "Electrodeposited multilayer films with giant magnetoresistance (*GMR*): Progress and problems," *Progress in Materials Science* 55:107-245, 2010.

Bartlett et al., "Electrochemical deposition of macroporous platinum, palladium and cobalt films using polystyrene latex sphere templates," *Chem. Commun.*, pp. 1671-1672, 2000.

Beattie et al., "Comparison of Electrodeposited Copper-Zinc Alloys Prepared Individually and Combinatorially," *J. Electrochem. Soc.* 150(11):C802-C806, 2003.

(56) References Cited

OTHER PUBLICATIONS

Bird et al., "Giant Magnetoresistance in Electrodeposited Ni/Cu and Co/Cu Multilayers," *J. Electrochem. Soc.* 142(4):L65-L66, 1995.
Blum, "The Structure and Properties of Alternately Electrodeposited Metals," presented at the Fortieth General Meeting of the American Electrochemical Society, Lake Placid, New York, Oct. 1, 1921, 14 pages.
Cohen et al., "Electroplating of Cyclic Multilayered Alloy (CMA) Coatings," *J. Electrochem. Soc.* 130(10):1987-1995, 1983.
Cowles, "High cycle fatigue in aircraft gas turbines—an industry perspective," *International Journal of Fracture* 80(2-3):147-163, 1996 (abstract only).
"Designing with Metals: Dissimilar Metals and The Galvanic Series," printed Oct. 5, 2017, 3 pages.
Despic et al., "Electrochemical Formation of Laminar Deposits of Controlled Structure and Composition," *J. Electrochem. Soc.* 136(6):1651-1657, 1989.
Dini et al. "On the High Temperature Ductility Properties of Electrodeposited Sulfamate Nickel," *Plating and Surface Finishing* 65(2):36-40, 1978.
Etminanfar et al., "Corrosion resistance of multilayer coatings of nanolayered Cr/Ni electrodeposited from Cr(III)-Ni(II) bath," *Thin Solid Films* 520:5322-5327, 2012.
Gasser et al., "Materials Design for Acoustic Liners: an Example of Tailored Multifunctional Materials," *Advanced Engineering Materials* 6(1-2):97-102, 2004.
Georgescu et al., "Magnetic Behavior of [Ni/Co—Ni—Mg—N] x n Cylindrical Multilayers prepared by Magnetoelectrolysis," *Phys. Stat. Sol.* (a) 189(3):1051-1055, 2002.
Ghanem et al., "A double templated electrodeposition method for the fabrication of arrays of metal nanodots," *Electrochemistry Communications* 6:447-453, 2004.
Grimmett et al., "Pulsed Electrodeposition of Iron-Nickel Alloys," *J. Electrochem. Soc.* 137(11):3414-3418, 1990.
Hariyanti, "Electroplating of Cu—Sn Alloys and Compositionally Modulated Multilayers of Cu—Sn—Zn—Ni Alloys on Mild Steel Substrate," Master of Science Thesis, University of Science, Malaysia, Penang, Malaysia, 2007.
Harris et al., "Improved Single Crystal Superalloys, CMSX-4® (SLS)[La+Y] and CMSX-486®," *TMS* (*The Minerals, Metals & Materials Society*), *Superalloys*, p. 45-52, 2004.
Huang et al., "Hardness variation and annealing behavior of a Cr—Ni multilayer electroplated in a trivalent chromium-based bath," *Surface and Coatings Technology* 203:3320-3324, 2009.
Huang et al., "Characterization of Cr—Ni multilayers electroplated from a chromium(III)-nickel(II) bath using pulse current," *Scripta Materialia*, 57:61-64, 2007.
Igawa et al., "Fabrication of SiC fiber reinforced SiC composite by chemical vapor infiltration for excellent mechanical properties," *Journal of Physics and Chemistry of Solids* 66:551-554, 2005.
Ivanov et al., "Corrosion resistance of compositionally modulated multilayered Zn—Ni alloys deposited from a single bath," *Journal of Applied Electrochemistry* 33:239-244, 2003.
Jeong et al., "The Effect of Grain Size on the Wear Properties of Electrodeposited Nanocrystalline Nickel Coatings," *Scripta Mater.* 44:493-499, 2001.
Jia et al., "LIGA and Micromolding" Chapter 4, *The MEMS Handbook*, 2nd edition, CRC Press, Boca Raton, Florida, Edited by Mohamed Gad-el-Hak, 2006.
Kalu et al., "Cyclic voltammetric studies of the effects of time and temperature on the capacitance of electrochemically deposited nickel hydroxide," *Journal of Power Sources* 92:163-167, 2001.
Kaneko et al., "Vickers hardness and deformation of Ni/Cu nano-multilayers electrodeposited on copper substrates," Eleventh International Conference on Intergranular and Interphase Boundaries 2004, *Journal of Material Science* 40:3231-3236, 2005.
Karimpoor et al., "Tensile Properties of Bulk Nanocrystalline Hexagonal Cobalt Electrodeposits," *Materials Science Forum* 386-388:415-420, 2002.
Keckes et al., "Cell-wall recovery after irreversible deformation of wood," *Nature Materials* 2:810-814, 2003.
Kirilova et al., "Corrosion behaviour of Zn—Co compositionally modulated multilayers electrodeposited from single and dual baths," *Journal of Applied Electrochemistry* 29:1133-1137, 1999.
Kockar et al., "Effect of potantiostatic waveforms on properties of electrodeposited NiFe alloy films," *Eur. Phys. J. B*(42):497-501, 2004.
Kruth et al., "Progress in Additive Manufacturing and Rapid Prototyping" *CIRP Annals* 47(2):525-540, 1998.
Lashmore et al., "Electrodeposited Cu—Ni Textured Superlattices," *J. Electrochem. Soc.* 135(5): 1218-1221, 1988.
Lashmore et al., "Electrodeposited Multilayer Metallic Coatings," *Encyclopedia of Materials Science and Engineering*, Supp. vol. 1:136-140, 1988.
Leisner et al., "Methods for electrodepositing composition-modulated alloys," *Journal of Materials Processing Technology* 58:39-44, 1996.
Leith et al., "Characterization of Flow-Induced Compositional Structure in Electrodeposited NiFe Composition-Modulated Alloys" *J. Electrochem. Soc.* 145(8):2827-2833, 1998.
Lekka et al., "Corrosion and wear resistant electrodeposited composite coatings," *Electrochimica Acta* 50:4551-4556, 2005.
Lewis et al., "Stability in thin film multilayers and microlaminates: the role of free energy, structure, and orientation at interfaces and grain boundaries," *Scripta Materialia* 48:1079-1085, 2003.
Low et al., "Electrodeposition of composite coatings containing nanoparticles in a metal deposit," *Surface & Coating Technology* 201:371-383, 2006.
Malone, "New Developments in Electroformed Nickel-Based Structural Alloys," *Plating and Surface Finishing* 74(1):50-56, 1987.
Marchese, "Stress Reduction of Electrodeposited Nickel," *Journal of the Electrochemical Society* 99(2):39-43, 1952.
Meng et al., "Fractography, elastic modulus, and oxidation resistance of Novel metal-intermetallic $Ni/Ni_3Al$ multilayer films," *J. Mater. Res.* 17(4):790-796, 2002.
Naslain et al., "Synthesis of highly tailored ceramic matrix composites by pressure-pulsed CVI," *Solid State Ionics* 141-142:541-548, 2001.
Naslain, "The design of the fibre-matrix interfacial zone in ceramic matrix composites," *Composites Part A* 29A:1145-1155, 1998.
Nicholls, "Advances in Coating Design for High-Performance Gas Turbines," *MRS Bulletin*, p. 659-670, 2003.
Parkin et al., "Oscillations in Exchange Coupling and Magnetoresistance in Metallic Superlattice Structures: Co/Ru, Co/Cr, and Fe/Cr," *Physical Review Letters* 64(19):2304-2307, 1990.
Pilone et al., "Model of Multiple Metal Electrodeposition in Porous Electrodes," *Journal of the Electrochemical Society* 153(5):D85-D90, 2006.
Podlaha et al. "Induced Codeposition: I. An Experimental Investigation of Ni—Mo Alloys," *J. Electrochem. Soc.* 143(3):885-892, 1996.
Ross, "Electrodeposited Multilayer Thin Films," *Annual Review of Materials Science* 24:159-188, 1994.
Rousseau et al., "Single-bath Electrodeposition of Chromium-Nickel Compositionally Modulated Multilayers (CMM) From a Trivalent Chromium Bath," *Plating and Surface Finishing*, p. 106-110, 1999.
Saleh et al., "Effects of electroplating on the mechanical properties of stereolithography and laser sintered parts," *Rapid Prototyping Journal* 10(5)305-315, 2004.
Sanders et al., "Mechanics of hollow sphere foams," *Materials Science and Engineering* A347:70-85, 2003.
Sartwell et al., "Replacement of Chromium Electroplating on Gas Turbine Engine Components Using Thermal Spray Coatings," Report No. NRL/MR/6170-05-8890, Naval Research Laboratory, 2005. (207 pages).
Schwartz, "Multiple-Layer Alloy Plating," *ASM Handbook 5: Surface Engineering*, p. 274-276, 1994.
Sherik, "Synthesis, Structure and Properties of Electrodeposited Bulk Nanocrystalline Nickel," Master's Thesis, Queen's University, Ontario, Canada, 1993.

(56) References Cited

OTHER PUBLICATIONS

Shishkovski, "Laser synthesis of functionally graded meso structures and bulk products," Fizmatlit, Moscow, Russia, pp. 30-38, 2009. (with English Abstract).
Simunovich et al., "Electrochemically Layered Copper-Nickel Nanocomposites with Enhanced Hardness," *J. Electrochem. Soc.* 141(1): L10-L11, 1994.
Sperling et al., "Correlation of stress state and nanohardness via heat treatment of nickel-aluminide multilayer thin films," *J. Mater. Res.* 19(11): 3374-3381, 2004.
Srivastava et al., "Corrosion resistance and microstructure of electrodeposited nickel-cobalt alloy coatings," *Surface & Coatings Technology* 201:3051-3060, 2006.
Stephenson, Jr., "Development and Utilization of a High Strength Alloy for Electroforming," *Plating* 53(2): 183-192, 1966.
Suresh, "Graded Materials for Resistance to Contact Deformation and Damage," *Science* 292:2447-2451, 2001.
Switzer et al., "Electrodeposited Ceramic Superlattices," *Science* 247(4941):444-446, 1990.
Tench et al., "Considerations in Electrodeposition of Compositionally Modulated Alloys," *J. Electrochem. Soc.* 137(10):3061-3066, 1990.
Tench et al., "Enhanced Tensile Strength for Electrodeposited Nickel-Copper Multilayer Composites," *Metallurgical Transactions A* (15A):2039-2040, 1984.
Thangaraj et al., "Corrosion behavior of composition modulated multilayer Zn—Co electrodeposits produced using a single-bath technique," *J. of Appl. Electrochem.* 39:339-345, 2009.
Thangaraj et al., "Surface Modification by Compositionally Modulated Multilayered Zn—Fe Coatings," *Chinese Journal of Chemistry* 26:2285-2291, 2008.
Tokarz et al., "Preparation, structural and mechanical properties of electrodeposited Co/Cu multilayers," *phys. stat. sol. (c)* 5(11):3526-3529, 2008.
Touchstone Research Laboratory, Ltd., Material Safety Data Sheet, CFOAM Carbon Foams, 2008. (4 pages).
Vill et al., "Mechanical Properties of Tough Multiscalar Microlaminates," *Acta metall. mater.* 43(2):427-437, 1995.
Voevodin et al., "Superhard, functionally gradient, nanolayered and nanocomposite diamond-like carbon coatings for wear protection," *Diamond and Related Materials* 7:463-467, 1998.
Wearmouth et al., "Electroforming with Heat-Resistant, Sulfur-Hardened Nickel," *Plating and Surface Finishing* 66(10):53-57, 1979.
Weil et al., "Pulsed Electrodeposition of Layered Brass Structures," *Metallurgical Transactions A* 19A:1569-1573, 1988.
Weil et al., "Properties of Composite Electrodeposits," U.S. Army Research Office, Final Report, Contract No. DAALO3-87-K-0047, 21 pages, 1990.
Wikipedia, "Gold," URL= http://en.wikipedia.org/wiki/Gold, version modified Nov. 3, 12 pages, 2008.
Wikipedia, "Silver," URL= http://en.wikipedia.org/wiki/Silver, version modified Nov. 3, 12 pages, 2008.
Wilcox, "Surface Modification With Compositionally Modulated Multilayer Coatings," *The Journal of Corrosion Science and Engineering* 6(Paper 52): 2004 (5 pages).
Wu et al., "Preparation and characterization of superhard $CN_x/ZrN$ multilayers," *J. Vac. Sci. Technol. A* 15(3):946-950, 1997.
Yahalom et al., "Formation of composition-modulated alloys by electrodeposition," *Journal of Materials Science* 22:499-503, 1987.
Yang et al., "Effects of SiC sub-layer on mechanical properties of Tyranno-SA/SiC composites with multiple interlayers," *Ceramics International* 31:525-531, 2005.
Yang et al., "Enhanced elastic modulus in composition-modulated gold-nickel and copper-palladium foils," *Journal of Applied Physics* 48(3): 876-879, 1977.
Yogesha et al., "Optimization of deposition conditions for development of high corrosion resistant Zn—Fe multilayer coatings," *Journal of Materials Processing Technology* 211:1409-1415, 2011.
Zabludovsky et al., "The Obtaining of Cobalt Multilayers by Programme-controlled Pulse Current," *Transactions of the Institute of Metal Finishing* 75(5):203-204, 1997.
U.S. Appl. No. 17/179,351 filed Feb. 18, 2021.
Paz et al., "Nano-Laminated Alloys for Improved Return on Oilfield Assets," *Society of Petroleum Engineers*, 2016 (14 pages).
U.S. Appl. No. 17/533,015, filed Nov. 22, 2021.
U.S. Appl. No. 17/678,841, filed Feb. 23, 2022.
Dulal et al., "Characterisation of Co—Ni(Cu)/Cu multilayers deposited from a citrate electrolyte in a flow channel cell," *Electrochimica Acta* 49:2041-2049, 2004.
Kalantary et al., "Compositionally modulated alloy synthesis by electrochemical deposition,". *National UK Corrosion Conference of the Institute of Corrosion*, 15th:223-234, Jan. 1, 1995.
Kalantary et al., "The Production of Compositionally Modulated Alloys By Simulated High Speed Electrodeposition From A Single Solution," *Electrochimica Acta* 40(11): 1609-1616, 1995.
Nabiyouni et al., "Growth, characterization and magnetoresistive study of electrodeposited Ni/Cu and Co—Ni/Cu multilayers," *Journal of Crystal Growth* 275:e1259-e1262, 2005.

\* cited by examiner

APPLICATION OF LAMINATE AND NANOLAMINATE MATERIALS TO TOOLING AND MOLDING PROCESSES

TECHNICAL FIELD

Embodiments of the present disclosure are generally directed to molds comprising a workpiece produced by additive manufacturing and a laminate coating applied to the surface, and to methods of making and using the same.

BACKGROUND

Electrodeposition is recognized as a low-cost method for forming a dense coating or cladding on a variety of conductive materials, including metals, alloys, conductive polymers, and the like. Electrodeposition has also been successfully used to deposit nanolaminated coatings on non-conductive materials, such as non-conductive polymers, by incorporating sufficient materials into the non-conductive polymer to render it sufficiently conductive or by treating the surface to render it conductive, for example, by electroless deposition of nickel, copper, silver, cadmium, etc., in a variety of engineering applications. Electrodeposition has also been demonstrated as a viable means for producing laminated and nanolaminated coatings, claddings, materials, and objects, in which the individual laminate layers may vary in the composition of the metal, ceramic, organic-metal composition, and/or microstructure features.

Although electrodeposition methods are known, there remains a need in the art for methods to adapt such electrodeposition methods to the production of molding and tooling for manufacturing processes in order to produce tough, thermally stable, and wear, corrosion, and abrasion resistant molds. This disclosure provides this and related advantages.

BRIEF SUMMARY

Laminated coatings and materials, and in particular nanolaminated metals and nanolaminate metal coatings, are of interest for a variety of purposes, including structural, thermal, and corrosion resistance applications because of their unique toughness, fatigue resistance, thermal stability, wear, abrasion resistance, and chemical properties.

Embodiments of the present disclosure provide methods for the production of a mold for molding polymerizable, settable, thermoplastic, or thermoset materials, wherein the mold is made by additive manufacturing coupled with electrodeposition. Such methods comprise subjecting a workpiece to one or more deposition process(es), such as electrodeposition, that provide a coating that possesses desirable chemical, physical, and/or mechanical properties. In some embodiments, the methods further comprise forming at least one workpiece for the mold by, for example, an additive manufacturing process such as three-dimensional printing (3D printing).

In embodiments, the present disclosure provides a method for preparing a mold, the method comprising: forming a mold by applying a laminated coating on a surface of a shaped workpiece, the mold comprising: A) a surface with a first feature and a second feature that have a surface aspect ratio ranging from about 1 to about 10, the surface aspect ratio being defined as:

$$\left| \frac{\text{(height of the first feature)} - \text{(height of the second feature)}}{\text{distance between the first feature and the second feature}} \right|;$$

B) one or more ports configured to allow for circulation of liquid or gas through a portion of the mold; or C) both A) and B).

In one embodiment, the present disclosure provides a method for preparing a mold, the method comprising: forming a mold by applying a laminated conductive coating on a surface of a shaped polymeric workpiece, the mold comprising: A) a surface with a first feature and a second feature that have a surface aspect ratio ranging from about 1 to about 10, the surface aspect ratio being defined as:

$$\left| \frac{\text{(height of the first feature)} - \text{(height of the second feature)}}{\text{distance between the first feature and the second feature}} \right|;$$

B) one or more ports configured to allow for circulation of liquid or gas through a portion of the mold; or C) both A) and B).

In another embodiment, the present disclosure provides a mold comprising: a shaped workpiece; and a laminated coating on a surface of the shaped workpiece, wherein the mold comprises: A) a surface with a first feature and a second feature that have a surface aspect ratio ranging from about 1 to about 10, the surface aspect ratio being defined as:

$$\left| \frac{\text{(height of the first feature)} - \text{(height of the second feature)}}{\text{distance between the first feature and the second feature}} \right|;$$

B) the mold comprises cooling fins or ports configured to allow for circulation of liquid or gas through a portion of the mold; or C) both A) and B).

In another embodiment, the present disclosure provides a mold comprising: a shaped workpiece; and a laminated coating on a surface of the shaped workpiece, wherein the mold comprises a surface with a first feature and a second feature that have a surface aspect ratio ranging from about 1 to about 10, the surface aspect ratio being defined as:

$$\left| \frac{\text{(height of the first feature)} - \text{(height of the second feature)}}{\text{distance between the first feature and the second feature}} \right|.$$

In another embodiment, the present disclosure provides a mold comprising: a shaped workpiece; and a laminated coating on a surface of the shaped workpiece, wherein the mold comprises: A) a surface with a first feature and a second feature that have a surface aspect ratio ranging from about 1 to about 10, the surface aspect ratio being defined as:

$$\left| \frac{\text{(height of the first feature)} - \text{(height of the second feature)}}{\text{distance between the first feature and the second feature}} \right|;$$

and
B) cooling fins or ports configured to allow for circulation of liquid or gas through a portion of the mold.

In another embodiment, the present disclosure provides a mold comprising: a shaped workpiece comprising a polymeric material; and a laminated coating on a surface of the shaped workpiece, wherein the mold comprises the mold comprises cooling fins or ports configured to allow for circulation of liquid or gas through a portion of the mold.

In yet another embodiment, the present disclosure provides a method of molding an article comprising: introducing a settable material, a polymerizable material, a thermoplastic material, or a thermoset material into a mold having at least one section formed by a method according to any of claims 1-29 or a mold according to any of claims 30-71; and allowing the settable, polymerizable, thermoplastic, or thermoset material to at least partially cure or cool to form an article that can be separated from the mold.

DETAILED DESCRIPTION 1.0 Definitions

Figure 1A:
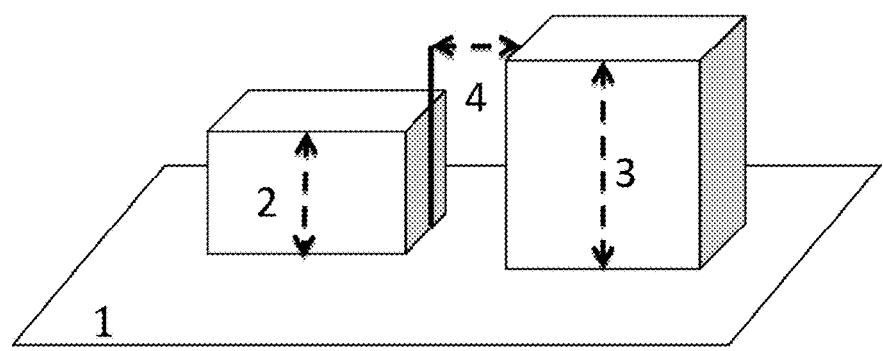
FIGS. 1A and 1B show two examples of surface aspect ratio of features.

"Additive manufacturing" means the preparation of three-dimensional workpieces by the sequential addition of materials. The process includes all forms of direct digital manufacturing, including direct digital deposition, three-dimensional printing (3D printing), selective laser sintering (SLS) or sintering laser melting (SLM), fused deposition modeling (FDM), stereolithography (SLA), continuous liquid interface printing (CLIP), cutting and/or forming of woven or non-woven fabrics, and cutting and/or forming of foam sheets.

"ASTM" means the American Society for Testing and Materials, headquartered in West Conshohocken, Pennsylvania. The ASTM standards referred to herein are the most recent standards promulgated by the ASTM at the time the earliest member of the patent family was filed, unless indicated otherwise, such as by stating the date and/or version of the standard.

"Balance" or "balance of the composition," as used herein in reference to the composition of materials, refers to the portion of the composition not defined by an explicit amount or range, or, in other words, the remainder of the composition.

"Direct digital manufacturing," "rapid prototyped" or "rapid prototyping" means the additive manufacturing process of making a three-dimensional solid workpiece of any shape from a digital model. The process is an additive one, wherein successive layers, ribbons, beads, or areas of material are laid down or solidified in different shapes to form a three-dimensional article.

"Selective laser sintering" (SLS) refers to a process wherein a bed of powder is locally bonded by the action of a laser to form one cross section of an workpiece at a time.

"Fused Deposition Modeling" (FDM) refers to a process wherein molten material (e.g., thermoplastic) is used to sequentially build up an workpiece of a desired shape.

"Stereolithography" (SLA) refers to a process wherein a liquid polymer is locally solidified by photo-initiated cross-linking. In the process, light is focused onto the surface of a container of uncured photopolymer, and the desired 2D cross-sectional shape is 'drawn,' producing a solidified 2D pattern. Repeating this process produces 3D geometries of the desired shape.

"Laminated Object Manufacturing" (LOM) means the use of thin layers cut to shape and joined together (e.g., paper, polymer, metal) to form a desired three-dimensional workpiece.

"Electrodeposition" or "electrodeposited" refers to a process or a resultant product, respectively, in which electrolysis is used to deposit a coating onto a workpiece. In other words, a workpiece is contacted with (e.g., partially immersed in, or fully immersed in) an electrolyte solution containing one or more ions (e.g., metal, ceramic, etc.) while an electric current is passed through the workpiece and the electrolyte solution, resulting in a thin coating being deposited on the surface of the workpiece.

"Electroless plating" means autocatalytic plating in which the plating bath contains reducing agents ready to react with the substrate, and the catalyst is the metal to be deposited on the surface of a workpiece placed in the plating bath.

"Electrolyte," as used herein, means an electrolyte bath, plating bath, or electroplating solution from which one or more metals may be electroplated.

"Coatings" include thin layers that are electrodeposited onto a surface of a workpiece. Therefore "coatings," as used herein, includes claddings, which are made of a series of thin electrodeposited layers on a surface of a mandrel, where the mandrel is removed after formation of the electrodeposited layers. Claddings are generally fastened to another article as a protective layer after formation.

"Laminated," or "laminate" as used herein, refers to materials (e.g., coatings) that comprise two or more layers. In embodiments, laminate or laminated refers to materials that comprise, consist essentially of, or consist of, a series of layers that may be in an alternating or non-alternating pattern. Alternating layers may comprise two types of layers (e.g., A, B, A, B, A, B . . . ), three types of layers (e.g., A, B, C, A, B, C, A, B, C . . . ), four types of layers (e.g., A, B, C, D, A, B, C, D . . . ), or more types of layers. Non-alternating layers may comprise three or more, four or more, or five or more different types of layers. Laminated, as used herein includes nanolaminated.

"Nanolaminate" or "nanolaminated," within the meaning of this disclosure are coatings comprising two or more layers in which each of the individual layers has a thickness of less than 10,000 nanometers (i.e., 10 microns). In other words, the term "nanolaminated" in "nanolaminated coatings" in this disclosure refers to the thickness of the layers in the coating, not the overall thickness of the coating made up of the individual layers. In embodiments, "nanolaminated" refers to materials or coatings that comprise, consist essentially of, or consist of, a series of laminated layers less than 1 micron. The processes described herein are particularly suited for providing nanolaminated coatings, however, they certainly also can be used to make articles in which the individual layers that are thicker than 10 microns.

The term "wavelength" refers to the thickness of two adjacent layers that are formed in a single deposition cycle in embodiments where the current density is a periodic function.

"Workpiece" includes any item with a surface onto which a coating is electrodeposited. In other words, a workpiece is an object possessing a shape such that, after applying a given thickness of laminated material, yields a mold (e.g., a complete mold or section of a mold) with the desired shape and properties. Workpieces include substrates, which are objects on which a coating is applied, and mandrels, which are substrates from which the coating is removed after formation. Workpieces can be formed of a conductive material (e.g., a metal), formed of a mixture of conductive and non-conductive materials (e.g., a polymer-metal mixture), or coated with a conductive material (e.g., non-conductive material coated with a metal layer through electroless deposition).

A workpiece employed in embodiments of the present disclosure may be any suitable workpiece. In embodiments, a workpiece is made of a polymeric material. In some embodiments, polymeric material includes arylamides, acrylamides, polybenzimidazole (PBI), polyetherimide, polyetherketoneketone (PEKK), polyether ether ketone (PEEK), polyamide, polyimide, polyamide-imides, polyphenylene oxide (PPO), polystyrene (PS), polyphenylene oxide (PPO) and polystyrene (PS), polyphthalamide (PPA), polyvinyl alcohol (PVA), acrylonitrile butadiene styrene (ABS), polycarbonate (PC), polylactic acid (PLA), PC/ABS, cellulose fiber, polyphenylsulfone (PPSU), thermosets, PBI-PEEK, urea, epoxies, cyanate esters, polyurethanes, or any combination thereof. In some embodiments, a polymeric material is a plastic material.

In other embodiments, a workpiece is made of a metal or an alloy. In some embodiments, the metal is a steel alloy. In such embodiments, the steel alloy may include: C and Fe; C, Fe, and Mo; or C, Fe, Mo, and Co. In further embodiments, the alloy may comprise Al, Cu, W, Mo, or Ti.

An "article" describes a finished product of a workpiece that has been coated by a method as described herein. Therefore, an article is a workpiece with a laminate, nanolaminate, or microlaminate coating, or a cladding after the mandrel has been removed.

All compositions given as percentages are given as percent by weight unless stated otherwise.

The term "about" has the meaning reasonably ascribed to it by a person of ordinary skill in the art when used in conjunction with a stated numerical value or range, i.e., denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

The term "substantially" has the meaning reasonably ascribed to it by a person of ordinary skill in the art when used to describe a physical characteristic of an item, i.e., indicating that the item possesses the referenced characteristic to a significant extent, e.g., to within a range of ±20% of the referenced characteristic; ±19% of the referenced characteristic; ±18% of the referenced characteristic; ±17% of the referenced characteristic; ±16% of the referenced characteristic; ±15% of the referenced characteristic; ±14% of the referenced characteristic; ±13% of the referenced characteristic; ±12% of the referenced characteristic; ±11% of the referenced characteristic; ±10% of the referenced characteristic; ±9% of the referenced characteristic; ±8% of the referenced characteristic; ±7% of the referenced characteristic; ±6% of the referenced characteristic; ±5% of the referenced characteristic; ±4% of the referenced characteristic; ±3% of the referenced characteristic; ±2% of the referenced characteristic; or ±1% of the referenced characteristic. For example, an item may be considered substantially circular if any two measurements of a diameter of the item are within a range of ±20%, ±19%; ±18%; ±17%; ±16%; ±15%; ±14%; ±13%; ±12%; ±11%; ±10%; ±9%; ±8%; ±7%; ±6%; ±5%; ±4%; ±3%; ±2%; or ±1% of each other. When used in conjunction with a comparator (e.g., a first coating is substantially thicker than a second coating) substantially is used to mean that the difference is at least ±20% of the referenced characteristic; ±19% of the referenced characteristic; ±18% of the referenced characteristic; ±17% of the referenced characteristic; ±16% of the referenced characteristic; ±15% of the referenced characteristic; ±14% of the referenced characteristic; ±13% of the referenced characteristic; ±12% of the referenced characteristic; ±11% of the referenced characteristic; ±10% of the referenced characteristic; ±9% of the referenced characteristic; ±8% of the referenced characteristic; ±7% of the referenced characteristic; ±6% of the referenced characteristic; ±5% of the referenced characteristic; ±4% of the referenced characteristic; ±3% of the referenced characteristic; ±2% of the referenced characteristic; or ±1% of the referenced characteristic.

In some embodiments, "substantially uniform thickness," as used herein means an overall thickness variation of less than ±30% from the average thickness. Stricter tolerances may be specified including, variations of less than ±25%, ±20%, ±15%, ±10%, or ±5% from the average surface thickness.

The terms "a," "an," "the," and similar articles or terms used in the context of describing the disclosure (especially in the context of the following claims) are to be construed to cover both the singular and the plural (i.e., "one or more"), unless otherwise indicated herein or clearly contradicted by context. Ranges of values recited herein are intended to serve as a shorthand method of referring individually to each separate value falling within the range. In the present description, any concentration range, percentage range, ratio range, or integer range is to be understood to include the value of any integer within the recited range and, when appropriate, fractions thereof (such as one tenth and one hundredth of an integer), unless otherwise indicated. Also, any number range recited herein relating to any physical feature, such as size or thickness, are to be understood to include any integer within the recited range, unless otherwise indicated. Unless otherwise indicated herein, each individual value is incorporated into the specification as if it were individually recited herein.

The use of the alternative (e.g., "or") should be understood to mean one, both, or any combination thereof of the alternatives. The various embodiments described above can be combined to provide further embodiments. Groupings of alternative elements or embodiments of the disclosure described herein should not be construed as limitations. Each member of a group may be referred to and claimed individually, or in any combination with other members of the group or other elements found herein. The phrase "or," as used herein in the specification and in the claims, should be understood to mean "either or both" of the elements so conjoined, i.e., elements that are conjunctively present in some cases and disjunctively present in other cases. Multiple elements listed with "or" should be construed in the same fashion, i.e., "one or more" of the elements so conjoined. Other elements may optionally be present other than the elements specifically identified by the "or" clause, whether related or unrelated to those elements specifically identified. Thus, as a non-limiting example, a reference to "A or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the context of this disclosure, the words "process" and "method" are synonymous. It should also be understood that, unless clearly indicated to the contrary, processes described herein and claimed below can include steps in addition to the steps recited, and the order of the steps or acts of the process is not necessarily limited to the order in which the steps or acts of the process are recited.

Each embodiment disclosed herein can comprise, consist essentially of, or consist of a particular stated element, step, ingredient, or component. The term "comprise" or "comprises" means "includes, but is not limited to," and allows for the inclusion of unspecified elements, steps, ingredients, or components, even in major amounts. The phrase "consisting of" excludes any element, step, ingredient, or component that is not specified. The phrase "consisting essentially of" limits the scope of the embodiment to the specified elements, steps, ingredients, or components, and to those that do not materially affect the basic and novel characteristics of the claimed disclosure.

In the claims, as well as in the specification, all transitional phrases such as comprising," "comprised of," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, § 2111.03.2.0

DESCRIPTION 2.1 Application of Laminate (Nanolaminate) Coatings

In embodiments of the processes described herein, coatings comprising one or more metals, alloys, ceramics, etc., can be applied in a uniform or substantially uniform conformal manner to all or part of a workpiece, thereby imparting desirable chemical, physical, and mechanical (structural) properties to the workpiece (i.e., preformed part). In some embodiments, such coatings result in a minimal increase in mass, depending on the thickness of the coating as compared to the same type of article made from solid metal or ceramic.

Most commercial electrodeposition electrolytes are designed to have plating rates and alloy compositions that are relatively insensitive to variations in current density. The preparation of laminated or nanolaminated materials having a variation in the chemical composition or structure of individual layers (or types of layers), particularly from single electrolytes, however, may rely in large part on electrolytes that are sensitive to variations in current density and produce materials of differing structures, compositions, or both at different current densities. That sensitivity allows modulation of structure, composition, or both as the laminated (e.g., nanolaminated) coating is applied, leading to laminated coating architectures and their corresponding performance attributes.

Where laminated (e.g., nanolaminated) coatings are electrodeposited, however, particularly from a single electrolyte displaying current-density sensitive electrodeposition, variations in current density on the surface of the object subject to electrodeposition result in concomitant variations in layer thickness, the structure, composition, or both within each layer, and the structure, composition, or both differences between layers. Accordingly, when producing articles having electrodeposited coatings where uniformity or substantial uniformity of coating thickness, structure, and/or composition across all or a portion of the coated surface is necessary or desirable, and particularly where the coatings comprise finely controlled layering schemes (e.g., nanolamination), it is advantageous to have a uniform, substantially uniform, or at least a more uniform current distribution over the surface of the workpiece (e.g., preform), achieved through methods other than electrolyte engineering (e.g., reduced deposit sensitivity to current density).

Embodiments of methods and apparatuses are described herein for achieving a more uniform current distribution over the surface of the workpiece. Embodiments of the methods for rendering current distributions more uniformly over workpieces described herein may employ the use of Computer Assisted Design-optimized (CAD-optimized) shield and thief geometries. Such methods may be implemented in the design process by preparation of workpieces in conjunction with shields and/or thieves, including using the ability of additive manufacturing processes to prepare articles having complex shapes. "Shielding" or "shields" refers to shaped pieces of polymeric materials (e.g., acrylics) that are positioned in order to lower a current density that reaches certain areas of a workpiece. "Thieving" or "thieves" refers to a conductive material (e.g., conductive wires) that are used as auxiliary cathodes in order to draw current away from high current density areas.

The additive manufacturing process can prepare the workpiece(s) and, optionally, the shields and/or thieves in a single assembly that holds the workpiece, shields, and thieves oriented relative to each other in a configuration matching those of the CAD-optimized shield and thief geometries. Additionally, such an assembly may be electroplatable.

Alternatively, the workpiece(s) and shields and/or thieves can be prepared separately with mating interfaces that permit joining those elements into an electroplatable assembly in a configuration matching those of the CAD-optimized shield and thief geometries. The workpiece(s) and shields and/or thieves can then be assembled via the mating interfaces prior to coating.

In some embodiments, an assembly comprises one or more shields. In such embodiments, the current density uniformity on the surface of a workpiece, and, accordingly, the uniformity of the electrodeposited coating on a workpiece, may be controlled using only shield geometry and orientation. In other embodiments, the methods may employ the shield geometry as the sole path for both current and electrolyte flow to control the current density uniformity on the surface of a workpiece, and, accordingly, the uniformity of the electrodeposited coating on the workpiece.

Embodiments of the methods described herein employ agitation to increase mixing of the electrolyte at or near the workpiece surface. In some embodiments, agitation comprises mixing the electrolyte. In such embodiments, electrolyte mixing may be achieved using any suitable method (e.g., magnetic stirrers, filtration systems, pumps, ultrasound agitation, etc.). In further embodiments, agitation comprises agitation of the workpiece/assembly (e.g., by an ultrasonic transducer).

Additionally, flowing electrolyte over the surface of a workpiece can be used to accomplish transfer of the electrolyte to portion(s) of the workpiece that have lower current density during electrodeposition of a coating than other areas of the workpiece. Accordingly, flowing electrolyte is one means to reduce unequal coating thickness and/or undesired changes in the structure or composition of laminate (e.g., nanolaminate) layers. Portions of workpieces that may benefit from flowing electrolyte include, for example, those in recesses or on the interior sections of a workpiece (e.g., the interior of a workpiece comprising a tubular structure). Flowing electrolyte may be accomplished by means of one or more tubes that are positioned in an assembly (e.g., an assembly for electroplating) such that electrolyte exiting from one or more openings in the tube(s) results in increased electrolyte flow over one or more portions of the workpiece. Alternatively, increased electrolyte flow may be accomplished by pumping electrolyte through one or more passages within a framework (or section of framework) in the assembly. In some embodiments, the framework (or section thereof) is a shield. In such embodiments, the passages have one or more openings at a surface of the framework positioned such that electrolyte streaming from the openings results in the flowing of the electrolyte equally over one or more portions of the workpiece.

Embodiments of the methods described above permit the formation of coatings having a high degree of uniformity even when applied to workpieces with a complex geometry. In some embodiments, the high degree of uniformity is accomplished through the use of shields and thieves and mass transfer accomplished by mixing or flowing electrolyte. The shields and thieves may be prepared so they are oriented in a specific fashion with regard to each other, for example, by additive manufacturing either simultaneously or in separate processes. Where the shields and/or thieves are prepared as separate objects from the workpiece for the mold, they may each have mating interlaces that permit them to be joined to each other or to sections of framework that permit their assembly into an electroplatable assembly where they are oriented relative to each other. Such embodiments can enable production processes to go from raw material to end product in a single production line while producing articles with precise tolerances including coatings that have a limited variation in their thickness.

In embodiments of the processes described herein, a laminated coating (e.g., a metal coating) can be applied to all or part of a workpiece, thereby imparting desirable chemical, physical, and/or mechanical (structural) properties to the shaped workpiece, with a minimal increase in mass, especially as compared to the same type of article made from solid metal or ceramic. Such embodiments enable production processes to go from raw material to end product in a single production line. Moreover, embodiments described herein may permit entirely automated production lines and preparation of discrete parts without the preparation of intermediate castings or forming of sheet metal materials. Additionally, laminated materials (e.g., metals or alloys) can be placed only where needed, thereby reducing material consumption in the process of preparing molds and reducing the overall weight of the mold relative to molds made of the solid metal.

2.2 Preparation of Shaped Workpieces

The processes described herein may employ a workpiece comprising a variety of materials, including metals, ceramics (e.g., prepared from a preceramic polymer), and polymers (plastics). The preparation of the workpiece may be accomplished by any additive manufacturing process including one, two, three, or more of direct digital deposition, 3D printing, SLS or SLM, FDM, SLA, CLIP, cutting and/or forming of woven or non-woven fabrics, cutting and/or forming of foam sheets, or a combination thereof. Where the workpieces are formed from a polymeric material (e.g., a plastic), the workpieces may comprise one, two, three, or more types of conductive and/or non-conductive filler, carbon fiber tow ("tow"), woven fabrics, non-woven fabrics, and/or foam sheets.

In some embodiments, the process of preparing a workpiece utilize one or more of casting, rotational molding, injection molding, blow molding, extrusion molding, cutting, machining, milling, grinding, sanding, polishing, and/or abrasive blasting either alone or in conjunction with any of the above-mentioned additive manufacturing processes. Where the workpiece is prepared by shaping a polymeric material (e.g., a plastic) by one, two, or more of casting, rotational molding, injection molding, blow molding, and/or extrusion molding, the shaping process may further include one or more steps of mechanically removing of material, including one or more of cutting, milling, grinding, sanding, polishing, abrasive blasting, or a combination thereof. The mechanical removal of material may be used, among other things, for cutting and/or trimming flash (seepage at mold seams), one or more sprues from the article, and/or blast finishing.

In some embodiments, where the workpiece preparation is begun by one or more of the additive manufacturing processes (e.g., 3D printing), the workpiece is further shaped by one or more of cutting, machining, milling, abrasive blasting, grinding, sanding, and/or polishing one or more portions of the workpiece. In some embodiments, a metal workpiece is produced by 3D printing. Such a metal workpiece may then be further shaped before a laminate coating is applied.

In other embodiments, shaping the polymeric material (e.g., plastic) comprises cutting and/or forming of woven fabrics, non-woven fabrics, and/or foam sheets, which may be used as the workpiece or incorporated into a polymeric (e.g., plastic) matrix as reinforcement of a composite workpiece. In other embodiments, the workpiece comprises polymeric materials (e.g., plastic) and/or non-polymeric materials (e.g., polymerizable, thermoset plastic, or thermoplastic materials) and one or more forms of woven or non-woven reinforcing fiber (e.g., tow, woven fabrics, non-woven fabrics, and/or foam sheets). In such embodiments the woven and/or non-woven reinforcing fiber(s) may comprise 0-50% by weight of the workpiece based upon the weight of the fiber reinforcement material and the polymer material. In some embodiments, the woven and/or non-woven reinforcing fiber(s) comprise from about 0 to about 1%, from about 1 to about 5%, from about 1 to about 20%, from about 1 to about 50%, from about 5 to about 10%, from about 5 to about 25%, from about 5 to about 50%, from about 10 to about 20%, from about 10 to about 50%, from about 20 to about 30%, from about 20 to about 50%, from about 30 to about 40%, from about 30 to about 50%, or from about 40 to about 50%, by weight of the workpiece based upon the weight of the fiber reinforcement material and polymer (e.g., plastic) material. The reinforcing fiber may be comprised of mineral, glass, polymeric material, and/or graphite fibers. In still further embodiments, the fibers are in the form of a woven or non-woven material, such as tow with a length less than 1, less than 2, less than 4, less than 6, less than 8, less than 10, less than 12, less than 14, less than 16, less than 18, or less than 20 millimeters, polymeric or non-polymeric sheets, strands, ropes, woven tubes, non-woven tubes, or a combination of any of the foregoing (e.g., a series of layers). In particular embodiments, the fibers are in the form of a woven or non-woven material, selected from the group consisting of tow with a length less than 1, less than 2, less than 4, less than 6, less than 8, less than 10, less than 12, less than 14, less than 16, less than 18, or less than 20 millimeters, polymeric or non-polymeric sheets, strands, ropes, woven tubes, non-woven tubes, or a combination of any of the foregoing (e.g., a series of layers). Where the reinforcing fiber material is polymeric (e.g., plastic), it may have a Vicat softening point greater than 150° C., greater than 175° C., greater than 200° C., greater than 225° C., greater than 250° C., greater than 275° C., greater than 300° C., or greater than 325° C. as assessed under ASTM D1525-09 (2009).

In some embodiments, forming of woven fabrics, non-woven fabrics, and/or foam sheets comprises forming and/or layering two, three, four, or more layers of woven fabrics, non-woven fabric, and/or foam sheets to form a workpiece.

Workpieces of polymeric (e.g., plastic) materials that can be prepared by additive manufacturing processes can be broadly divided into two categories: conductive and non-conductive. Where a workpiece is prepared from non-conductive materials (e.g., non-conductive plastics), at least the portion of surface upon which electrodeposition will occur should be made conductive. This is typically accomplished by applying a layer of metal using, for example, electroless plating. As is understood by one of skill in the art, other methods that achieve the desired result may be employed (e.g., vacuum deposition of a seed layer). Where a material (e.g., a plastic) that is used to make a workpiece is already conductive, the use of electroless plating is optional, but it may be advantageously employed to increase the conductivity of the workpiece before subjecting it to electrodeposition (e.g., with a metal). In further examples, a material used to make a workpiece may be partially conductive. Again, it may be advantageous to employ an electroless plating step to increase the conductivity of the workpiece prior to electrodeposition.

In embodiments, methods of electrodepositing a coating (e.g., comprising a metal) on at least a portion of a surface of a workpiece that is accessible to liquids, the surface is conductive and brought in contact with a bath containing the element(s) (e.g., salts of metal(s)) to be electrodeposited.

In some embodiments, in order to apply a nanolaminate coating onto a workpiece made of polymeric material, a seed layer is first coated onto the polymeric material of the workpiece. A "seed layer" is a very thin conductive layer that is deposited on a workpiece using a high current density and an electrolyte solution with a low ion concentration. In embodiments, a conductive material used for a seed layer is Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, Zr, or alloys thereof.

In embodiments, the surface of a non-conductive workpiece is made conductive by subjecting the surface to electroless plating of a metal such as nickel, cadmium, gold, silver, rhodium, chrome, zinc, tin, or copper. In some embodiments, the metal applied to the workpiece by electroless deposition is nickel. In some embodiments, the metal applied to the workpiece by electroless deposition is copper.

Preparation of a workpiece for electroless plating, particularly of a non-conductive polymer workpiece, may include a step of etching their surfaces. Etching is typically accomplished by using a strong oxidizing agent to create microscopic pores or holes in the surface of the polymeric material. The pores or holes increase the surface area and improve adhesion of subsequently applied metal layer(s). Some strong oxidizing solutions/suspensions used as etchants include peroxides (e.g., hydrogen peroxide), persulfates, chromic acid, acidic or basic permanganate solutions, chromium trioxide solutions or suspensions, and sulfuric acid. In embodiments, the workpiece comprises ABS and the etchant is chromic acid or chromium trioxide containing solution/suspension.

Following etching, at least a portion of the etched section may be contacted with a composition that deposits a metallic catalyst on the etched surface of the polymeric workpiece. The catalyst is typically palladium, which can be applied using tin as a reducing agent (e.g., $Sn^{+2}+Pd^{+2}=>Sn^{+4}\ Pd^{0}$); however, other catalysts including noble metal catalysts may be used (e.g., platinum, rhodium, iridium, nickel, copper, silver, or gold). Upon contact with the electroless plating bath, the catalyst causes a layer of metal to form on the surface of the polymeric workpiece exposed to the catalyst and then the bath.

Prior to electrodeposition of metal onto the surface of the workpiece, it is necessary to remove any of the residual electroless plating materials from the workpiece so that they do not interfere with the plating or become trapped in the workpiece. Removal of the electroless bath components may be accomplished using any suitable methods, e.g., by submersing the components in a bath or shower of cleaning solution (e.g., water). In some embodiments, the components are exposed to a bath or shower of cleaning solution while exposing the workpiece to sonication. The sonication may employ sound energy at any frequency and amplitude that is effective. In some embodiments the frequency employed is from about 18 to about 1000 kHz. In some embodiments, the frequency employed is, e.g., from about 18 to about 25 kHz, from about 25 to about 50 kHz, from about 50 to about 75 kHz, from about 75 to about 100 kHz, from about 100 to about 200 kHz, from about 200 to about 300 kHz, from about 300 to about 400 kHz, from about 400 to about 500 kHz, from about 500 to about 600 kHz, from about 600 to about 700 kHz, from about 700 to about 800 kHz, from about 800 to about 900 kHz, or from about 900 to about 1000 kHz. In other embodiments, the frequency is from about 20 to about 23 kHz. In some embodiments, sonication is pulsed using a square or rectangular wave, resulting in frequency-rich excitations of the workpiece. In some embodiments, the sonication is performed in a bath with a continuous flow of cleaning liquid flowing into the bath.

2.3 Plastic and Polymeric Materials Used to Prepare Shaped Workpieces and Molds

In some embodiments the plastic or polymeric material from which the workpiece is prepared may comprise one, two, three, or more of arylamides, acrylamides, polybenzimidazole (PBI), polyetherimide, polyetherketoneketone (PEKK), polyether ether ketone (PEEK), polyamide, polyimide, polyamide-imides, polyphenylene oxide (PPO), polystyrene (PS), polyphenylene oxide (PPO) and polystyrene (PS), polyphthalamide (PPA), polyvinyl alcohol (PVA), acrylonitrile butadiene styrene (ABS), polycarbonate (PC), polylactic acid (PLA), PC/ABS, cellulose fiber, polyphenylsulfone (PPSU), thermosets, PBI-PEEK, urea, epoxies, cyanate esters, polyurethanes, or a combination of any one or more, two or more, or three or more of the foregoing. In particular, a polyurethane may have an elongation at break ranging from about 250% to about 315% and/or a Young's Modulus of about 600 to about 850 MPa. Examples of some materials useful for preparing a shaped workpiece that can be used to form a mold are provided in the Table 1.

TABLE 1

| Polymer Class | Subclass | Commercial Example | Typical Melting/Decomposition Point and Comments |
|---|---|---|---|
| Polyamide | Nylon | Nylon 618 Nylon 11 EX | |
| PPA | | ZYTEL | 310° C. |
| Polyetherimide | | ULTEM | 219° C. (426° F.) |
| Polyimide | | VESPEL | 300° C. (570° F.) Continuous Max. Operating Temperature: 288° C. (SP-1) |
| Polyamide-imides | | TORLON | |
| polyphenylene sulfide | | RYTON/ TECHTRON | 285° C. (545° F.). long-term resistance up to 200° C. (392° F.) and short-term temperature resistance up to 260° C. (500° F.) |
| PPO and PS | | NORYL | |
| arylamides | para-aramid | Technora Twaron Heracron | |
| arylamides | meta-aramid | Nomex | Melting point: 348° C. |
| PBI | | Celazole ® | |
| PBI-PEEK | | Celazole ® TKL-60 | |

In various embodiments, a workpiece comprising a polymeric material includes an additive, such as carbon black (e.g., from about 1% to about 5% by weight), graphene (e.g., PLA-Graphene printing filament), graphite, carbon nanotubes, carbon nanofibers, or graphite fibers. Additionally, in some embodiments, a workpiece comprising a polymeric material of the present disclosure further includes a metal additive (e.g., Ag, Al, Au, B, Be, Co, Cr, Cu, Fe, Hg, In, Ir, Mg, Mn, Mo, Nb, Nd, Ni, Pd, Pt, Re, Rh, Sb, Sn, Pb, Ta, Ti, W, V, Zn, Zr, or alloys thereof). In further embodiments, a metal additive is included in a concentration ranging from about 1% to about 50% by weight.

In other embodiments, the workpiece comprises a conductive polymeric material (e.g., a plastic) having a volume resistance of less than 0.1 ohms cm (e.g., from about $10^{-1}$ to about $10^{-7}$, from about $10^{-1}$ to about $10^{-2}$, from about $10^{-2}$ to about $10^{-3}$, from about $10^{-3}$ to about $10^{-5}$, from about $10^{-5}$ to about $10^{-7}$, or less than about $10^{-7}$ ohm cm), according to ASTM D257-14, or a partially-conductive polymeric material with a volume resistance greater than about 0.1 ohm cm and less than about $10^6$ ohms cm (e.g., from about $10^{-1}$ to about $10^6$, from about $10^{-1}$ to about $10^2$, from about 1 to about $10^2$, from about $10^2$ to about $10^5$, from about $10^5$ to about $10^6$), according to ASTM D257-14. In such embodiments the conductive or partially conductive polymeric materials from which the workpiece is prepared may comprise carbon black (e.g., from about 1 to about 5% by weight) or graphene (e.g., PLA-Graphene printing filament 0.6 ohm cm, Black Magic 3D, Calverton, NY), graphite, carbon nanotubes, carbon nanofibers, or graphite fibers, which can be added to the polymers alone or in combination with conductive metallic materials. In other embodiments, the polymeric (e.g., plastic) material from which the workpiece is shaped, and accordingly, the workpiece, comprise one, two, three or more conductive or nonconductive polymeric material, and one, two, three or more metals or non-metallic conductive materials (e.g., as a powder and/or fibers) added to the polymeric material that render the composition conductive or more conductive. In some embodiments, the conductive materials (e.g., metals) are added to the polymeric material before curing. In other embodiments, the conductive materials (e.g., metals) are added to the polymeric materials after curing. In such embodiments, the one or more metals may be selected from the group consisting of Ag, Al, Au, Be, Co, Cr, Cu, Fe, Hg, In, Mg, Mn, Mo, Nb, Nd, Ni, Pd, Pt, Re, Rh, Sb, Sn, Mn, Pb, Ta, Ti, W, V, Zn, Zr, and alloys of any two, three, or more thereof. In other embodiments, the one or more metals may be an alloy (e.g., an alloy, such as steels, stainless steels, brass, bronze, nickel-cobalt, nickel-chromium, nickel-iron, zinc-iron, cobalt-chrome, tin-based pewters, and alloys of tungsten). In some such embodiments, the one or more metals may be an alloy selected from the group consisting of steels, stainless steels, brass, bronze, Ni—Co, Ni—Cr, Ni—Fe, Zn—Fe, cobalt-chrome, tin-based pewters, and alloys of tungsten.

Examples of conductive non-metallic materials that can be added to polymeric materials (with or without one or more metals) to increase their conductivity include carbon black, graphene, graphite, carbon nanotubes, carbon nanofibers, and/or graphite fibers, which can be added to the polymers alone or in combination with conductive metallic materials.

Where the workpiece is non-conductive, the material may have a volume resistance greater than about $10^6$, greater than about $10^7$, greater than about $10^{10}$, greater than about $10^{15}$, or greater than about $10^{18}$ according to ASTM D257.

In some embodiments, the polymeric workpiece may have a melting, softening, or decomposition point greater than about 150° C., greater than about 175° C., greater than about 200° C., greater than about 225° C., greater than about 250° C., greater than about 275° C., or greater than about 300° C. In still further embodiments, the plastic or polymeric material has a Vicat softening point greater than about 150° C., greater than about 175° C., greater than about 200° C., greater than about 225° C., or greater than about 250° C., as assessed under ASTM D1525-09 (2009).

2.4 Laminate Coatings

The laminated metal coating applied to the polymeric workpiece may comprise layers deposited by one, two, or more of vapor phase deposition, vacuum deposition, electroless deposition, electrophoretic deposition, and/or electrochemical deposition (i.e., electrodeposition or electroplating) to form the laminated metal coating.

In embodiments, laminate coatings are deposited using electrodeposition. In some embodiments, metals, polymers, and semiconductors are electroplated, and, in most cases, electrodeposition takes place at or near ambient temperature and pressure. Embodiments of the processes described herein include methods of electrodepositing a laminated coating comprising one or more metals on a workpiece prepared by additive manufacturing, wherein the process comprises:

optionally subjecting all or part of the workpiece to electroless plating;
providing a bath including at least one electrodepositable metal (e.g., metal ion, or complexed metal ions);
contacting all or part of the workpiece with the bath; and
applying voltage or current to the workpiece to deposit at least one (e.g., two, three, four, or more) electrodepositable component(s) comprising a metal.

The process may further comprise polishing the laminated coating. Polishing may be accomplished mechanically (e.g., with a fine abrasive), and/or by electropolishing.

In some embodiments, the bath comprises at least two, at least three, or at least four electrodepositable components. In some embodiments, the electrodepositable components include metal salts (e.g., metal ions, or complexed metal ions) from which metals may be electroplated onto the workpiece. In embodiments where the bath comprises more than one metal salt as an electrodepositable component, alloys of varying composition may be electrodeposited on the workpiece depending on the current and voltage applied.

In some embodiments, the method of electrodepositing comprises applying a time varying current density. In such embodiments, the time varying current density oscillates (varies) for at least two, at least three, at least four, or at least five cycles to deposit a structurally and/or compositionally modulated material on the workpiece. In some embodiments, at least two, three, or four types of cycles differing in applied voltage, current, frequency, plating pulse length, off period, reverse pulse length are used. In further embodiments, at least two, three, or four types of cycles with different types of wave forms are used. In some such embodiments, the different wave forms also differ in applied voltage, current, frequency, plating pulse length, off period, reverse pulse length. In further embodiments, the structurally and/or compositionally modulated material is deposited using one, two, or more of potentiostatic, galvanostatic, pulse current, pulse reverse current, modulated current, modulated frequency, and continuous transitioned current electroplating. In particular embodiments, the structurally and/or compositionally modulated material is deposited using potentiostatic, galvanostatic, pulse current, pulse reverse current, modulated current, modulated frequency, or continuous transitioned current electroplating.

In embodiments, individual laminate layers differ in one, two, three, or more of chemical (elemental) composition, grain size, defect density, grain orientation, the presence of intermetallic compositions, and the presence of amorphous metallic glass compositions. In some embodiments, the individual laminate layers are of a modulated metal or metal alloy material. In further embodiments, the layers comprise a "fine-grained" or "ultrafine-grained" metal or metal alloy having an average grain size selected independently for any one, two, three, four, five, six, or more layers from a range from about 1 nm to about 5,000 nm (e.g., from about 1 nm to about 20, from about 1 nm to about 100, from about 5 nm to about 50, from about 5 nm to about 100, from about 5 nm to about 200, from about 10 nm to about 100, from about 10 nm to about 200, from about 20 nm to about 200, from about 20 nm to about 250, from about 20 nm to about 500, from about 50 nm to about 250, from about 50 nm to about 500, from about 100 nm to about 500, from about 200 nm to about 1,000, from about 500 nm to about 2,000, or from about 1,000 nm to about 5,000 nm) based on the measurement of the largest dimension of grains present in micrographs. In embodiments, the maximum grain size is less than or equal to the individual layer thickness.

Fine-grained metals and alloys may have a high degree of twinning between metal grains, and remain ductile while having one or more properties (e.g., increased hardness, tensile strength, and corrosion resistance relative to an electrodeposited metal or alloy of the same composition with a grain size from about 5,000 nm to about 20,000 nm or greater). In embodiments, having a "high degree" of twinning between grains means that the laminate coating has a higher degree of twinning between grains than a control homogeneous coating having the average composition (i.e., the same collective weighted average of each component) of the laminate coating. In other embodiments, a "high degree" of twinning between grains refers to twinning ranging from about 30% to about 70%.

In some embodiments, the fine-grained metals and alloys have a high degree of twinning between metal grains, and remain ductile while having one or more properties selected from increased hardness, tensile strength, and corrosion resistance relative to an electrodeposited metal or alloy of the same composition with a grain size greater than about 5,000. In some embodiments, the fine-grained metals and alloys have a high degree of twinning between metal grains, and remain ductile while having one or more properties selected from increased hardness, tensile strength, and corrosion resistance relative to an electrodeposited metal or alloy of the same composition with a grain size from about 5,000 to about 20,000 nm. In particular embodiments, the property is increased hardness. In further embodiments, the property is increased tensile strength. In still further embodiments, the property is increased corrosion resistance.

An interface between individual layers may be discrete or diffuse. A structural and/or compositionally modulated laminate materials may be applied such that the layers of the laminate have a discrete interface, or a diffuse interface where the composition changes from a first composition to a second composition over a distance from about 3 nm to about 8 nm, about 5 nm to about 10 nm, about 7 nm to about 15 nm, or about 10 nm to about 20 nm. In some embodiments, individual laminate layers are less than about 100 microns, less than about 10 microns, less than about 1 microns, less than about 0.1 microns, or less than about 0.01 microns thick.

An interface between the neighboring layers is considered to be "discrete" if the composition shifts between a first layer and a second layer over a distance that is less than about 20% of a thickness of the thinner of the two layers. In embodiments, an interface between neighboring layers is considered to be discrete if the composition shifts between a first layer and a second layer over a distance that is less than about 15%, about 10%, about 8%, about 5%, about 4% or about 2% of a thickness of the thinner of the layers.

In embodiments, an interface is "diffuse" if the composition shifts between a first layer and a second layer over a more than about 20% of the thickness of a thinner of the two layers. In other embodiments, layers have diffuse interfaces where the compositions vary from that of a first composition to a second composition in a continuous manner. In some embodiments, the composition of material in the diffuse interface varies between the compositions of the first and second layer over a distance that is greater than about 20%, about 25%, about 30%, about 35%, about 40%, about 45%, and less than or equal to 50% of the thickness of the thinner of the layers. In embodiments, an interface between neighboring layers is considered to be diffuse if the composition shifts between a first layer and a second layer over a distance that is more than about 15%, about 10%, about 8%, about 5%, about 4%, or about 2% of a thickness of the thinner of the layers.

In embodiments, a diffuse interface has a composition shift between a first layer and a second layer over a thickness in a range of about 0.5 nm to about 5 nm. In some embodiments, a diffuse interface has a thickness in a range of about 0.5 nm to about 3 nm, about 1 nm to about 4 nm, or about 2 nm to about 5 nm. In further embodiments, a diffuse interface has a thickness in a range of about 0.5 nm to about 1 nm, about 1 nm to about 2 nm, about 2 nm to 3 nm, from about 3 nm to about 4 nm, or from about 4 nm to about 5 nm.

In an embodiment, the laminated metal coating comprises at least a first type of layer comprising first type of metal or metal alloy and second type of layer comprising a second type of metal or metal alloy, wherein the first type of metal or metal alloy is different from the second type of metal or metal alloy. In some embodiments, a first layer comprises a first alloy and a second layer comprises a second alloy, where the first alloy comprises a first and a second metal a first proportion, and the second alloy comprises the same first and second metal in a second proportion.

In various embodiments, a laminated coating that is deposited onto the workpiece may have layers varying in their constituent elements. In some embodiments, the coatings comprise, one, two, three, four, or more different types of layers with one, two, three, four, or more different elements (or differing amounts of elements) selected independently for each layer. In such embodiments, the elements comprise silver (Ag), aluminum (Al), gold (Au), boron (B), beryllium (Be), carbon (C), cobalt (Co), chromium (Cr), copper (Cu), iron (Fe), mercury (Hg), indium (In), iridium (Ir), magnesium (Mg), manganese (Mn), molybdenum (Mo), niobium (Nb), neodymium (Nd), nickel (Ni), phosphorous (P), palladium (Pd), platinum (Pt), rhenium (Re), rhodium (Rh), antimony (Sb), silicon (Si), tin (Sn), lead (Pb), tantalum (Ta), titanium (Ti), tungsten (W), vanadium (V), zinc (Zn), zirconium (Zr), or a combination thereof. In some embodiments, each layer of a laminate coating independently includes at least 0.01% (w/w) of Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, Zr, or a combination thereof. Each electrodepositable species may be present in a layer of a laminate coating in a concentration of at least about 0.1%, about 0.05%, about 0.01%, about 0.005%, or about 0.001% by weight. In such embodiments, two or more, three or more, or four or more different elements that can be electrodeposited comprise, for example, Zn and Fe; Zn and Ni; Co and Ni; Ni and Fe; Ni and Cr; Ni and Al; Cu and Zn; Cu and Sn; Ni, Co, and P; Ni, Co, W, and P; Ni, Co, and W; Ni and W; Ni, W, and P; Ni, Co, and B; Ni, Co, W, and B; or Ni, W, and B.

In other embodiments, the laminated coating deposited onto the workpiece has one, two, three, four, or more types of layers comprising one or more, two or more, or three or more, different elements (or differing amounts of elements) independently selected from Ag, Al, Au, Be, C, Cr, Cu, Fe, Hg, In, Mg, Mn, Mo, Nb, Nd, Ni, Pd, Pt, Re, Rh, Sb, Sn, Mn, Pb, Ta, Ti, W, V, Zn, and Zr, wherein each of said independently selected elements (e.g., metals) is present at least about 0.1%, at least about 0.05%, at least about 0.01%, at least about 0.005%, or at least about 0.001% by weight. In such embodiments, compositions of two or more different elements that can be electrodeposited comprise, for example, Zn and Fe, Zn and Ni, Co and Ni, Ni and Fe, Ni and Cr, Ni and Al, Cu and Zn, or Cu and Sn. In some such embodiments, the laminated metal coating comprises layers of Co and Ni in different proportions.

In particular embodiments, a layer of a laminate coating comprises monocrystalline Co. In some embodiments, a layer of a laminate coating comprises aluminum. In further embodiments, a layer of a laminate coating comprises Ni or Cr. In particular embodiments, a layer of a laminate coating comprises Ni, Fe, and Cr. In some embodiments, a layer of a laminate coating comprises Ni, Fe, Cr, and Mo.

In some embodiments, each layer of a laminate coating comprises two or more, three or more, four or more, or five or more different electrodepositable species. Illustrative alloys that may be used in a layer of a laminate coating comprise Zn and Fe; Zn and Ni; Co and Ni; Ni, Co, and Mo; Ni and Fe; Ni and Cr; Cu and Zn; Cu and Sn; Ni, Co, and P; Ni, Co, W, and P; Ni, Co, and W; Ni and W; Ni, W, and P; Ni, Co, and B; Ni, Co, W, and B; or Ni, W, and B. In specific embodiments, an alloy used in a layer of a laminate coating includes Ni and Fe; or Ni and Co. In still further embodiments, a layer of a laminate coating comprises three or more, four or more, or five or more of Co, Cr, Mo, W, Fe, Si, Mn, and Ni.

In embodiments, a first layer and a second layer of a laminate coating comprise a first alloy and a second alloy, respectively, which comprise the same first and second metals. In some embodiments, a difference between a concentration of a first metal in a first alloy and a first metal in a second alloy is less than about 10%, about 20%, about 30%, or about 50%, by weight. In further embodiments, a difference between a concentration of a first metal in a first alloy and a first metal in a second alloy is more than about 1%, about 2%, about 5%, or about 10%, by weight.

In particular embodiments a first layer of a laminate coating includes Ni in a concentration ranging from about 50% to about 99%, by weight. In some embodiments, a first layer of a laminate coatings includes Ni in a concentration greater than about 50%, about 55%, about 60%, about 65%, about 70%, about 75%, about 80%, about 85%, about 90%, about 92%, about 93%, about 94%, about 95%, about 96%, about 97%, about 98%, or about 99%, by weight. In some embodiments, a first layer of a nanolaminate coatings includes Ni in a concentration less than about 50%, about 55%, about 60%, about 65%, about 70%, about 75%, about 80%, about 85%, about 90%, about 92%, about 93%, about 94%, about 95%, about 96%, about 97%, about 98%, or about 99%, by weight.

In certain embodiments, a second layer of a nanolaminate coating includes Co in a concentration ranging from about 5% to about 35%, by weight. In further embodiments, the second layer includes Co in a concentration ranging from about 5% to about 10%, from about 10% to about 15%, from about 15% to about 20%, from about 20% to about 25%, from about 25% to about 30%, or from about 30% to about 35%, by weight.

In embodiments, a layer of a nanolaminate coating comprises Cr in a concentration ranging from about 5% to about 99%, by weight. In some embodiments, a layer of a nanolaminate coating includes Cr in a concentration greater than about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 92%, about 93%, about 94%, about 95%, about 96%, about 97%, about 98%, or about 99%, by weight. In some embodiments, a layer of a nanolaminate coating includes Cr in a concentration less than about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 92%, about 93%, about 94%, about 95%, about 96%, about 97%, about 98%, or about 99%, by weight.

In embodiments, a layer of nanolaminate coating comprises Cr in a concentration ranging from about 5% to about 35%, by weight, a layer of nanolaminate coating comprises Ni in a concentration of greater than about 90%, by weight, or both. In further embodiments, a layer of nanolaminate coating comprises Ni in a concentration ranging from about 20% to about 50%, by weight, Cr in a concentration ranging from about 20% to about 35%, by weight, and Mo in a concentration great than about 1.5%, by weight. In some embodiments, a layer of a nanolaminate coating comprises Cr in a concentration greater than about 7%, by weight, Mo in a concentration ranging from about 5% to about 30%, by weight, W in a concentration less than about 3%, by weight, Fe in a concentration ranging from about 1.5% to about 15%, by weight, Si in a concentration less than 1%, by weight, Mn in a concentration less than 3%, by weight, and a balance of Ni.

In still further embodiments, the composition electrodeposited onto the workpiece comprises layers that comprise, consists essentially of, or consists of two or more, three or more, or four or more elements selected independently for each layer from the group consisting of: NiCr, NiFe, NiCo, NiCrCo, NiAl, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiNb, NiCrNb, NiFeNb, NiCoNb, NiCrCoNb, NiTi, NiCrTi, NiFeTi, NiCoTi, NiCrCoTi, NiCrP, NiCrAl, NiCoP, NiCoAl, NiFeP, NiFeAl, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi, and FeCrB. The fact that each element is the preceding groupings is recited only once does not reflect on the stoichiometry of elements that may be present in layers (e.g., layers comprising alloys of Ni and Cr can have varying ratios of nickel and chromium), In some embodiments, all of the layers of the coating are comprised of the same elements, and the coating comprises two or more, three or more, or four or more types of layers that vary in the proportion of the elements.

In some embodiments, the coefficient of thermal expansion of the metal or alloy from which one or more (e.g., one, two, three, four, or more, or all) types of layers in the laminated metal coating and the coefficient of thermal expansion of the plastic or polymeric material from which the workpiece was formed differ by less than 20%, 15%, 10%, 5%, or 2% at one, two, three, four, or each temperature over the range of 100° C. to 300° C. In still further embodiments, the coefficient of thermal expansion of the metal or alloy from which one or more (e.g., one, two, three, four, or more, or all) types of layers in the laminated metal coating and the coefficient of thermal expansion of the plastic or polymeric material from which the workpiece was formed, differ by less than 15%, 10%, 7.5%, 5%, or 2% at one, two, three, four, or each temperature over the range of 100° C. to 200° C.

In some embodiments, the coefficient of thermal expansion of metal or alloy from which a first type of layer and a second type of layer in the laminated metal coating differ by less than 20%, 15%, 10%, 5%, or 2% at one, two, three, four, or each temperature over the range of 100° C. to 300° C. In other embodiments, the coefficient of thermal expansion of metal or alloy from which a first type of layer and a second type of layer in the laminated metal coating differ by less than 15%, 10%, 7.5%, 5%, or 2% at one, two, three, four, or each temperature over the range of 100° C. to 200° C.

In some embodiments, the laminated metal coating composition applied to (e.g., electrodeposited onto) the workpiece comprises a structurally and/or compositionally modulated electrodeposited material or composition. The structurally and/or compositionally modulated composition may comprise at least one portion having a plurality of layers deposited with wavelengths ranging from about 1 nm and about 250 nm, about 1 nm and about 25 nm, about 5 nm and about 50 nm, about 5 nm and about 75 nm, about 10 nm and about 75 nm, about 10 nm and about 150 nm, about 20 nm and about 200 nm, about 50 nm and about 150 nm, about 50 nm and about 225 nm, 100 nm and about 250 nm, and about 150 nm and about 250 nm.

In other embodiments, the structurally and/or compositionally modulated laminate coating applied to the workpiece has at least one portion consisting of a plurality of layers, wherein each of said layers has a thickness in a range selected independently from about 5 nm to about 250 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, from about 200 nm to about 225 nm, from about 220 nm to about 250 nm, or from about 150 nm to about 250 nm. Each layer has a thickness in a range selected independently from about 5 nm to about 250 nm. In embodiments, each layer has a thickness in a range selected independently from about 5 nm to about 100 nm, from about 50 nm to about 150 nm, from about 100 nm to about 200 nm, or from about 150 nm to about 250 nm. In further embodiments, each layer has a thickness in a range selected independently from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, from about 200 nm to about 225 nm, from about 200 nm to about 250 nm, from about 220 nm to about 250 nm, or from about 150 nm to about 250 nm.

As described above, where the laminated metal coating applied to all or part of the workpiece comprises two or more structurally and/or compositionally different layers, the layers may have a discrete or diffuse interface.

In embodiments where the laminated metal coating applied to all or part of the workpiece comprises two or more structurally and/or compositionally different layers, the composition may comprise a plurality of alternating first layers and second layers. The coating may consist entirely of the alternating first and second layers, which may have discrete or diffuse interfaces between the layers. Alternatively, one or more additional layers may be present in the coating between any first and second layer.

In embodiments where the laminate coating applied to all or part of the workpiece comprises a plurality of layers (e.g., first layers and second layers or alternating first and second layers), the coating applied to all or part of the workpiece (e.g., as a conformal coating or partial coating) may comprise 2 or more, 3 or more, 4 or more, 6 or more, 8 or more, 10 or more, 20 or more, 40 or more, 50 or more, 100 or more, 200 or more, 500 or more, 1,000 or more, 1,500 or more, or 2,000 or more layers (e.g., alternating first and second layers).

In some embodiments, where a plurality of first and second layers are present in the laminated coating applied to all or part of the workpiece, the first layers each comprise nickel in a range independently selected from about 1% to about 5%, from about 5% to about 7%, from about 7% to about 10%, from about 10% to about 15%, from about 15% to about 20%, from about 20% to about 30%, from about 30% to about 40%, from about 40% to about 50%, from about 50% to about 55%, from about 55% to about 60%, from about 60% to about 65%, from about 65% to about 70%, from about 70% to about 75%, from about 75% to about 80%, from about 80% to about 85%, from about 85% to about 90%, from about 90% to about 92%, from about 92% to about 93%, from about 93% to about 94%, from about 94% to about 95%, from about 95% to about 96%, from about 96% to about 97%, from about 97% to about 98%, or from about 98% to about 99%, the balance of which comprises cobalt and/or chromium. In such embodiments, each second layer comprises chromium and/or cobalt in a range independently selected from about 1% to about 35%, from about 1% to about 3%, from about 2% to about 5%, from about 5% to about 10%, from about 10% to about 15%, from about 15% to about 20%, from about 20% to about 25%, from about 25% to about 30%, or from about 30% to about 35%, the balance of which comprises nickel.

In some embodiments, where a plurality of first and second layers are present in the laminated coating applied to all or part of the workpiece, the first layers each comprise nickel in a range independently selected from about 1% to about 5%, from about 5% to about 7%, from about 7% to about 10%, from about 10% to about 15%, from about 15% to about 20%, from about 20% to about 30%, from about 30% to about 40%, from about 40% to about 50%, from about 50% to about 55%, from about 55% to about 60%, from about 60% to about 65%, from about 65% to about 70%, from about 70% to about 75%, from about 75% to about 80%, from about 80% to about 85%, from about 85% to about 90%, from about 90% to about 92%, from about 92% to about 93%, from about 93% to about 94%, from about 94% to about 95%, from about 95% to about 96%, from about 96% to about 97%, from about 97% to about 98%, or from about 98% to about 99%, the balance of which comprises aluminum. In such embodiments, each second layer comprises aluminum in a range independently selected about from 1% to about 35%, from about 1% to about 3%, from about 2% to about 5%, from about 5% to about 10%, from about 10% to about 15%, from about 15% to about 20%, from about 20% to about 25%, from about 25% to about 30%, or from about 30% to about 35%, the balance of which comprises nickel.

In some embodiments, where a plurality of first and second layers are present in the laminated coating applied to all or part of the workpiece, the first layers each comprise nickel in a range independently selected from about 1% to about 5%, from about 5% to about 7%, from about 7% to about 10%, from about 10% to about 15%, from about 15% to about 20%, from about 20% to about 30%, from about 30% to about 40%, from about 40% to about 50%, from about 50% to about 55%, from about 55% to about 60%, from about 60% to about 65%, from about 65% to about 70%, from about 70% to about 75%, from about 75% to about 80%, from about 80% to about 85%, from about 85% to about 90%, from about 90% to about 92%, from about 92% to about 93%, from about 93% to about 94%, from about 94% to about 95%, from about 95% to about 96%, from about 96% to about 97%, from about 97% to about 98%, or from about 98% to about 99%, the balance of which comprises aluminum and/or cobalt. In such embodiments, each second layer comprises aluminum and/or cobalt in a range independently selected from about 1% to about 35%, from about 1% to about 3%, from about 2% to about 5%, from about 5% to about 10%, from about 10% to about 15%, from about 15% to about 20%, from about 20% to about 25%, from about 25% to about 30%, or from about 30% to about 35%, the balance of which comprises nickel.

In some embodiments, where a plurality of first and second layers are present in the laminated coating applied to all or part of the workpiece, the first layers each comprise nickel in a range independently selected from about 1% to about 5%, from about 5% to about 7%, from about 7% to about 10%, from about 10% to about 15%, from about 15% to about 20%, from about 20% to about 30%, from about 30% to about 40%, from about 40% to about 50%, from about 50% to about 55%, from about 55% to about 60%, from about 60% to about 65%, from about 65% to about 70%, from about 70% to about 75%, from about 75% to about 80%, from about 80% to about 85%, from about 85% to about 90%, from about 90% to about 92%, from about 92% to about 93%, from about 93% to about 94%, from about 94% to about 95%, from about 95% to about 96%, from about 96% to about 97%, from about 97% to about 98%, or from about or 98% to about 99%, the balance of which comprises iron. In such embodiments, from about each second layer comprises iron in a range independently selected from about 1% to about 35%, from about 1% to about 3%, from about 2% to about 5%, from about 5% to about 10%, from about 10% to about 15%, from about 15% to about 20%, from about 20% to about 25%, from about 25% to about 30%, or from about or 30% to about 35%, the balance of which comprises nickel.

In some embodiments, where a plurality of first and second layers are present in the laminated coating applied to all or part of the workpiece, the first layers each comprise zinc in a range independently selected from about 1% to about 5%, from about 5% to about 7%, from about 7% to about 10%, from about 10% to about 15%, from about 15% to about 20%, from about 20% to about 30%, from about 30% to about 40%, from about 40% to about 50%, from about 50% to about 55%, from about 55% to about 60%, from about 60% to about 65%, from about 65% to about 70%, from about 70% to about 75%, from about 75% to about 80%, from about 80% to about 85%, from about 85% to about 90%, from about 90% to about 92%, from about 92% to about 93%, from about 93% to about 94%, from about 94% to about 95%, from about 95% to about 96%, from about 96% to about 97%, from about 97% to about 98%, or from about or 98% to about 99%, the balance of which comprises iron. In such embodiments, each second layer comprises iron in a range independently selected from about 1% to about 35%, from about 1% to about 3%, from about 2% to about 5%, from about 5% to about 10%, from about 10% to about 15%, from about 15% to about 20%, from about 20% to about 25%, from about 25% to about 30%, or from about 30% to about 35%, the balance of which comprises zinc.

In some embodiments, where a plurality of first and second layers are present in the laminated coating applied to all or part of the workpiece, the first layers each comprise copper in a range independently selected from about 1% to about 5%, from about 5% to about 7%, from about 7% to about 10%, from about 10% to about 15%, from about 15% to about 20%, from about 20% to about 30%, from about 30% to about 40%, from about 40% to about 50%, from about 50% to about 55%, from about 55% to about 60%, from about 60% to about 65%, from about 65% to about 70%, from about 70% to about 75%, from about 75% to about 80%, from about 80% to about 85%, from about 85% to about 90%, from about 90% to about 92%, from about 92% to about 93%, from about 93% to about 94%, from about 94% to about 95%, from about 95% to about 96%, from about 96% to about 97%, from about 97% to about 98%, or from about 98% to about 99%, the balance of which comprises zinc and/or tin. In such embodiments, each second layer comprises zinc and/or tin in a range independently selected from about 1% to about 35%, from about 1% to about 3%, from about 2% to about 5%, from about 5% to about 10%, from about 10% to about 15%, from about 15% to about 20%, from about 20% to about 25%, from about 25% to about 30%, or from about 30% to about 35%, the balance of which comprises copper.

In some embodiments, where a plurality of first and second layers are present in the laminated coating applied to all or part of the workpiece, the first layers each comprise zinc in a range independently selected from about 1% to about 5%, from about 5% to about 7%, from about 7% to about 10%, from about 10% to about 15%, from about 15% to about 20%, from about 20% to about 30%, from about 30% to about 40%, from about 40% to about 50%, from about 50% to about 55%, from about 55% to about 60%, from about 60% to about 65%, from about 65% to about 70%, from about 70% to about 75%, from about 75% to about 80%, from about 80% to about 85%, from about 85% to about 90%, from about 90% to about 92%, from about 92% to about 93%, from about 93% to about 94%, from about 94% to about 95%, from about 95% to about 96%, from about 96% to about 97%, from about 97% to about 98%, or from about 98% to about 99%, the balance of which comprises iron. In such embodiments, each second layer comprises iron in a range independently selected from about 1% to about 35%, from about 1% to about 3%, from about 2% to about 5%, from about 5% to about 10%, from about 10% to about 15%, from about 15% to about 20%, from about 20% to about 25%, from about 25% to about 30%, or from about 30% to about 35%, the balance of which comprises zinc.

In some embodiments, where a plurality of first and second layers are present in the laminated coating applied to all or part of the workpiece, the first layers each comprise copper in a range independently selected from about 1% to about 5%, from about 5% to about 7%, from about 7% to about 10%, from about 10% to about 15%, from about 15% to about 20%, from about 20% to about 30%, from about 30% to about 40%, from about 40% to about 50%, from about 50% to about 55%, from about 55% to about 60%, from about 60% to about 65%, from about 65% to about 70%, from about 70% to about 75%, from about 75% to about 80%, from about 80% to about 85%, from about 85% to about 90%, from about 90% to about 92%, from about 92% to about 93%, from about 93% to about 94%, from about 94% to about 95%, from about 95% to about 96%, from about 96% to about 97%, from about 97% to about 98%, or from about 98% to about 99%, the balance of which comprises zinc and/or tin. In such embodiments, each second layer comprises zinc and/or tin in a range independently selected from about 1% to about 35%, from about 1% to about 3%, from about 2% to about 5%, from about 5% to about 10%, from about 10% to about 15%, from about 15% to about 20%, from about 20% to about 25%, from about 25% to about 30%, or from about 30% to about 35%, the balance of which comprises copper.

In embodiments, a coating has a thickness ranging from about 5 nm to about 5 cm. In some embodiments, a coating has a thickness in a range selected independently from about 5 nm to about 200 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, from about 200 to about 250 nm, from about 1 µm to about 5 centimeters (cm), from about 1 µm to about 50 µm, from about 50 µm to about 100 µm, from about 100 µm to about 200 µm, from about 200 µm to about 500 µm, from about 500 µm to about 800 µm, from about 800 µm to about 1.2 millimeters (mm), from about 500 µm to about 1 mm, from about 1 mm to about 1.5 mm, from about 1.2 mm to about 2 mm, from about 1.8 mm to about 2.5 mm, from about 2 mm to about 3 mm, from about 2.5 mm to about 5 mm, from about 1 mm to about 5 mm, from about 5 mm to about 1 cm, from about 1 cm to about 2 cm, or from about 2 cm to about 5 cm. In particular embodiments, a coating has a thickness ranging from about 200 µm to about 800 µm. In other embodiments, a coating has a thickness ranging from about 500 µm to about 800 µm. In other particular embodiments, a coating has a thickness ranging from about 200 µm to about 500 µm. In certain embodiments, a coating has a thickness of about 250 µm. In other embodiments, a coating has a thickness of about 500 µm. In yet other embodiments, a coating has a thickness of about 740 µm.

2.5 Properties of Laminate Coatings

Electrodeposited coatings applied to a workpiece (e.g., nanolaminate alloy coatings) can be fully or substantially fully dense, having a limited number of pores or cracks, or substantially free of pores or cracks, making them useful as corrosion-resistant coatings, in addition to their role as a structural component of finished molds. "Fully dense" indicates that the electrodeposited material is substantially free from pinholes, void and cracks that would expose the workpiece to corrosive agents ("corrodants") contacted with the coatings described herein.

In addition to mechanical and physical enhancement of workpiece properties, compositions electrodeposited onto a workpiece can alter the workpiece's chemical attributes. In some embodiments, at least a portion of the composition electrodeposited onto a workpiece is chemically resistant to the environment (e.g., the environment the interior of the mold experiences during the molding process) and protects the underlying workpiece (e.g., the metal coating protects the workpiece from solvents, products released by the materials being molded (e.g., gases or volatile components such as formaldehyde, acrolein, and styrene), or UV (ultraviolet) light that may damage the workpiece). In other embodiments, at least a portion of the composition electrodeposited on the workpiece is more noble than the underlying workpiece and acts as a barrier coating in corrosive environments that can damage the underlying workpiece. In yet other embodiments, at least a portion of the composition electrodeposited on the workpiece is less noble than the workpiece and sacrifices itself in corrosive environments to protect the workpiece.

In some embodiments, the laminated coatings are substantially free of surface defects, wherein the surface defects comprise porosity and/or voids. In still further embodiments, the laminated metal coatings may have a substantially uniform thickness over two or more of protruding features, recessed features, or a combination of protruding and recessed features. In some embodiments the laminated coatings may have a substantially uniform thickness over a single feature or multiple features (two, three or more features) each having an aspect ratio, which is defined as the height divided by the greatest width of the feature, of about ten or less (e.g., an aspect ratio of 0.1-1, 0.5-1, 0.5-10, 1-10, 1-3, 1-5, 2-10, 2-8, 3-6, 5-10, 6-10 7-9, or 8-10). In embodiments, the aspect ratios independently range from about 0.1 to about 10. In some embodiments, the aspect ratios independently range from about 0.1 to about 3, from about 0.5 to about 4, from about 1 to about 5, from about 2 to about 6, from about 3 to about 7, from about 4 to about 8, from about 5 to about 9, or from about 6 to about 10.

In some embodiments, where the surface is a generally planar surface, the features have a surface aspect ratio of ten or less, where the surface aspect ratio is defined as:

$$\left| \frac{\text{(height of the first feature)} - \text{(height of the second feature)}}{\text{distance between the first feature and the second feature}} \right|$$

In other words, the surface aspect ratio is the difference in the height (which will be a negative value for depressed features, i.e., and/or the depth) of two features on the surface divided by the distance between their highest/lowest point above/below the surface. Where one or both of the features have a substantially planar top or bottom, the distance between features is taken as between the closest point at that height on the top of the features.

Figure 1B:
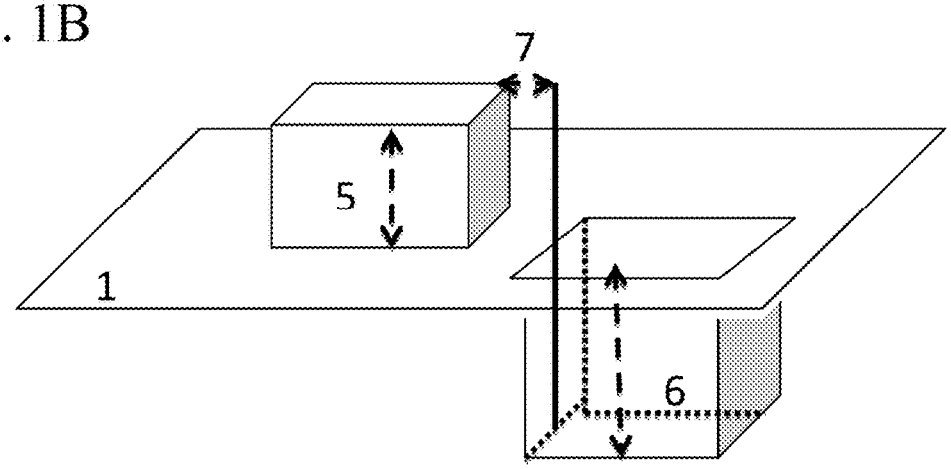

FIGS. 1A and 1B show two examples of surface features. In FIG. 1A the generally planar surface 1 has two protruding features with a heights 2 and 3 above the surface plane. The distance between the features is given by 4 using a line extending perpendicular to the surface (heavy line unnumbered). The surface aspect ratio in this instance is the [absolute value of (height 3–height 2)] divided by distance 4.

In FIG. 1B the generally planar surface 1 has one protruding features of height 5 and one depressed feature with a depth 6 below the surface plane. The distance between the features is given by 7 using a line extending perpendicular to the surface (heavy line unnumbered). The surface aspect ratio in this instance is the [absolute value of (height 5–depth 6)] divided by distance 7. Note that depth 6 has a negative value in this instance so that the surface aspect ratio may also be expressed as the [(height 5 plus the absolute value of depth 6)] divided by distance 7.

In some embodiments, the laminate coating has a substantially uniform thickness over features of the workpiece protruding from a surface of the workpiece and having a radius of curvature between the surface of the workpiece and the protruded feature of up to ninety degrees.

The laminated coating may have a Vickers microhardness as measured by ASTM E384 to about 11e1 ranging from about 75 to about 1200, from about 75 to about 200, from about 75 to about 350, from about 100 to about 150, from about 100 to about 300, from about 300 to about 600, from about 150 to about 250, from about 250 to about 350, from about 350 to about 550, from about 350 to about 650, from about 550 to about 750, from about 550 to about 600, from about 600 to about 650, from about 600 to about 900, from about 650 to about 700, from about 650 to about 1000, from about 700 to about 750, from about 750 to about 800, from about 750 to about 1000, from about 800 to about 850, from about 850 to about 900, from about 900 to about 1000, from about 1000 to about 1100, from about 1000 to about 1200, from about 1100 to about 1200, or 1200 or more without heat treatment.

In some embodiments, the laminated coating may display about 5%, about 10%, about 20%, about 30%, or about 40% less loss of weight than a control homogeneous coating having the average composition of the laminated coating when the laminated coating and the control homogenous coating are applied to a substantially identical workpiece and are subject to comparison using a Taber Abraser equipped with CS-10 wheels and a 250 g load and operated at room temperature at the same speed for both samples (e.g., 95 RPM).

In further embodiments the laminated coatings may display a higher abrasion resistance when subject to testing under ASTM D4060 than a control homogeneous coating having an average composition of the laminated coating where the laminated coating and the control homogenous coating are applied to a substantially identical workpiece. In other embodiments, the laminated coatings display a higher abrasion resistance when subject to block on ring testing under ASTM G77-05 2010 than a control homogeneous coating having an average composition of the laminated coating where the laminated coating and the control homogenous coating are applied to a substantially identical workpiece.

In other embodiments, the laminated coating may have a coefficient of thermal expansion less than about $100\times10^{-6}/°$ C., from $100°$ C. to $300°$ C. In further embodiments, the laminated coating may have a coefficient of thermal expansion less than about $50\times10^{-6}/°$ C. from $100°$ C. to $300°$ C. In still further embodiments, the laminated coating may have a coefficient of thermal expansion less than about $40\times10^{-6}/°$ C., about $30\times10^{-6}/°$ C., about $20\times10^{-6}/°$ C., or about $10\times10^{-6}/°$ C. from $100°$ C. to $300°$ C.

2.6 Preparation of Articles Utilizing Molds Comprising a Laminated Coating.

Articles (i.e., molds bearing laminated coatings (e.g., nanolaminate metal coatings)) may be employed for, among other things, molding polymerizable, settable, thermoplastic, or thermoset materials to form a product. The products may be, for example, toys, sporting goods, athletic wear (e.g., shoes or parts of shoes such as cushioned inserts, the sole or parts of a shoe comprising the sole), housings for electronics, automotive parts, or building goods (e.g., plastic lighting or plumbing components and/or fixtures).

In some molding operations, to prepare a product, the complete mold may comprise one or more sections (segments or pieces). In some embodiments, the complete mold comprises two sections (i.e., a two-piece mold), three sections (i.e., a three-piece mold), or four or more sections (e.g., a four-piece mold). As used herein, the term "mold" refers to a complete mold or one or more sections thereof. In some embodiments molds comprising one or more sections are used for casting, injection molding, rotational molding (sometimes referred to as "roto-molding"), blow molding, and extrusion molding. The molding operation to form a product may also comprise steps of cutting or trimming flash and/or one or more sprues from the product, and/or blast finishing to remove, for example, mold glaze.

In some embodiments, a settable, polymerizable, thermoplastic, or thermoset material is introduced (e.g., injected) into a completed article (i.e., a complete mold) to form the thermoplastic or thermoset material into a product. The method of molding a product comprises the steps of:
  introducing into a mold a settable, polymerizable, thermoplastic, or thermoset material to shape it; and
  allowing the material to at least partially cure, set, or cool to form a product that can be separated from all or part of the mold (without a substantial loss of shape).

The method of molding a product from settable, polymerizable, thermoplastic, or thermoset may further comprise leaving the mold closed or substantially closed for a time interval sufficient to shape the product, wherein the time interval is determined by monitoring the temperature of the material in the mold and/or the temperature of the mold at one or more locations, and adjusting the time interval to permit the product to set, cure, and/or sufficiently cool so that the product substantially retains its shape upon removal from the mold. The method may further comprise cutting and/or trimming (grinding if required) flash or one or more sprues from the product, and/or blast finishing. During operation one or more sections of the mold may be heated and/or cooled to maintain the mold size and shape and for consistency in the molding process. Accordingly, molds, or sections of molds may have ports for the circulation heating/cooling of fluid and/or cooling fins, to help maintain molds at a desired operating temperature. As would be understood by one of skill in the art, ports may be in any suitable form to allow for the circulation heating/cooling of fluid(s) or gas(es). In embodiments, such ports are channels that extend from one surface of a mold to another surface of a mold that allow the passage of a fluid through a portion of the mold. In some embodiments, a port is a channel that has two or more openings in a single surface of a mold, where the channel extends into the mold and connects the two openings, where the channel allows the passage of a fluid through a portion of the mold. In further embodiments, a port is a means for circulating a fluid or gas through a portion of a mold.

In some embodiments, a thermoplastic or thermoset material is introduced (e.g., injected) into a completed mold to form the thermoplastic or thermoset material into a product. The method of molding a product comprises the steps of:
  introducing into a mold thermoplastic or thermoset materials to shape it; and
  allowing the material to at least partially cure or cool to form a product that can be separated from all or part of the mold (without a substantial loss of shape).

The method of molding a product from a thermoplastic or thermoset material may further comprise leaving the mold closed or substantially closed for a time interval sufficient to shape the product, wherein the time interval is determined by monitoring the temperature of the material in the mold and/or the temperature of the mold at one or more locations, and adjusting the time interval to permit the product to cure or sufficiently cool so that the product substantially retains its shape upon removal from the mold. The method may further comprise cutting and/or trimming (grinding, if required), flash, or one or more sprues from the product, and/or blast finishing.

In some embodiments, a polymerizable material is introduced (e.g., injected) into a complete mold, comprising at least one section prepared from a plastic or polymerizable material having a laminated (nanolaminated) coating, and polymerization is initiated (e.g., by addition of a catalyst, heat, and/or light) to cause polymerization and to form a product. The method of molding an article from polymerizable material in such a mold comprises in an embodiment the steps of:
  introducing into a mold a polymerizable material;
  initiating polymerization; and
  allowing the material to at least partially polymerize to form a product that can be separated from all or part of the mold (without a substantial loss of shape).

The method of molding a product from polymerizable material may further comprise leaving the mold closed or substantially closed for a time interval sufficient to shape the product after polymerization is initiated, wherein the time interval is determined by monitoring the temperature of the material in the mold, and/or the temperature of the mold at one or more locations, and adjusting the time interval to permit the product to cure and/or sufficiently cool so that the product substantially retains its shape upon removal from the mold. Cooling may be desirable not only in the instances where polymerization is initiated by heating, but also where the polymerization process is exothermic. The process may further comprise cutting and/or trimming flash or one or more sprues from the product, and/or blast finishing. In one embodiment, the polymerizable material is a photopolymerizable material.

In some embodiments, a settable material is introduced (injected) into a complete mold comprising at least one section prepared from a plastic or polymerizable material having a laminated (nanolaminated) coating and setting is permitted to occur and/or encouraged (e.g., by addition of a catalyst, heat) to cause an article to form. The method of molding an article from settable material in such a mold comprising in an embodiment the steps of:
  introducing into a mold a settable material;
  optionally adding a catalyst or heating the material to induce setting; and
  allowing the material to at least partially set to form a product that can be separated from all or part of the mold (without a substantial loss of shape).

The method of molding a product from a settable material may further comprise leaving the mold closed or substantially closed for a time interval sufficient to shape the product after setting has initiated, wherein the time interval is determined by monitoring the temperature of the material in the mold and/or the temperature of the mold at one or more locations, and adjusting the time interval to permit the product to cure and/or sufficiently cool so that the product substantially retains its shape upon removal from the mold. Cooling may be desirable not only in the instances where setting is initiated by heating, but also where the setting process is exothermic (e.g., where the settable material comprises calcium sulfate hemihydrate [$2CaSO_4 \cdot H_2O$ or plaster of Paris] or other settable mineral composition that undergoes an exothermic setting reaction). The process may further comprise cutting, and/or trimming (grinding) flash or one or more sprues from the product, and/or blast finishing.

In methods of forming a product with a polymerizable, settable, or thermoset material in which the time interval is determined by monitoring the temperature of the material in the mold and/or the temperature of the mold at one or more locations, the time until the mold can be opened and/or the product removed from the mold without a substantial loss of shape may be calculated by reference to the rate of reaction using the Arrhenius equation to determine when the process is sufficiently complete. The process of monitoring the molding process and determining the molding time may be conducted by a computer, which may electronically control the molding processes.

Figure 2:
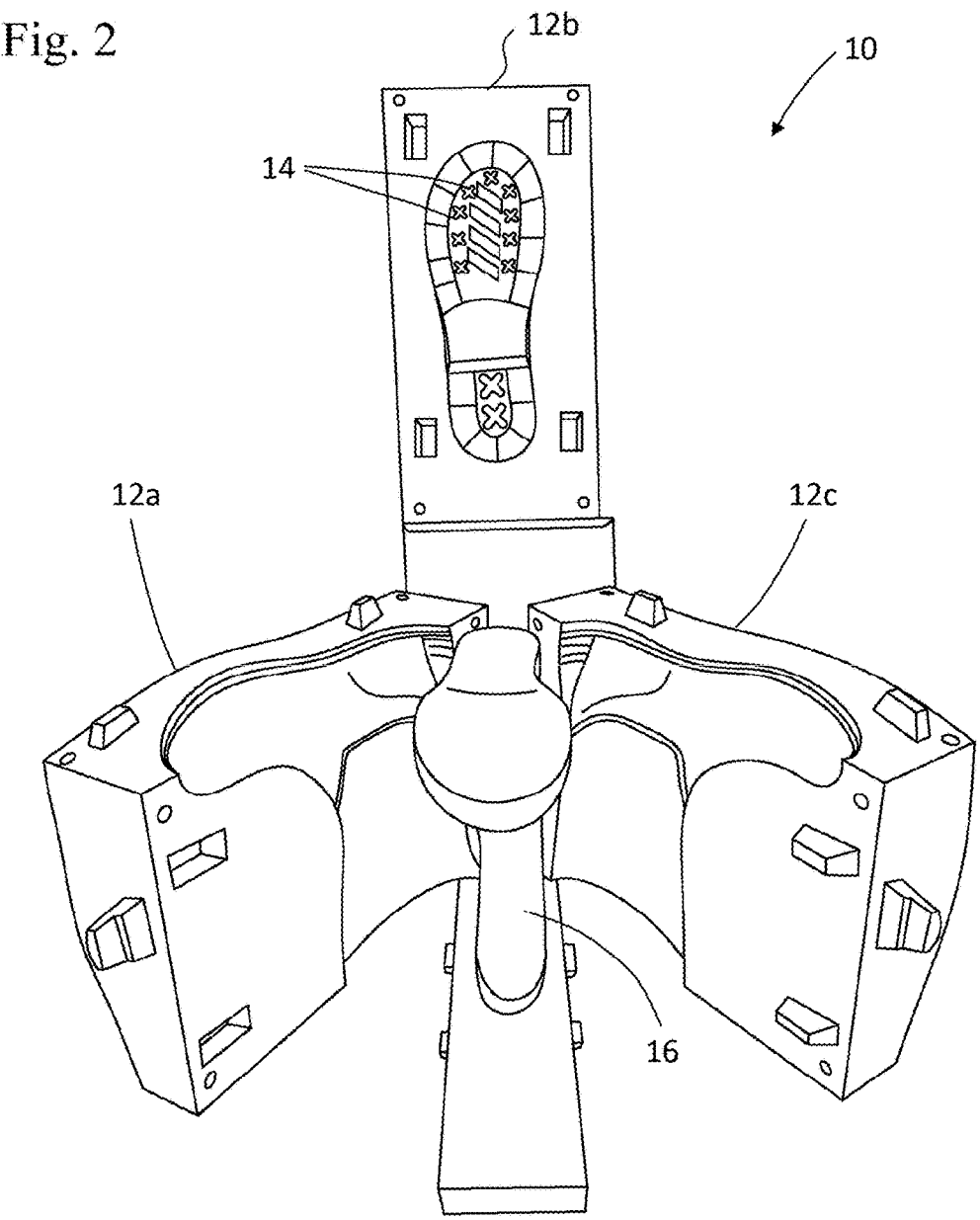
FIG. 2 shows an illustrative embodiment of a mold of the present disclosure.

The methods of forming a product in a mold described herein may include the use of a mold comprising a core or an insert (see, e.g., FIG. 2). In one such embodiment, an insert molding method is used in which one or more polymerizable materials, thermoset materials, or thermoplastic materials are molded (e.g., injection molded) around one or more inserts. In some embodiments, the inserts may be metal inserts, metal stampings, wire, mesh screens, woven or unwoven materials (e.g., fabric), and plastic materials or components. In one embodiment, the inserts may be selected from the group consisting of metal inserts, metal stampings, wire, mesh screens, woven or unwoven materials (e.g., fabric), and plastic materials or components.

In some embodiments, the material introduced into the mold comprises, consists essentially of, or consists of, ABS, Ethylvinylacetate (EVA), Low Density Polyethylene (LDPE), Linear Low Density Polyethylene (LLDPE), High Density Polyethylene (HDPE), Nylon (PA), Polycarbonate (PC), Polyethylene (PE), Polyethylene-Terephthalate (PET), Polypropylene (PP), Poly Vinyl Chloride (PVC), Polyvinylidenefluoride (PVDF), Polystyrene (GPPS), and combinations thereof, wherein the thermoplastic material optionally comprises one or more pigments, reinforcing fibers, and/or fillers.

Materials comprising conductive, non-conductive, or partially-conductive polymeric material may be shaped/formed by introducing them into the mold using the methods described hereinbefore.

In other embodiments, the material introduced into the mold is a thermoset material that comprises, consists essentially of, or consists of one, two, three or more of a polyester, vinylester, epoxy, phenolic or methyl methacylate, and combinations thereof, wherein the thermoset material optionally comprises one or more pigments, reinforcing fibers, and/or fillers.

In other embodiments, the material introduced into the mold is a settable material that comprises, consists essentially of, or consists of one or more of a clay (e.g., kalolin), concrete, plaster (e.g., plaster of Paris), powdered metal, powdered plastic, or a preceramic polymer.

The settable, polymerizable, thermoplastic, or thermoset materials may comprise from about 0 to about 50%, from about 0 to about 1%, from about 1 to about 5%, from about 1 to about 20%, from about 1 to about 50%, from about 5 to about 10%, from about 5 to about 25%, from about 5 to about 50%, from about 10 to about 20%, from about 10 to about 50%, from about 20 to about 30%, from about 20 to about 50%, from about 30 to about 40%, from about 30 to about 50%, or from about 40 to about 50%, by weight of fiber reinforcement material based upon the weight of the fiber reinforcement and the settable, polymerizable, thermoplastic, or thermoset materials. The fiber reinforcement material may further comprise mineral, glass, a polymer material, and/or graphite fibers. In embodiments, the fibers may be in the form of tow with a length less than about 20 mm. In some embodiments, the fibers may be in the form of tow with a length less than about 2 mm, about 4 mm, about 6 mm, about 8 mm, about 10 mm, about 12 mm, about 14 mm, about 16 mm, or about 18 mm.

In some embodiments, the settable, polymerizable, thermoset material is cured or partially cured at a temperature that is at least about 5° C., at least about 10° C., at least about 20° C., at least about 30° C., at least about 40° C., or at least about 50° C. less than the melting point or Vicat softening point of the polymeric material from which the workpiece from which the mold (or a section of the mold) is formed. When considering the melting point or Vicat softening point in such an embodiment, it should include any fillers or fibrous material that may be present in the workpiece.

An illustrative mold of the present disclosure is shown in FIG. 2. In embodiments, such a mold is used for injection molding. As can be seen in FIG. 2, the mold 10 is comprised of three sections 12a, 12b, 12c. Section 12b includes a variety of surface features 14. When the three sections are combined, a fluid tight cavity is created. The illustrative mold of FIG. 2, additionally shows an insert 16. In use, polymerizable materials, thermoset materials, or thermoplastic materials are molded (e.g., injection molded) around such an insert.

Figure 3:
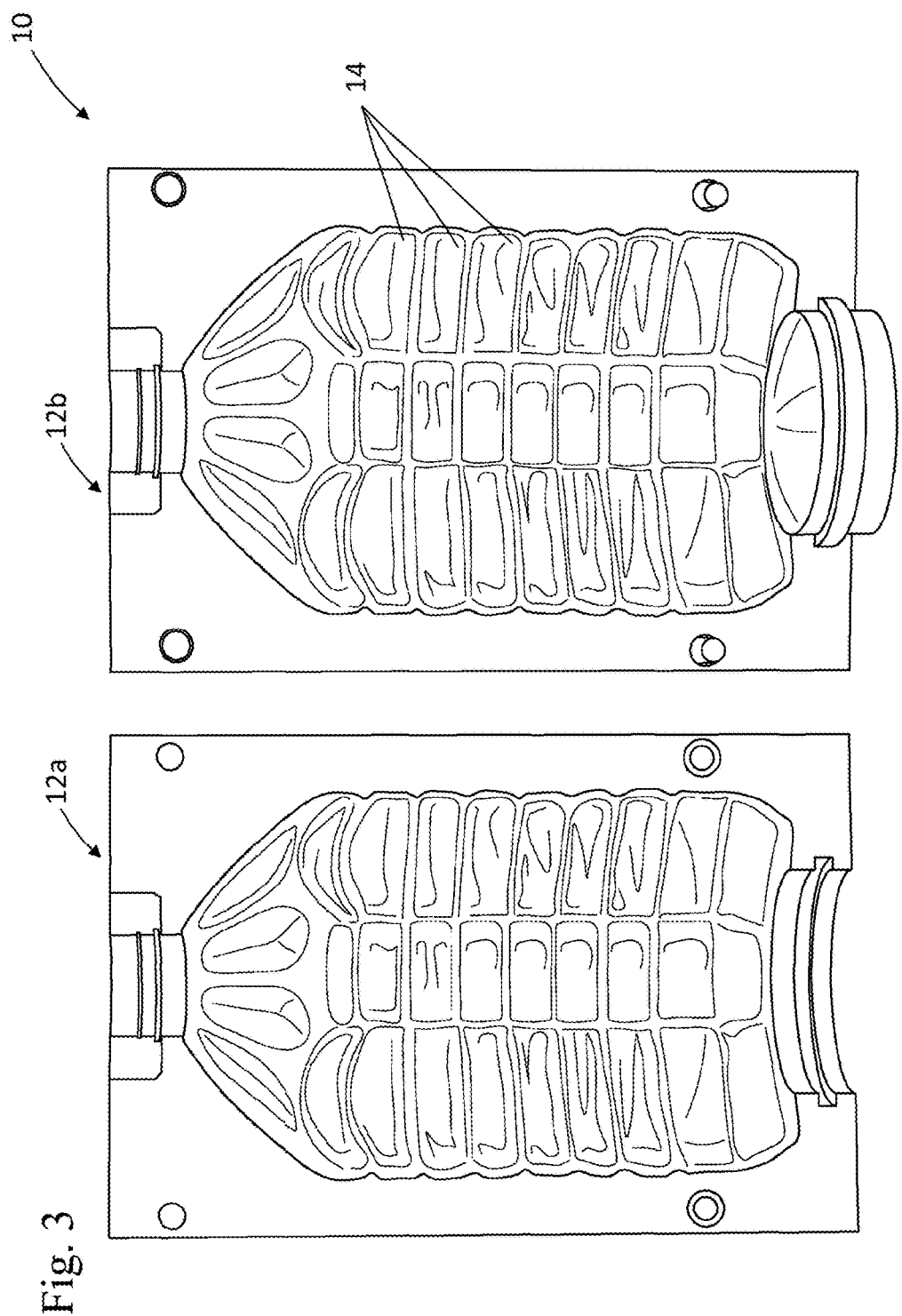
FIG. 3 shows an illustrative embodiment of a mold of the present disclosure.

A second illustrative mold of the present disclosure is shown in FIG. 3. In embodiments, such a mold is used for blow molding. As can be seen in FIG. 3, the mold 10 comprises two sections 12a, 12b, which include a variety of surface features, 14.

3.0 Examples

Example 1

Preparation of a Mold From a Peek Composite Workpiece

A carbon fiber reinforced PEEK composite workpiece was machined to the desired shape and a layer of copper was deposited by electroless deposition as a seed layer. After seed layer application, the workpiece was immersed in an electrochemical plating bath comprising Ni and Co salts, and a modulated waveform was applied to deposit a series of layers forming a laminated Ni—Co alloy coating. The laminated alloy coated workpiece was then subjected to a series of thermal cycling and thermal shock tests simulating a range of mold temperature cycles. The laminated metal coating remained adhered to the copper seed layer and carbon fiber PEEK substrate at a wide range of temperatures from −178° C. to 57° C. and sharp temperature ramp rates of 509° C./min. In all test cases, the laminated metal coating did not show any signs of peeling, cracking, flaking, delamination, or separation from the substrate.

Example 2

Molding Products in a Mold Comprising a Workpiece and a Laminated NiCo Coating

Shoe molds were prepared from five types of 3D printed workpieces, including ABS, Nylon, Polyurethane, and two from PolyJet photopolymers (a standard temperature workpiece and high temperature workpiece). All sides of each workpiece were coated with a first layer of electroless copper, having a nominal thickness 1±0.5 μm, and a second layer of electrolytic copper, having a nominal thickness of 5 μm. A 2 mm nanolaminated nickel-cobalt coating having alternating layers of about 50% Ni-50% Co and 75% Ni-25% Co was applied. Each layer of the nanolaminate had a nominal thickness of less than 100 nm. In each of the nanolaminate shoe molds, the coating deposit was substantially free of porosity within individual layers of the laminate. The finished laminate coating was substantially uniform in thickness across the entire three-dimensional surface of the shoe mold, and the finished laminate coating surface substantially conformed to the features of the shoe mold.

4.0 Embodiments

The following embodiments are included within the scope of this disclosure.

1. A method for preparing a mold for molding thermoplastic or thermoset materials, or a portion thereof, comprising:
   shaping a plastic or polymeric material to form a shaped plastic or polymeric workpiece; and
   applying to the plastic or polymeric workpiece a laminated metal coating to form the mold, or portion thereof;
   wherein the workpiece, mold, or portion thereof, optionally comprises on its surface at least one area with a surface aspect ratio of from 1-10 and/or one or more ports for the circulation of liquid or gas to maintain mold temperature.
2. The method of embodiment 1, wherein shaping the plastic or polymeric material comprises one, two, three, or more of casting, injection molding, blow molding, extrusion molding, cutting, machining, milling, grinding, sanding, polishing, abrasive blasting, three-dimensional printing (3D printing), selective laser sintering (SLS) or sintering laser melting (SLM), fused deposition modeling (FDM), stereolithography (SLA), continuous liquid interface printing (CLIP), cutting and/or forming of woven fabrics, non-woven fabric, and cutting and/or forming of foam sheets.
3. The method of embodiment 1 or 2, wherein shaping the plastic or polymeric material comprises one, two, or more of casting, injection molding, blow molding, and extrusion molding.
4. The method of any of embodiments 1 to 3, wherein shaping the plastic or polymeric material comprises a mechanical removal of plastic or polymeric material.
5. The method of embodiment 4, wherein the mechanical removal of plastic or polymeric material comprises one, two, or more of cutting, milling, grinding, sanding, polishing, and abrasive blasting.
6. The method of any of embodiments 1 to 5, wherein shaping the plastic or polymeric material comprises an additive manufacturing process.
7. The method of embodiment 6, wherein the additive manufacturing process comprises one, two, or more of three-dimensional printing (3D printing), selective laser sintering (SLS) or sintering laser melting (SLM), fused deposition modeling (FDM), stereolithography (SLA), and continuous liquid interface printing (CLIP).
8. The method of any of embodiments 1 to 7, wherein shaping the plastic or polymeric material comprises cutting and/or forming of woven or non-woven fabrics and/or foam sheets.
9. The method of embodiment 8, wherein the woven fabrics, non-woven fabrics, and/or foam sheets comprise polymer materials and/or non-polymeric materials.
10. The method of embodiment 8 or 9, wherein the forming of woven fabrics, non-woven fabrics, and/or foam sheets comprises forming and layering two, three, four, or more layers of woven fabrics, non-woven fabrics, and/or foam sheets.
11. The method of any of embodiments 1 to 10, wherein shaping the plastic or polymeric material comprises two, three, or more of casting, cutting, milling, grinding, sanding, polishing, abrasive blasting, three-dimensional printing (3D printing), selective laser sintering (SLS) or sintering laser melting (SLM), fused deposition modeling (FDM), stereolithography (SLA), continuous liquid interface printing (CLIP), cutting and/or forming of woven or non-woven fabrics, and cutting and/or forming of foam sheets.
12. The method of any of embodiments 1 to 11, wherein shaping the plastic or polymeric material comprises two, three, or more of cutting, milling, three-dimensional printing (3D printing), fused deposition modeling (FDM), stereolithography (SLA), continuous liquid interface printing (CLIP), cutting and/or forming of woven or non-woven fabrics and cutting and/or forming of foam sheets.
13. The method of any of embodiments 1 to 12, wherein the plastic or polymeric material is a conductive plastic or polymeric material with a volume resistance from 10-1 to 10-7 ohm cm as measured by ASTM D257-14.
14. The method of any of embodiments 1 to 12, wherein the plastic or polymeric material is a partially-conductive plastic or polymeric material with a volume resistance from 10-1 to 102 as measured by ASTM D257.
15. The method of any of embodiments 1 to 12, wherein the plastic or polymeric material is a non-conductive plastic or polymeric material with a resistance greater than 106, 107, 1010, 1015, or 1018 ohm cm as measured by ASTM D257.
16. The method of any of embodiments 1 to 15, wherein the plastic or polymeric material comprises one, two, three, or more of polyetherimide, polyetherketoneketone (PEKK), polyether ether ketone (PEEK), polyamide, polyvinyl alcohol (PVA), acrylonitrile butadiene styrene (ABS), polycarbonate (PC), polylactic acid (PLA), PC/ABS, polyphenylsulfone (PPSU) or a combination of any one or more, two or more, or three or more of the foregoing.
17. The method of any of embodiments 1 to 16, wherein the plastic or polymeric material comprises, consists essentially of, or consists of a plastic or polymeric material that has a decomposition point greater than 150° C., 175° C., 200° C., 225° C., 250° C., 275° C., or 300° C.
18. The method of any of embodiments 1 to 17, wherein the plastic or polymeric material has a Vicat softening point greater than 150° C., 175° C., 200° C., 225° C., or 250° C. as assessed under ASTM D1525-09.
19. The method of any of embodiments 1 to 18, wherein the plastic or polymeric material further comprises reinforcing fiber.
20. The method of any of embodiments 1 to 19, wherein the plastic or polymer material comprises 0-50%, 0-1%, 1 5%, 1-20%, 1-50%, 5-10%, 5-25%, 5-50%, 10-20%, 10-50%, 20-30%, 20-50%, 30-40%, 30 50%, or 40-50% by weight of a fiber reinforcement material based upon the weight of the fiber reinforcement material and plastic or polymer material.
21. The method of embodiment 20, wherein the fiber reinforcement material comprises mineral, glass, and/or graphite fibers.
22. The method of embodiment 20, wherein the fiber reinforcement material comprises a polymeric material.
23. The method of any of embodiments 20 to 22, wherein the fiber reinforcement material is in the form of tow with a length less than 2, 4, 6, 8, 10, 12, 14, 16, 18, or 20 millimeters.
24. The method of any of embodiments 19 to 23, wherein the plastic or polymeric comprising fiber reinforcement material has a Vicat softening point greater than 150° C., 175° C., 200° C., 225° C., 250° C., 275° C., 300° C., or 325° C. as assessed under ASTM D1525-09.
25. The method of any of embodiments 1 to 24, wherein applying the laminated metal coating to the plastic or polymeric workpiece comprises one, two, or more of vapor phase deposition, vacuum deposition, electroless deposition, electrophoretic deposition, and/or electrochemical deposition (electroplating) of a laminated metal coating.

26. The method of embodiment 25, wherein the method comprises one, two, or more of vapor phase deposition, vacuum deposition, and/or electroless deposition of a laminated metal coating.

27. The method of embodiment 25, wherein the method comprises electroless deposition and/or electrochemical deposition of a laminated metal coating.

28. The method of embodiment 25 wherein the method comprises electroless deposition of a metal coating sufficient to render the surface of a nonconductive or partially-conductive plastic or polymeric workpiece sufficiently conductive to permit electrodeposition of a metal coating, followed by electrodeposition of a laminated metal coating.

29. The method of embodiment 27 or 28, wherein the electrodeposition of a laminated metal coating is conducted using one, two, or more of potentiometric (potentiostatic), amperometric (galvanostatic), pulse current, pulse reverse current, modulated current, modulated frequency, and continuous transitioned current electroplating.

30. The method of any of embodiments 1 to 29, wherein the laminated metal coating comprises at least a first type of metal or metal alloy and a second layer comprising a second type of metal or metal alloy, wherein the first type of metal or metal alloy is different from the second type of metal or metal alloy.

31. The method of embodiment 30, wherein one, two, three, four, five, six, or more of the first type of metal or metal alloy layers and/or one, two, three, four, five, six, or more of the second type of metal or metal alloy layers is less than 100, 10, 1, 0.1, or 0.01 microns thick.

32. The method of embodiment 30, wherein each of the first type of metal or metal alloy layers and/or each of the second type of metal or metal alloy layers is less than 100, 10, 1, 0.1, or 0.01 microns thick.

33. The method of any of embodiments 30-32, wherein the first and second type of metal or metal alloy layers differ in one, two, three, or more of chemical (elemental) composition, grain size, defect density, grain orientation, the presence of intermetallic compositions, and the presence of amorphous metallic glass compositions.

34. The method of any of embodiments 30-33, wherein the first type or second type of layers comprise a "fine-grained" or "ultrafine-grained" metal or metal alloy having an average grain size selected independently for any one, two, three, four, five, six, or more layers from a range of 1 nm to 5,000 nm, 1-20, 1-100, 5-50, 5-100, 5-200, 10-100, 10-200, 20-200, 20-250, 20-500, 50-250, 50-500, 100-500, 200-1,000, 500-2,000, and 1,000-5,000 nm, based on the measurement of grain size in micrographs.

35. The method of embodiment 34, wherein the fine-grained metal and alloys have a high degree of twinning between metal grains, and remain ductile while having one or more properties selected from increased hardness, tensile strength, and corrosion resistance relative to an electrodeposited metal or alloy of the same composition with a grain size from 5,000 to 20,000 nm or greater.

36. The method of any of embodiments 30-35, wherein the first type and/or second type of layers comprise one, two, three, four, or more elements selected independently for each layer from the group consisting of Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr, selected independently for each layer.

37. The method of any of embodiments 30-35, wherein the first type and/or second type of layers comprise two or more or three or more elements selected independently for each layer from the group consisting of Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr.

38. The method of any of embodiments 30-35, wherein the first type and/or second type of layers comprise two or more, three or more, or four or more elements selected independently for each layer from the group consisting of NiCr, NiFe, NiCo, NiCrCo, NiAl, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiNb, NiCrNb, NiFeNb, NiCoNb, NiCrCoNb, NiTi, NiCrTi, NiFeTi, NiCoTi, NiCrCoTi, NiCrP, NiCrAl, NiCoP, NiCoAl, NiFeP, NiFeAl, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi, and FeCrB.

39. The method of any of embodiments 1-38, wherein the laminated metal coating has a coefficient of thermal expansion and the coefficient of thermal expansion of the metal or alloy from which one or both types of layers in the laminated metal coating and the coefficient of thermal expansion of the plastic or polymeric material from which the workpiece was formed differ by less than 20%, 15%, 10%, 5%, or 2%; and
with the proviso that the coefficient of thermal expansion for the plastic or polymeric material from which the workpiece is formed is determined with any fibrous material that may be present in the workpiece.

40. The method of any of embodiments 30-39, wherein the coefficient of thermal expansion of metal or alloy from which the first type of layer and the second type of layer is formed differ by less than 20%, 15%, 10%, 5%, or 2%.

41. The method of any preceding embodiment, wherein a test specimen of the laminated metal coating of the same composition, structure, and thickness, has a Vickers microhardness as measured by ASTM E384-11e1 of 75-200, 100-150, 100-300, 300-600, 150-250, 250-350, 350-550, 550-750, 550-600, 600-650, 600-900, 650-700, 700-750, 750-800, 750-1000, 800-850, 850-900, 900-1000, 1000-1100, 1000-1200, 1100-1200, or 1200 or more without heat treatment.

42. The method of any preceding embodiment, wherein the laminated metal coatings display 5%, 10%, 20%, 30%, or 40% less loss of weight than a control homogeneous coating having the average composition of the laminated metal coating when the laminated metal coating and the control coating are subject to comparison using a Taber Abraser equipped with CS-10 wheels and a 250 g load and operated at room temperature at the same speed for both samples (e.g., 95 RPM).

43. The method of any preceding embodiment, wherein the laminated metal coatings display a higher abrasion resistance when subject to testing under ASTM D4060 than a control homogeneous coating having the average composition of the laminated metal coating.

44. The method of any preceding embodiment, wherein the laminated metal coatings display a higher abrasion resistance when subject to block on ring testing under ASTM G77-05 2010 than a control homogeneous coating having the average composition of the laminated metal coating.

45. The method of any preceding embodiment, wherein the laminated metal coating has a coefficient of thermal expansion, and the coefficient of thermal expansion of the laminated metal coating is less than $50 \times 10\text{-}6/°$ C. from 100 to 300° C.

46. The method of embodiment 45, wherein the coefficient of thermal expansion of the laminated metal coating is less than $40\times10$-6/° C., $30\times10$-6/° C., $20\times10$-6/° C., or $10\times10$-6/° C. from 100 to 300° C.

47. The method of any preceding embodiment, wherein the plastic or polymeric material used to prepare the workpiece has a coefficient of thermal expansion, and the coefficient of thermal expansion of the plastic or polymeric material is less than $100\times10$-6/° C. from 100 to 300° C.;
with the proviso that the coefficient of thermal expansion for the plastic or polymeric material from which the workpiece is formed is determined with any fibrous material that may be present in the workpiece.

48. The method of embodiment 47, wherein the coefficient of thermal expansion is less than $40\times10$-6/° C., $30\times10$-6/° C., $20\times10$-6/° C., or $10\times10$-6/° C. from 100 to 300° C.

49. The method of any preceding embodiment, wherein the laminated metal coatings are substantially free of surface defects.

50. The method of embodiment 49, wherein the surface defects comprise porosity and/or voids.

51. The method of any preceding embodiment, wherein the laminated metal coating is a nanolaminate coating and has a substantially uniform thickness over two or more of protruding features, recessed features, or a combination of protruding and recessed features;
wherein the features each have an aspect ratio of ten or less.

52. The method of any preceding embodiment, wherein the laminated metal coating is a nanolaminated metal coating and has a substantially uniform thickness over two or more of protruding features, recessed features, or a combination of protruding and recessed features;
wherein the features have a surface aspect ratio of ten or less.

53. The method of any of embodiments 1-52, wherein the mold comprises one or more sections.

54. The method of embodiment 53, wherein the mold comprises two sections, three sections, or four or more sections.

55. A method of molding an article comprising introducing into a mold a settable, polymerizable, thermoplastic, or thermoset material to shape it;
allowing the material to at least partially cure or cool to form an article that can be separated from all or part of the mold;
wherein the mold comprises at least one section (e.g., two, three, four, or more sections) prepared according to any of embodiments 1-54.

56. The method of embodiment 55 comprising introducing into the mold a thermoplastic or thermoset material to shape it.

57. The method of embodiment 56, wherein shaping the thermoplastic or thermoset material comprises one, two, or more of casting, injection molding, rotational molding, blow molding, and extrusion molding.

58. The method of any of embodiments 55-57, wherein when a thermoplastic material or a thermoset material is introduced into the mold, the method further comprises allowing the material to at least partially cure or cool while leaving the mold closed or substantially closed for a time interval sufficient to shape the article.

59. The method embodiment 58, wherein the time interval is determined by monitoring the temperature of the material introduced into the mold and/or the temperature of the mold at one or more locations, and adjusting the time interval to permit the article to cure or sufficiently cool so that article substantially retains its shape upon removing the article from the mold.

60. The method of any of embodiments 55-59, further comprising a finishing step of cutting and/or trimming flash or one or more sprues from the article, and/or blast finishing.

61. The method of any of embodiments 55-60, wherein the mold comprises a core.

62. The method of any of embodiments 55-60, wherein the method is an insert molding method in which one or more polymerizable materials, thermoset materials, or thermoplastic materials is molded (e.g., injection molded) around one or more inserts.

63. The method of any of embodiment 62, wherein the inserts are selected from the group consisting of metal inserts, metal stampings, wire, mesh screens, woven or unwoven materials (e.g., fabric), and plastic materials or components.

64. The method of any of embodiments 55-63, wherein a polymerizable material, a thermoplastic material, or thermoset material is introduced into the mold.

65. The method of embodiment 64, wherein the thermoplastic material comprises, consists essentially of, or consists of Acrylonitrile-Butadiene-Styrene (ABS); Ethylvinylacetate (EVA), Low Density Polyethylene (LDPE), Linear Low Density Polyethylene (LLDPE), High Density Polyethylene (HDPE), Nylon (PA), Polycarbonate (PC), Polyethylene (PE), Polyethylene-Terephthalate (PET), Polypropylene (PP), Poly Vinyl Chloride (PVC), Polyvinylidenefluoride (PVDF), Polystyrene (GPPS), and combinations thereof, wherein the thermoplastic material optionally comprises one or more pigments, reinforcing fibers, and/or fillers.

66. The method of embodiment 65, wherein the thermoplastic material has a melting point less than the melting point or Vicat softening point of the plastic or polymeric material from which the workpiece is formed; or
that the mold is operated at, or during molding operations continuously cooled to, a temperature less than the melting point or Vicat softening point of the plastic or polymeric material from which the workpiece is formed;
with the proviso that the melting point or softening point is determined with any fillers or fibrous material that may be present in the workpiece.

67. The method of embodiment 66, wherein the thermoplastic material has a melting point or Vicat softening point of 5 or more, 10 or more, 20 or more, 30 or more, 40 or more, or 50 or more degrees Centigrade less than the melting point or Vicat softening point of the plastic or polymeric material from which the workpiece is formed; with the proviso that the melting point or Vicat softening point is determined with any fillers or fibrous material that may be present in the workpiece.

68. The method of embodiment 64, wherein the thermoset material is introduced into the mold.

69. The method of embodiment 68, wherein the thermoset material comprises, consists essentially of, or consists of one, two, three or more of a polyester, vinylester, epoxy, phenolic or methyl methacylate, and combinations thereof, wherein the thermoset material optionally comprises one or more pigments, reinforcing fibers, and/or fillers.

70. The method of embodiment 69, wherein the thermoset material is cured or partially cured at a temperature less than the melting point or Vicat softening point of the plastic or polymeric material from which the workpiece is formed; or with the proviso that the melting point or softening point is determined with any fillers or fibrous material that may be present in the workpiece.

71. The method of embodiment 69, wherein the thermoset material is cured or partially cured at a temperature that is 5 or more, 10 or more, 20 or more, 30 or more, 40 or more, or 50 or more degrees Centigrade less than the melting point or Vicat softening point of the plastic or polymeric material from which the workpiece is formed;

with the proviso that the melting point or softening point is determined with any fillers or fibrous material that may be present in the workpiece.

72. The method of embodiment 64, wherein the polymerizable material is a photopolymerizable material and the mold is operated at, or during molding operations is continuously cooled to, a temperature less than the melting point or Vicat softening point of the plastic or polymeric material from which the workpiece is formed.

73. The method of embodiment 55, wherein the settable material comprises one or more of a clay (e.g., kalolin), concrete, plaster, powdered metal, powdered plastic, or a preceramic polymer.

74. The method of any of embodiments 55-73, wherein the settable, polymerizable, thermoplastic, or thermoset materials comprises 0-50%, 0-1%, 1-5%, 1-20%, 1-50%, 5-10%, 5-25%, 5-50%, 10 20%, 10-50%, 20-30%, 20-50%, 30-40%, 30-50%, or 40-50% by weight of fiber reinforcement material based upon the weight of the fiber reinforcement and the settable, polymerizable, thermoplastic, or thermoset materials.

75. The method of embodiment 74, wherein the fiber reinforcement material comprises mineral, glass, and/or graphite fibers.

76. The method of embodiment 74, wherein the fiber reinforcement material comprises a polymeric material.

77. The method of any of embodiments 74-76, wherein the fibers are in the form of tow with a length less than 2, 4, 6, 8, 10, 12, 14, 16, 18, or 20 millimeters.

78. A mold for molding polymerizable, settable, thermoplastic, or thermoset materials, or a section thereof, comprising:
a shaped plastic or polymeric workpiece; and
a laminated metal coating;
wherein the shaped plastic or polymeric workpiece optionally comprises one, two, three, or more conductive or nonconductive particles, filler, tow, woven fabrics, non-woven fabric, and/or foam sheets; and
wherein the workpiece, mold, or section thereof optionally comprises cooling fins and/or ports for the circulation of liquid or gas to maintain mold temperature.

79. The mold or section thereof of embodiment 78, wherein the plastic or polymeric material comprises one, two, three, or more of nonconductive and/or conductive: particles, filler, tow, woven fabrics, non-woven fabric, and/or foam sheets.

80. The mold or section thereof of embodiment 78 or embodiment 79, wherein the tow, woven fabrics, non-woven fabrics, and/or foam sheets comprise polymer materials and/or non-polymeric materials.

81. The mold of embodiment 79 or embodiment 80, wherein the mold comprises one, two, three, four, or more layers of woven fabrics, non-woven fabrics, and/or foam sheets.

82. The mold of any of embodiments 78-81, wherein the plastic or polymeric material is a conductive plastic or polymeric material with a volume resistance from 10-1 to 10-7 ohm cm, as measured by ASTM D257-14.

83. The mold of any of embodiments 78-81, wherein the plastic or polymeric material is a partially-conductive plastic or polymeric material with a volume resistance from 10-1 to 106, as measured by ASTM D257.

84. The mold of any of embodiments 78-81, wherein the plastic or polymeric material is a non-conductive plastic or polymeric material with a volume resistance greater than 106, 107, 1010, 1015, or 1018 ohm cm, as measured by ASTM D257.

85. The mold of any of embodiments 78-81, wherein the plastic or polymeric material comprises one, two, three, or more of arylamides, arylamides, Polybenzimidazole (PBI), polyetherimide, polyetherketoneketone (PEKK), polyether ether ketone (PEEK), polyamide, polyimide, polyamide-imides, polyphenylene oxide (PPO), polystyrene (PS), polyphenylene oxide (PPO) and polystyrene (PS), polyphthalamide (PPA), polyvinyl alcohol (PVA), acrylonitrile butadiene styrene (ABS), polycarbonate (PC), polylactic acid (PLA), PC/ABS, polyphenylsulfone (PPSU), thermosets, PBI-PEEK, urea, epoxies, cyanate esters, polyurethanes, or a combination of any one or more, two or more, or three or more of the foregoing.

86. The mold of any of embodiments 78-85, wherein the plastic or polymeric material comprises, consists essentially of, or consists of a plastic or polymeric material that has a melting, softening, or decomposition point greater than 150° C., 175° C., 200° C., 225° C., 250° C., 275° C., or 300° C.

87. The mold of any of embodiments 78-86, wherein the plastic or polymeric material has a Vicat softening point greater than 150° C., 175° C., 200° C., 225° C., or 250° C. as assessed under ASTM D1525-09 (2009).

88. The mold of any of embodiments 78-87, wherein the plastic or polymeric material further comprises reinforcing fiber.

89. The mold of embodiment 88, wherein the plastic or polymer material comprises 0-50%, 0-1%, 1 5%, 1-20%, 1-50%, 5-10%, 5-25%, 5-50%, 10-20%, 10-50%, 20-30%, 20-50%, 30-40%, 30 50%, or 40-50% by weight fiber reinforcement material based upon the weight of the fiber reinforcement and plastic or polymer material.

90. The mold of embodiment 89, wherein the fiber reinforcement material comprises mineral, glass, and/or graphite fibers.

91. The mold of embodiment 89, wherein the fiber reinforcement material comprises a polymeric material.

92. The mold of any of embodiments 88-91, wherein the reinforcing fibers are in the form of a woven or non-woven material, selected from the group consisting of tow with a length less than 1, 2, 4, 6, 8, 10, 12, 14, 16, 18, or 20 millimeters, polymeric or non-polymeric sheets, strands, ropes, or tubes, or a combination of any of the foregoing (e.g., a series of layers).

93. The mold of any of embodiments 88-92, wherein the plastic or polymeric comprising reinforcing fiber material has a Vicat softening point greater than 150° C., 175° C., 200° C., 225° C., 250° C., 275° C., 300° C., or 325° C., as assessed under ASTM D1525-09 (2009).

94. The mold of any embodiments 78-93, wherein the mold further comprises a layer comprising a metal or metal alloy deposited by electroless deposition between the shaped workpiece and the laminated metal coating.

95. The mold of any embodiments 78-94, wherein the laminated metal coating comprises at least a first type of metal or metal alloy and second layer comprising a second type of metal or metal alloy, wherein the first type of metal or metal alloy is different from the second type of metal or metal alloy.

96. The mold of embodiment 95, wherein one, two, three, four, five, six, or more of the first type of metal or metal alloy layers and/or one, two, three, four, five, six, or more of the second type of metal or metal alloy layers is less than 100, 10, 1, 0.1, or 0.01 microns thick.

97. The mold of embodiment 95, wherein each of the first type of metal or metal alloy layers and/or each of the second type of metal or metal alloy layers is less than 100, 10, 1, 0.1, or 0.01 microns thick.

98. The mold of any of embodiments 95-97, wherein the first and second type of metal or metal alloy layers differ in one, two, three, or more of chemical (elemental) composition, grain size, defect density, grain orientation, the presence of intermetallic compositions, and the presence of amorphous metallic glass compositions.

99. The mold of any of embodiments 95-98, wherein the first type or second type of layers comprise a "fine-grained" or "ultrafine-grained" metal or metal alloy, having an average grain size selected independently for any one, two, three, four, five, six, or more layers from a range of 1 nm to 5,000 nm, 1-20 nm, 1-100 nm, 5-50 nm, 5-100 nm, 5-200 nm, 10-100 nm, 10-200 nm, 20-200 nm, 20-250 nm, 20-500 nm, 50-250 nm, 50-500 nm, 100-500 nm, 200-1,000 nm, 500-2,000 nm, and 1,000-5,000 nm, based on the measurement of grain size in micrographs.

100. The mold of embodiment 99, where the fine-grained metals and alloys have a high degree of twinning between metal grains, and remain ductile while having one or more properties selected from increased hardness, tensile strength, and corrosion resistance relative to an electrodeposited metal or alloy of the same composition with a grain size from 5,000 to 20,000 nm or greater.

101. The mold of any of embodiments 95-100, wherein the first type and/or second type of layers comprise one, two, three, four, or more elements selected independently for each layer from the group consisting of Ag, Al, Au, B, Be, C, Cr, Cu, Fe, Hg, In, Ir, Mg, Mn, Mo, Nb, Nd, P, Pd, Pt, Re, Rh, Sb, Si, Sn, Pb, Ta, Ti, W, V, Zn, and Zr, selected independently for each layer.

102. The mold of any of embodiments 95-100, wherein the first type and/or second type of layers comprise two or more or three or more elements selected independently for each layer from the group consisting of Ag, Al, Au, B, Be, C, Cr, Cu, Fe, Hg, In, Ir, Mg, Mn, Mo, Nb, Nd, P, Pd, Pt, Re, Rh, Sb, Si, Sn, Pb, Ta, Ti, W, V, Zn, and Zr.

103. The mold of any of embodiments 95-100, wherein the first type and/or second type of layers comprise, consist essentially of, or consists of two or more, three or more, or four or more elements selected independently for each layer from the group consisting of NiCr, NiFe, NiCo, NiCrCo, NiAl, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiNb, NiCrNb, NiFeNb, NiCoNb, NiCrCoNb, NiTi, NiCrTi, NiFeTi, NiCoTi, NiCrCoTi, NiCrP, NiCrAl, NiCoP, NiCoAl, NiFeP, NiFeAl, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi, and FeCrB.

104. The mold of any of embodiments 78-103, wherein the coefficient of thermal expansion of the metal or alloy from which one or more (e.g., one, two, three, four, or more, or all) types of layers in the laminated metal coating and the coefficient of thermal expansion of the plastic or polymeric material from which the workpiece was formed differ by less than 20%, 15%, 10%, 5%, or 2%;

with the proviso that the coefficient of thermal expansion for the plastic or polymeric material from which the workpiece is formed is determined with any fibrous material that may be present in the workpiece.

105. The mold of embodiment 101, wherein the coefficient of thermal expansion of the metal or alloy from which one or more (e.g., one, two, three, four, or more, or all) types of layers in the laminated metal coating and the coefficient of thermal expansion of the plastic or polymeric material from which the workpiece was formed differ by less than 15%, 10%, 7.5%, 5%, or 2% at each temperature over the range of 100 degrees Centigrade to 200 degrees Centigrade.

106. The mold of any of embodiments 78-105, wherein the coefficient of thermal expansion of metal or alloy from which the first type of layer and the second type of layer is formed differ by less than 20%, 15%, 10%, 5%, or 2%.

107. The mold of any of embodiments 78-106, wherein the laminated metal coating has a Vickers microhardness as measured by ASTM E384-11e1 of 75-200, 100-150, 100-300, 300-600, 150-250, 250-350, 350-550, 550-750, 550-600, 600-650, 600-900, 650-700, 700-750, 750-800, 750-1000, 800-850, 850-900, 900-1000, 1000-1100, 1000-1200, 1100-1200, or 1200 or more without heat treatment.

108. The mold of any of embodiments 78-107, wherein the laminated metal coating displays 5%, 10%, 20%, 30%, or 40% less loss of weight than a control homogeneous coating having an average composition of the laminated metal coating when the laminated metal coating and the control homogenous coating are subject to comparison using a Taber Abraser equipped with CS-10 wheels and a 250 g load and operated at room temperature at the same speed for both samples (e.g., 95 RPM).

109. The mold of any of embodiments 78-108, wherein the laminated metal coatings display a higher abrasion resistance when subject to testing under ASTM D4060 than a control homogeneous coating having an average composition of the laminated metal coating.

110. The mold of any of embodiments 78-109, wherein the laminated metal coatings display a higher abrasion resistance when subject to block on ring testing under ASTM G77-05 2010 than a control homogeneous coating having an average composition of the laminated metal coating.

111. The mold of any of embodiments 78-110, wherein the coefficient of thermal expansion of the laminated metal coating is less than $50 \times 10-6/°$ C. from 100 to $300°$ C.

112. The mold of any of embodiments 78-111, wherein the coefficient of thermal expansion of the laminated metal coating is less than $40 \times 10-6/°$ C., $30 \times 10-6/°$ C., $20 \times 10-6/°$ C., or $10 \times 10-6/°$ C. from 100 to $300°$ C.

113. The mold of any of embodiments 78-112, wherein the coefficient of thermal expansion of the laminated metal coating is less than $40 \times 10-6/°$, wherein the coefficient of thermal expansion of the plastic or polymeric material used to prepare the workpiece is less than $100 \times 10-6/°$ C. from 100 to $300°$ C.;

with the proviso that the coefficient of thermal expansion for the plastic or polymeric material from which the workpiece is formed is determined with any fibrous material that may be present in the workpiece.

114. The mold of any of embodiments 78-113, wherein the coefficient of thermal expansion is less than $40 \times 10-6/°$ C., $30 \times 10-6/°$ C., $20 \times 10-6/°$ C., or $10 \times 10-6/°$ C. from 100 to $300°$ C.

115. The mold of any of embodiments 78-114, wherein the laminated metal coatings are substantially free of surface defects.
116. The mold of any of embodiments 78-115, wherein the surface defects comprise porosity and/or voids.
117. The mold of any of embodiments 78-116, wherein the nanolaminate coating has a substantially uniform thickness over two or more of protruding features, recessed features, or a combination of protruding and recessed features;
  wherein the features each have an aspect ratio of ten or less.
118. The mold of any of embodiments 78-117, wherein the nanolaminate coating has a substantially uniform thickness over two or more features wherein the features have a surface aspect ratio of ten or less.
119. The mold of embodiment 118, wherein the surface aspect ratio is from 0.5 to 10.
120. The mold of any of embodiments 78-119, wherein the complete mold comprises one or more sections.
121. The mold of embodiment 120, wherein the mold comprises two sections, three sections, or four or more pieces.
122. A mold, or section thereof, prepared by the method of any of embodiments 1-54.
123. A method for preparing a mold, the method comprising:
  forming a mold by applying a laminated coating on a surface of a shaped workpiece, the mold comprising:
    A) a surface with a first feature and a second feature that have a surface aspect ratio ranging from about 1 to about 10, the surface aspect ratio being defined as:

$$\left| \frac{\text{(height of the first feature)} - \text{(height of the second feature)}}{\text{distance between the first feature and the second feature}} \right|;$$

B) one or more cooling fins or ports configured to allow for circulation of liquid or gas through a portion of the mold; or
    C) both A) and B).
124. A method for preparing a mold, the method comprising:
  forming a mold by applying a laminated coating on a surface of a shaped workpiece, the mold comprising a surface with a first feature and a second feature that have a surface aspect ratio ranging from about 1 to about 10, the surface aspect ratio being defined as:

$$\left| \frac{\text{(height of the first feature)} - \text{(height of the second feature)}}{\text{distance between the first feature and the second feature}} \right|.$$

125. A method for preparing a mold, the method comprising:
  forming a mold by applying a laminated coating on a surface of a shaped workpiece, the mold comprising one or more cooling fins or ports configured to allow for circulation of liquid or gas through a portion of the mold.
126. A method for preparing a mold, the method comprising:
  forming a mold by applying a laminated coating on a surface of a shaped workpiece, the mold comprising:
    A) a surface with a first feature and a second feature that have a surface aspect ratio ranging from about 1 to about 10, the surface aspect ratio being defined as:

$$\left| \frac{\text{(height of the first feature)} - \text{(height of the second feature)}}{\text{distance between the first feature and the second feature}} \right|;$$

and
    B) one or more cooling fins or ports configured to allow for circulation of liquid or gas through a portion of the mold.
127. The method of any of embodiments 123 to 126, wherein the shaped workpiece is a shaped metal workpiece.
128. The method of embodiment 127, further comprising forming the shaped metal workpiece by shaping a metal material using additive manufacturing.
129. The method of any of embodiments 123 to 126, wherein the shaped workpiece is a shaped polymeric workpiece.
130. The method of embodiment 129, further comprising forming the shaped polymeric workpiece by shaping a polymeric material.
131. The method of embodiment 130, wherein the shaping the polymeric material comprises one, two, three, or more of casting, injection molding, blow molding, extrusion molding, cutting, machining, milling, grinding, sanding, polishing, abrasive blasting, three-dimensional printing (3D printing), selective laser sintering (SLS) or sintering laser melting (SLM), fused deposition modeling (FDM), stereolithography (SLA), continuous liquid interface printing (CLIP), cutting or forming of woven fabrics, non-woven fabric, or foam sheets, or a combination thereof.
132. The method of embodiment 130 or 131, wherein the shaping the polymeric material comprises of casting, injection molding, blow molding, or extrusion molding.
133. The method of any of embodiments 130 to 132, wherein the shaping the polymeric material comprises a mechanically removing a portion of the polymeric material.
134. The method of embodiment 133, wherein the mechanically removing the polymeric material comprises cutting, milling, grinding, sanding, polishing, or abrasive blasting.
135. The method of any of embodiments 130 to 134, wherein the shaping the polymeric material comprises an additive manufacturing process.
136. The method of embodiment 135, wherein the additive manufacturing process comprises one, two, or more of three-dimensional printing (3D printing), selective laser sintering (SLS), sintering laser melting (SLM), fused deposition modeling (FDM), stereolithography (SLA), or continuous liquid interface printing (CLIP).
137. The method of any of embodiments 130-136, wherein the shaping the polymeric material comprises cutting or forming of woven or non-woven fabrics or foam sheets.
138. The method of embodiment 137, wherein the woven fabrics, non-woven fabrics, or foam sheets comprise the polymeric material.
139. The method of embodiment 137 or 138, wherein the woven fabrics, non-woven fabrics, or foam sheets comprise non-polymeric materials.
140. The method of any of embodiments 138 to 139, wherein the forming of woven fabrics, non-woven fabrics, or foam sheets comprises layering at least two layers of woven fabrics, non-woven fabrics, or foam sheets.
141. The method of any of embodiments 130 to 140, wherein the shaping the polymeric material comprises two, three, or more of casting, cutting, milling, grinding, sanding, polishing, abrasive blasting, three-dimensional printing (3D printing), selective laser sintering (SLS) or sintering laser melting (SLM), fused deposition modeling (FDM), stereolithography (SLA), continuous liquid interface printing (CLIP), cutting or forming of woven or non-woven fabrics, and cutting and/or forming of foam sheets.
142. The method of any of embodiments of 130, 131, or 133 to 141, wherein shaping the polymeric material comprises two, three, or more of cutting, milling, three-dimensional printing (3D printing), fused deposition modeling (FDM), stereolithography (SLA), continuous liquid interface printing (CLIP), cutting or forming of woven or non-woven fabrics, and cutting or forming of foam sheets.

143. The method of any of embodiments 129 to 142, wherein the polymeric workpiece comprises a conductive polymeric material with a volume resistance from $10^{-1}$ to $10^{-7}$ ohm cm as measured by ASTM D257-14.

144. The method of any of embodiments 129 to 143, wherein the polymeric workpiece comprises a partially-conductive polymeric material with a volume resistance from $10^{-1}$ to $10^2$ as measured by ASTM D257.

145. The method of any of embodiments 129 to 144, wherein the polymeric workpiece comprises a non-conductive polymeric material with a resistance greater than $10^6$, $10^7$, $10^{10}$, $10^{15}$, or $10^{18}$ ohm cm as measured by ASTM D257.

146. The method of any of embodiments 129 to 145, wherein the polymeric workpiece comprises one, two, three, or more of polyetherimide, polyetherketoneketone (PEKK), polyether ether ketone (PEEK), polyamide, polyvinyl alcohol (PVA), acrylonitrile butadiene styrene (ABS), polycarbonate (PC), polylactic acid (PLA), PC/ABS, polyphenylsulfone (PPSU) or a combination of any one or more, two or more, or three or more of the foregoing.

147. The method of any of embodiments 129 to 146, wherein the polymeric workpiece comprises, consists essentially of, or consists of a polymeric material that has a decomposition point greater than 150° C., 175° C., 200° C., 225° C., 250° C., 275° C., or 300° C.

148. The method of any of embodiments 129 to 147, wherein the polymeric workpiece comprises a polymeric material that has a Vicat softening point greater than 150° C., 175° C., 200° C., 225° C., or 250° C. as assessed under ASTM D1525-09.

149. The method of any of embodiments 129 to 148, wherein the polymeric workpiece comprises a polymeric material further comprising reinforcing fiber.

150. The method of any of embodiments 129 to 149, wherein the polymer material comprises 0-50%, 0-1%, 1-5%, 1-20%, 1-50%, 5-10%, 5-25%, 5-50%, 10-20%, 10-50%, 20-30%, 20-50%, 30-40%, 30-50%, or 40-50% by weight of a fiber reinforcement material based upon the weight of the fiber reinforcement material and polymer material.

151. The method of embodiment 149 or 150, wherein the fiber reinforcement material comprises mineral, glass, or graphite fibers.

152. The method of any of embodiments 149 to 151, wherein the fiber reinforcement material comprises a polymeric material.

153. The method of any of embodiments 149 to 152, wherein the fiber reinforcement material is in the form of tow with a length less than 2, 4, 6, 8, 10, 12, 14, 16, 18, or 20 millimeters.

154. The method of any of embodiments 149 to 153, wherein the polymeric material comprising the fiber reinforcement material has a Vicat softening point greater than 150° C., 175° C., 200° C., 225° C., 250° C., 275° C., 300° C., or 325° C. as assessed under ASTM D1525-09.

155. The method of any of embodiments 123 to 153, wherein applying the laminated coating to the surface of the polymeric workpiece comprises one, two, or more of vapor phase deposition, vacuum deposition, electroless deposition, electrophoretic deposition, or electrochemical deposition (electroplating) of a laminated coating.

156. The method of any of embodiments 123 to 155, wherein the method comprises vapor phase deposition, vacuum deposition, or electroless deposition of a laminated coating.

157. The method of any of embodiments 123 to 156, wherein the method comprises electroless deposition or electrochemical deposition of a laminated coating.

158. The method of any of embodiments 129 to 157, further comprising applying a conductive layer to the surface of the shaped polymeric workpiece by electroless deposition, the conductive layer being sufficient to render the shaped polymeric workpiece sufficiently conductive to permit electrodeposition of the laminated conductive coating 159. The method of any one of embodiments 129 to 158, wherein the polymeric workpiece comprises a plastic.

160. The method of embodiment 158 or 159, wherein the conductive layer is a metal.

161. The method of any of embodiments 155 to 160, wherein the electrodeposition of a laminated coating comprises one, two, or more of potentiometric (potentiostatic), amperometric (galvanostatic), pulse current, pulse reverse current, modulated current, modulated frequency, and continuous transitioned current electroplating.

162. The method of any of embodiments 123 to 161, wherein the laminated coating comprises at least a first layer comprising a first metal or a first metal alloy and a second layer comprising a second metal or a second metal alloy.

163. The method of embodiment 162, wherein the first metal alloy comprises the first metal and the second metal in a first concentration ratio, and the second metal alloy comprises the first and the second metal in a second concentration ratio.

164. The method of embodiment 162 or 163, wherein the laminated coating comprises a plurality of alternating first layers and second layers.

165. The method of embodiment 164, wherein one, two, three, four, five, six, or more of the first layers and/or one, two, three, four, five, six, or more of the second layers is less than 100 microns, 10 microns, 1 micron, 0.1 microns, or 0.01 microns thick.

166. The method of any of embodiments 162 to 165, wherein each of the first layers and/or each of the second layers is less than 100 microns, 10 microns, 1 micron, 0.1 microns, or 0.01 microns thick.

167. The method of any of embodiments 162 to 165, wherein the first and second layers differ in one, two, three, or more of chemical composition, grain size, defect density, grain orientation, presence of intermetallic compositions, presence of amorphous metallic glass compositions, or a combination thereof.

168. The method of any of embodiments 162 to 167, wherein the first layer or the second layer comprises a fine-grained or ultrafine-grained metal or metal alloy having an average grain size selected independently for any one, two, three, four, five, six, or more layers ranging from about 1 nm to about 5,000 nm, from about 1 nm to about 20 nm, from about 1 nm to about 100 nm, from about 5 nm to about 50 nm, from about 5 nm to about 100 nm, from about 5 nm to about 200 nm, from about 10 nm to about 100 nm, from about 10 nm to about 200 nm, from about 20 nm to about 200 nm, from about 20 nm to about 250 nm, from about 20 nm to about 500 nm, from about 50 nm to about 250 nm, from about 50 nm to about 500 nm, from about 100 nm to about 500 nm, from about 200 nm to about 1,000 nm, from about 500 nm to about 2,000 nm, or from about 1,000 nm to about 5,000 nm, based on the measurement of grain size in micrographs.

169. The method of any of embodiments 162 to 168, wherein the first layer or the second layer comprises a fine-grained or ultrafine-grained metal or metal alloy having an average grain size ranging from about 1 nm to about 5,000 nm, based on the measurement of grain size in micrographs.

170. The method of embodiment 169, wherein the fine-grained or ultrafine-grained metal or metal alloys have a high degree of twinning between metal grains, and remain ductile while having increased hardness, tensile strength, corrosion resistance, or a combination thereof, relative to an metal or alloy of the same composition with a grain size greater than about 5,000 nm electrodeposited on a substantially similar workpiece.

171. The method of embodiment 169 or 170, wherein the fine-grained or ultrafine-grained metal or metal alloys have a high degree of twinning between metal grains, and remain ductile while having increased hardness, tensile strength, or corrosion resistance relative to an electrodeposited metal or alloy of the same composition with a grain size ranging from about 5,000 nm to about 20,000 nm.

172. The method of any of embodiments 162 to 171, wherein the first layer or second layer comprises one, two, three, four, or more of Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, Zr, or a combination thereof, selected independently for each layer.

173. The method of any of embodiments 162 to 172, wherein the first or second layers comprise two or more or three or more elements selected independently for each layer from Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, or Zr.

174. The method of any of embodiments 162 to 173, wherein the first layer or second layer comprises two or more, three or more, or four or more alloys selected independently for each layer from NiCr, NiFe, NiCo, NiCrCo, NiAl, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiNb, NiCrNb, NiFeNb, NiCoNb, NiCrCoNb, NiTi, NiCrTi, NiFeTi, NiCoTi, NiCrCoTi, NiCrP, NiCrAl, NiCoP, NiCoAl, NiFeP, NiFeAl, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi, or FeCrB.

175. The method of any of embodiments 162 to 174, wherein the laminated conductive coating has a first coefficient of thermal expansion that differs less than 20%, 15%, 10%, 5%, or 2% from a second coefficient of thermal expansion of the metal or alloy of the first or second layers and a third coefficient of thermal expansion of the polymeric material from which the workpiece was formed including any fibrous material that is present in the shaped polymeric workpiece.

176. The method of any of embodiments 162 to 175, wherein the coefficient of thermal expansion of metal or alloy of the first layer and the coefficient of thermal expansion of metal or alloy of the second type of layer differ by less than 20%, less than 15%, less than 10%, less than 5%, or less than 2%.

177. The method of any of embodiments 123 to 176, wherein the laminated coatings display a higher abrasion resistance when subject to block on ring testing under ASTM G77-05 2010 than a control homogeneous coating having the average composition of the laminated coating.

178. The method of any of embodiments 123 to 177, wherein the laminated coating has a coefficient of thermal expansion, and the coefficient of thermal expansion of the laminated coating is less than $50 \times 10^{-6}/°$ C. from 100 to 300° C.

179. The method of any of embodiments 123 to 178, wherein the coefficient of thermal expansion of the laminated coating is less than $40 \times 10^{-6}/°$ C., less than $30 \times 10^{-6}/°$ C., less than $20 \times 10^{-6}/°$ C., or less than $10 \times 10^{-6}/°$ C. from 100 to 300° C.

180. The method of any of embodiments 126 to 179, wherein the polymeric material used to prepare the workpiece has a coefficient of thermal expansion that is less than $100 \times 10^{-6}/°$ C. from 100 to 300° C., the coefficient of thermal expansion for the polymeric material from which the workpiece is formed being determined with any fibrous material that may be present in the workpiece.

181. The method of any of embodiments 126 to 180, wherein the coefficient of thermal expansion of the polymeric material used to prepare the workpiece is less than $40 \times 10^{-6}/°$ C., less than $30 \times 10^{-6}/°$ C., less than $20 \times 10^{-6}/°$ C., or less than $10 \times 10^{-6}/°$ C. from 100 to 300° C.

182. The method of any of embodiments 123 to 181, wherein the laminated coating is substantially free of surface defects.

183. The method of embodiment 182, wherein the surface defects comprise porosity or voids.

184. The method of any of embodiments 123 to 183, wherein the laminated coating is a nanolaminate coating and has a substantially uniform thickness over two or more protruding features, recessed features, or a combination thereof, that each have an aspect ratio of ten or less.

185. The method of any of embodiments 123 to 184, wherein the laminated coating is a nanolaminated coating and has a substantially uniform thickness over two or more protruding features, recessed features, or a combination thereof, wherein the features have a surface aspect ratio of ten or less.

186. The method of any of embodiments 123 to 185, wherein the mold comprises two or more sections.

187. The method of any of embodiments 123 to 186, wherein the mold comprises two sections, three sections, or four or more sections.

188. The method of any of embodiments 123 to 187, further comprising providing the shaped workpiece.

189. The method of any of embodiments 123 to 188, wherein a test specimen of the laminated coating of the same composition, structure, and thickness, has a Vickers microhardness as measured by ASTM E384-11e1 ranging from 75 to 200, from 100 to 150, from 100 to 300, from 300 to 600, from 150 to 250, from 250 to 350, from 350 to 550, from 550 to 750, from 550 to 600, from 600 to 650, from 600 to 900, from 650 to 700, from 700 to 750, from 750 to 800, from 750 to 1000, from 800 to 850, from 850 to 900, from 900 to 1000, from 1000 to 1100, from 1000 to 1200, from 1100 to 1200, or 1200 or more without heat treatment.

190. The method of any of embodiments 123 to 189, wherein the laminated coatings display 5%, 10%, 20%, 30%, or 40% less loss of weight than a control homogeneous coating having the average composition of the laminated coating when the laminated coating and the control coating are subject to comparison using a Taber Abraser equipped with CS-10 wheels and a 250 g load and operated at room temperature at the same speed for both samples (e.g., 95 RPM).

191. The method of any of embodiments 123 to 190, wherein the laminated coatings display a higher abrasion resistance when subject to testing under ASTM D4060 than a control homogeneous coating having the average composition of the laminated coating.

192. A mold prepared by the method of any of embodiments 123 to 191.

193. A mold comprising:
a shaped workpiece; and
a laminated coating on a surface of the shaped workpiece, wherein the mold comprises:
A) a surface with a first feature and a second feature that have a surface aspect ratio ranging from about 1 to about 10, the surface aspect ratio being defined as:

$$\left| \frac{\text{(height of the first feature)} - \text{(height of the second feature)}}{\text{distance between the first feature and the second feature}} \right|;$$

B) one or more cooling fins or ports configured to allow for circulation of liquid or gas through a portion of the mold; or
C) both A) and B).

194. A mold comprising:
a shaped workpiece; and
a laminated coating on a surface of the shaped workpiece, wherein the mold comprises a surface with a first feature and a second feature that have a surface aspect ratio ranging from about 1 to about 10, the surface aspect ratio being defined as:

$$\left| \frac{\text{(height of the first feature)} - \text{(height of the second feature)}}{\text{distance between the first feature and the second feature}} \right|.$$

195. A mold comprising:
a shaped workpiece; and
a laminated coating on a surface of the shaped workpiece, wherein the mold comprises:
A) a surface with a first feature and a second feature that have a surface aspect ratio ranging from about 1 to about 10, the surface aspect ratio being defined as:

$$\left| \frac{\text{(height of the first feature)} - \text{(height of the second feature)}}{\text{distance between the first feature and the second feature}} \right|;$$

and
B) one or more cooling fins or ports configured to allow for circulation of liquid or gas through a portion of the mold.

196. A mold comprising:
a shaped workpiece; and
a laminated coating on a surface of the shaped workpiece, wherein the mold comprises one or more cooling fins or ports configured to allow for circulation of liquid or gas through a portion of the mold.

197. The mold of any one of claims 193 to 196, wherein the shaped workpiece comprises a polymeric material.

198. The mold of embodiment 197, wherein the polymeric material comprises a partially-conductive polymeric material with a volume resistance from $10^{-1}$ to $10^6$, as measured by ASTM D257.

199. The mold of embodiment 197, wherein the polymeric material comprises a non-conductive polymeric material with a volume resistance greater than $10^6$ ohm cm, greater than $10^7$ ohm cm, greater than $10^{10}$ ohm cm, greater than $10^{15}$ ohm cm, or greater than $10^{18}$ ohm cm, as measured by ASTM D257.

200. The mold of embodiment 197, wherein the polymeric material comprises a conductive polymeric material with a volume resistance from $10^{-1}$ to $10^{-7}$ ohm cm, as measured by ASTM D257-14.

201. The mold of any of embodiments 197 to 200, wherein the polymeric material has a melting, softening, or decomposition point greater than 150° C., greater than 175° C., greater than 200° C., greater than 225° C., greater than 250° C., greater than 275° C., or greater than 300° C.

202. The mold of any of embodiments 197 to 201, wherein the polymeric material has a Vicat softening point greater than 150° C., greater than 175° C., greater than 200° C., greater than 225° C., or greater than 250° C. as assessed under ASTM D1525-09 (2009).

203. The mold of any of embodiments 197 to 202, wherein the polymeric material comprises a plastic.

204. The mold of any of embodiments 193 to 203, wherein the polymeric material further comprises a fiber reinforcement material.

205. The mold of embodiment 197 to 204, wherein the polymer material comprises from 0% to 50%, from 0% to 1%, from 1% to 5%, from 1% to 20%, from 1% to 50%, from 5% to 10%, from 5% to 25%, from 5% to 50%, from 10% to 20%, from 10% to 50%, from 20% to 30%, from 20% to 50%, from 30% to 40%, from 30% to 50%, or from 40% to 50% by weight fiber reinforcement material based upon the combined weight of the fiber reinforcement and polymer material.

206. The mold of embodiment 204 or 205, wherein the fiber reinforcement material comprises mineral, glass, graphite fibers, or a combination thereof.

207. The mold of any of embodiments 204 to 206, wherein the fiber reinforcement material comprises a polymeric material.

208. The mold of any of embodiments 204 to 207, wherein the a fiber reinforcement material are in the form of a woven or non-woven material comprising tow with a length less than 1 millimeter, less than 2 millimeters, less than 4 millimeters, less than 6 millimeters, less than 8 millimeters, less than 10 millimeters, less than 12 millimeters, less than 14 millimeters, less than 16 millimeters, less than 18 millimeters, or less than 20 millimeters, polymeric or non-polymeric sheets, strands, ropes, tubes, or a combination of any of the foregoing (e.g., a series of layers).

209. The mold of any of embodiments 204 to 208, wherein the polymeric material comprises a fiber reinforcement material has a Vicat softening point greater than 150° C., greater than 175° C., greater than 200° C., greater than 225° C., greater than 250° C., greater than 275° C., greater than 300° C., or greater than 325° C., as assessed under ASTM D1525-09 (2009).

210. The mold of any embodiments 193 to 209, wherein the mold further comprises a layer comprising a metal or metal alloy deposited by electroless deposition between the shaped workpiece and the laminated coating.

211. The mold of any of embodiments 193 to 210, wherein the laminated coating comprises at least a first layer comprising a first metal or a first metal alloy and second layer comprising a second metal or a second metal alloy.

212. The mold of embodiment 211, wherein the first metal alloy comprises the first metal and the second metal in a first concentration ratio, and the second metal alloy comprises the first and the second metal in a second concentration ratio.

213. The mold of embodiment 211 or 212, wherein one, two, three, four, five, six, or more of the first layers or one, two, three, four, five, six, or more of the second layers is less than 100 microns, less than 10 microns, less than 1 microns, less than 0.1 microns, or less than 0.01 microns thick.

214. The mold of any of embodiments 211 to 213, wherein each of the first layers or each of the second layers is less than 100 microns, less than 10 microns, less than 1 microns, less than 0.1 microns, or less than 0.01 microns thick.

215. The mold of any of embodiments 211 to 214, wherein the first and second layers differ in one, two, three, or more of chemical composition, grain size, defect density, grain orientation, presence of intermetallic compositions, presence of amorphous metallic glass compositions, or a combination thereof.

216. The mold of any of embodiments 211 to 216, wherein the first or second layers comprise a fine-grained or ultrafine-grained metal or metal alloy, having an average grain size selected independently for any one, two, three, four, five, six, or more layers ranging from about 1 nm to about 5,000 nm, from about 1 nm to about 20 nm, from about 1 nm to about 100 nm, from about 5 nm to about 50 nm, from about 5 nm to about 100 nm, from about 5 nm to about 200 nm, from about 10 nm to about 100 nm, from about 10 nm to about 200 nm, from about 20 nm to about 200 nm, from about 20 nm to about 250 nm, from about 20 nm to about 500 nm, from about 50 nm to about 250 nm, from about 50 nm to about 500 nm, from about 100 nm to about 500 nm, from about 200 nm to about 1,000 nm, from about 500 nm to about 2,000 nm, or from about 1,000 nm to about 5,000 nm, based on the measurement of grain size in micrographs.

217. The mold of any of embodiments 211 to 215, wherein the first layer or the second layer comprises a fine-grained or ultrafine-grained metal or metal alloy having an average grain size ranging from about 1 nm to about 5,000 nm, based on the measurement of grain size in micrographs.

218. The mold of embodiment 216 or 217, wherein the fine-grained or ultrafine-grained metal or metal alloys have a high degree of twinning between metal grains, and remain ductile while having increased hardness, tensile strength, corrosion resistance, or a combination thereof relative to a metal or alloy of the same composition with a grain size greater than about 5,000 nm electrodeposited on a substantially similar workpiece.

219. The mold of any of embodiments 216 to 218, wherein the fine-grained or ultrafine-grained metal or metal alloys have a high degree of twinning between metal grains, and remain ductile while having increased hardness, tensile strength, or corrosion resistance relative to an electrodeposited metal or alloy of the same composition with a grain size ranging from about 5,000 to about 20,000 nm.

220. The mold of any of embodiments 211 to 218, wherein the first or second layer comprises one, two, three, four, or more of Ag, Al, Au, B, Be, C, Cr, Cu, Fe, Hg, In, Ir, Mg, Mn, Mo, Nb, Nd, P, Pd, Pt, Re, Rh, Sb, Si, Sn, Pb, Ta, Ti, W, V, Zn, Zr, or a combination thereof, selected independently for each layer.

221. The mold of any of embodiments 211 to 220, wherein the first or second layers comprise two or more or three or more elements selected independently for each layer from Ag, Al, Au, B, Be, C, Cr, Cu, Fe, Hg, In, Ir, Mg, Mn, Mo, Nb, Nd, P, Pd, Pt, Re, Rh, Sb, Si, Sn, Pb, Ta, Ti, W, V, Zn, Zr, or a combination thereof.

222. The mold of any of embodiments 211 to 221, wherein the first or second layer comprises, consist essentially of, or consists of two or more, three or more, or four or more elements from NiCr, NiFe, NiCo, NiCrCo, NiAl, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiNb, NiCrNb, NiFeNb, NiCoNb, NiCrCoNb, NiTi, NiCrTi, NiFeTi, NiCoTi, NiCrCoTi, NiCrP, NiCrAl, NiCoP, NiCoAl, NiFeP, NiFeAl, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi, FeCrB, or a combination thereof, selected independently for each layer.

223. The mold of any of embodiments 193 to 222, wherein a coefficient of thermal expansion of a metal or alloy in one or more (e.g., one, two, three, four, or more, or all) layers in the laminated coating and a coefficient of thermal expansion of the polymeric material differ by less than about 20%, about 15%, about 10%, about 5%, or about 2%, wherein the coefficient of thermal expansion for the polymeric material includes any fibrous material in the polymeric material.

224. The mold of any of embodiments 193 to 223, wherein the coefficient of thermal expansion of the metal or alloy of one or more (e.g., one, two, three, four, or more, or all) layers in the laminated coating and the coefficient of thermal expansion of the polymeric material differ by less than 15%, less than 10%, less than 7.5%, less than 5%, or less than 2% at each temperature over the range from about 100 degrees Centigrade to about 200 degrees Centigrade.

225. The mold of any of embodiments 211 to 224, wherein the coefficient of thermal expansion of the metal or alloy of the first layer and the coefficient of thermal expansion of the metal or alloy of the second layer differ by less than 20%, less than 15%, less than 10%, less than 5%, or less than 2%.

226. The mold of any of embodiments 193 to 225, wherein the laminated coating has a Vickers microhardness as measured by ASTM E384-11e1 ranging from 75 to 1200, from 75 to 200, from 100 to 150, from 100 to 300, from 300 to 600, from 150 to 250, from 250 to 350, from 350 to 550, from 550 to 750, from 550 to 600, from 600 to 650, from 600 to 900, from 650 to 700, from 700 to 750, from 750 to 800, from 750 to 1000, from 800 to 850, from 850 to 900, from 900 to 1000, from 1000 to 1100, from 1000 to 1200, from 1100 to 1200, or 1200 or more without heat treatment.

227. The mold of any of embodiments 193 to 226, wherein the laminated coating has 5%, 10%, 20%, 30%, or 40% less loss of weight than a control homogeneous coating having an average composition of the laminated coating applied on a substantially similar substrate when the laminated coating and the control homogenous coating are subject to comparison using a Taber Abraser equipped with CS-10 wheels and a 250 g load and operated at room temperature at the same speed for both samples (e.g., 95 RPM).

228. The mold of any of embodiments 193 to 227, wherein the laminated coating has a higher abrasion resistance when subject to testing under ASTM D4060 than a control homogeneous coating having an average composition of the laminated coating applied on a substantially similar substrate.

229. The mold of any of embodiments 193 to 228, wherein the laminated coatings has a higher abrasion resistance when subject to block on ring testing under ASTM G77-05 2010 than a control homogeneous coating having an average composition of the laminated coating applied on a substantially similar substrate.

230. The mold of any of embodiments 193 to 229, wherein the coefficient of thermal expansion of the laminated coating is less than $50\times10^{-6}/°$ C. from 100 to 300° C.

231. The mold of any of embodiments 193 to 230, wherein the coefficient of thermal expansion of the laminated coating is less than $40\times10^{-6}/°$ C., less than $30\times10^{-6}/°$ C., less than $20\times10^{-6}/°$ C., or less than $10\times10^{-6}/°$ C. from 100 to 300° C.

232. The mold of any of embodiments 193 to 231, wherein a coefficient of thermal expansion of the laminated coating is less than $40\times10{-6}/°$, and the coefficient of thermal expansion of the polymeric material is less than $100\times10^{-6}/°$ C. from 100 to 300° C., wherein the coefficient of thermal expansion for the polymeric material is determined including any fibrous material in the polymeric material.

233. The mold of any of embodiments 193 to 232, wherein the coefficient of thermal expansion of the polymeric material used to prepare the workpiece is less than $40\times10^{-6}/°$ C., less than $30\times10^{-6}/°$ C., less than $20\times10^{-6}/°$ C., or less than $10\times10^{-6}/°$ C. from 100 to 300° C.

234. The mold of any of embodiments 193 to 233, wherein the laminated coating is substantially free of surface defects.

235. The mold of embodiment 234, wherein the surface defects comprise porosity or voids.

236. The mold of any of embodiments 193 to 235, wherein the laminate coating has a substantially uniform thickness over two or more protruding features, recessed features, or a combination thereof, that each have an aspect ratio of about ten or less.

237. The mold of any of embodiments 189 to 236, wherein the laminate coating has a substantially uniform thickness over two or more features wherein the features have a surface aspect ratio of about ten or less.

238. The mold of embodiment 237, wherein the surface aspect ratio is from 0.5 to 10.

239. The mold of any of embodiments 193 to 238, wherein the mold comprises one or more sections.

240. The mold of any of embodiments 193 to 239, wherein the mold comprises two sections, three sections, or four or more pieces.

241. The mold of any of embodiments 193 to 240, wherein the mold or section thereof is for molding polymerizable, settable, thermoplastic, or thermoset materials.

242. The mold of any of embodiments 193 to 241, wherein the polymeric material comprises one, two, three, or more conductive particles, conductive filler, conductive tow, conductive woven fabrics, conductive non-woven fabric, conductive foam sheets, or a combination thereof.

243. The mold of any of embodiments 193 to 242, wherein the polymeric material comprises one, two, three, or more nonconductive particles, nonconductive filler, nonconductive tow, nonconductive woven fabrics, nonconductive non-woven fabric, nonconductive foam sheets, or a combination thereof.

244. The mold of embodiment 242 or 243, wherein the tow, woven fabrics, non-woven fabrics, or foam sheets comprise or non-polymeric materials.

245. The mold of any of embodiments 242 to 244, wherein the tow, woven fabrics, non-woven fabrics, or foam sheets comprise polymer materials.

246. The mold of any of embodiments 193 to 245, wherein the mold comprises one, two, three, four, or more layers of woven fabrics, non-woven fabrics, or foam sheets.

247. The mold of any of embodiments 193 to 246, wherein the polymeric material comprises one, two, three, or more of arylamides, arylamides, Polybenzimidazole (PBI), polyetherimide, polyetherketoneketone (PEKK), polyether ether ketone (PEEK), polyamide, polyimide, polyamide-imides, polyphenylene oxide (PPO), polystyrene (PS), polyphenylene oxide (PPO) and polystyrene (PS), polyphthalamide (PPA), polyvinyl alcohol (PVA), acrylonitrile butadiene styrene (ABS), polycarbonate (PC), polylactic acid (PLA), PC/ABS, polyphenylsulfone (PPSU), thermosets, PBI-PEEK, urea, epoxies, cyanate esters, polyurethanes, or a combination of any one or more, two or more, or three or more of the foregoing.

248. The mold of any of embodiments 193 to 247, wherein the laminate coating is a nanolaminate coating.

249. A method of molding an article comprising:
  introducing a settable material, a polymerizable material, a thermoplastic material, or a thermoset material into a mold having at least one section formed by a method according to any of embodiments 123 to 192 or a mold according to any of embodiments 193 to 248; and
  allowing the settable, polymerizable, thermoplastic, or thermoset material to at least partially cure or cool to form an article that can be separated from all or part of the mold.

250. The method of embodiment 249, wherein introducing the thermoplastic or thermoset material comprises one, two, or more of casting, injection molding, rotational molding, blow molding, or extrusion molding.

251. The method of any of embodiments 249 to 250, wherein the polymerizable material, the thermoplastic material, or the thermoset material is introduced into the mold to shape it.

252. The method of any of embodiments 249 to 251, wherein the thermoplastic material comprises, consists essentially of, or consists of Acrylonitrile-Butadiene-Styrene (ABS); Ethylvinylacetate (EVA), Low Density Polyethylene (LDPE), Linear Low Density Polyethylene (LLDPE), High Density Polyethylene (HDPE), Nylon (PA), Polycarbonate (PC), Polyethylene (PE), Polyethylene-Terephthalate (PET), Polypropylene (PP), Poly Vinyl Chloride (PVC), Polyvinylidenefluoride (PVDF), Polystyrene (GPPS), or a combination thereof.

253. The method of any of embodiments 249 to 252, wherein the thermoplastic material comprises one or more pigments, reinforcing fibers, or fillers.

254. The method of any of embodiments 249 to 253, wherein the thermoplastic material has a melting point less than the melting point or Vicat softening point of the polymeric material from which the workpiece is formed including any fillers or fibrous material that is present in the polymeric material; or
  the mold is operated at, or during molding operations continuously cooled to, a temperature less than the melting point or Vicat softening point of the polymeric material including any fillers or fibrous material in the polymeric material.

255. The method of any of embodiments 249 to 254, wherein the thermoplastic material has a melting point or Vicat softening point of 5 or more, 10 or more, 20 or more, 30 or more, 40 or more, or 50 or more degrees Centigrade less than the melting point or Vicat softening point of the polymeric material including any fillers or fibrous material that is present in the polymeric material.

256. The method of any of embodiments 249 to 255, wherein the thermoset material is introduced into the mold to shape it.

257. The method of any of embodiments 249 to 256, wherein the thermoset material comprises, consists essentially of, or consists of one, two, three or more of a polyester, vinylester, epoxy, phenolic or methyl methacylate, or combinations thereof, wherein the thermoset material optionally comprises one or more pigments, reinforcing fibers, and/or fillers.

258. The method of any of embodiments 249 to 257, wherein the thermoset material is cured or partially cured at a temperature less than the melting point or Vicat softening point of the polymeric material from which the workpiece is formed, the melting point or softening point being determined with any fillers or fibrous material that may be present in the workpiece.

259. The method of any of embodiments 249 to 258, wherein the thermoset material is cured or partially cured at a temperature that is 5 or more, 10 or more, 20 or more, 30 or more, 40 or more, or 50 or more degrees Centigrade less than the melting point or Vicat softening point of the polymeric material from which the workpiece is formed, the melting point or softening point being determined with any fillers or fibrous material that may be present in the workpiece.

260. The method of any of embodiments 249 or 251, wherein the polymerizable material is a photopolymerizable material, and the mold is operated at, or during molding operations is continuously cooled to, a temperature less than the melting point or Vicat softening point of the polymeric material from which the workpiece is formed including any fillers or fibrous material that is present in the polymeric material.

261. The method of embodiment 249, wherein the settable material comprises one or more of a clay (e.g., kalolin), concrete, plaster, powdered metal, powdered plastic, a pre-ceramic polymer, or a combination thereof.

262. The method of any of embodiments 249 to 261, wherein the settable, polymerizable, thermoplastic, or thermoset materials comprises from 0% to 50%, from 0% to 1%, from 1% to 5%, from 1% to 20%, from 1% to 50%, from 5% to 10%, from 5% to 25%, from 5% to 50%, from 10% to 20%, from 10% to 50%, from 20% to 30%, from 20% to 50%, from 30% to 40%, from 30% to 50%, or from 40% to 50% by weight of fiber reinforcement material based upon the weight of the fiber reinforcement and the settable, polymerizable, thermoplastic, or thermoset materials.

263. The method of embodiment 262, wherein the fiber reinforcement material comprises mineral, glass, and/or graphite fibers.

264. The method of embodiment 262 or 263, wherein the fiber reinforcement material comprises a polymeric material.

265. The method of any of embodiments 263 to 264, wherein the fibers are in the form of tow with a length less than 2 millimeters, less than 4 millimeters, less than 6 millimeters, less than 8 millimeters, less than 10 millimeters, less than 12 millimeters, less than 14 millimeters, less than 16 millimeters, less than 18 millimeters, or less than 20 millimeters.

266. The method any of embodiments 249 to 263, wherein the thermoplastic or the thermoset material is introduced into the mold to shape it.

267. The method of any of embodiments 249 to 266, wherein the allowing the material to at least partially cure or cool comprises leaving the mold at least partially closed for a time interval sufficient to shape the article.

268. The method embodiment 267, wherein the time interval is determined at least in part by monitoring the temperature of the thermoplastic or thermoset material or the temperature of the mold at one or more locations, and wherein the article substantially retains its shape upon removing the article from the mold.

269. The method of any of embodiments 249 to 268, further comprising cutting or trimming flash or a sprue from the article, or blast finishing.

270. The method of any of embodiments 249 to 269, wherein the method is an insert molding method in which one or more polymerizable materials, thermoset materials, or thermoplastic materials is molded (e.g., injection molded) around one or more inserts.

271. The method of embodiment 270, wherein the inserts are metal inserts, metal stampings, wire, mesh screens, woven or unwoven materials (e.g., fabric), or plastic materials or components.

The various embodiments described above can be combined to provide further embodiments. All of the U.S. patents, U.S. patent application publications, U.S. patent applications, foreign patents, foreign patent applications, and non-patent publications referred to in this specification and/or listed in the Application Data Sheet, including U.S. Patent Application No. 62/385,795, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for preparing a mold, the method comprising:
   forming a shaped polymeric workpiece including a polymeric workpiece and one or more thieves, one or more shields, or both, by an additive manufacturing process, the one or more thieves, the one or more shields, or both, being arranged in a manner that produces a substantially uniform current distribution over the shaped polymeric workpiece during electrodeposition, the shaped polymeric workpiece comprising one or more ports configured to allow for circulation of liquid or gas through a portion of the mold and a first surface including a first feature and a second feature that have a surface aspect ratio ranging from 1 to 10, the surface aspect ratio being defined as:

$$\left| \frac{\text{(height of the first feature)} - \text{(height of the second feature)}}{\text{distance between the first feature and the second feature}} \right|;$$

contacting the shaped polymeric workpiece with a bath including at least one electrodepositable metal; and
   applying a current to the shaped polymeric workpiece to electrodeposit a nanolaminated conductive coating on each surface of the shaped polymeric workpiece, the nanolaminated conductive coating comprising a plurality of alternating layers comprising first layers and second layers, the first layers comprising a first metal alloy comprising nickel and cobalt, the second layers comprising a second metal alloy comprising nickel and cobalt, the current being redistributed by the one or more thieves, the one or more shields, or both, thereby resulting in a substantially uniform current distribution over the first surface of the shaped polymeric workpiece so that the nanolaminated conductive coating covering all of the first surface has a substantially uniform thickness across the first surface including the first feature and the second feature.

2. The method of claim 1, wherein forming the shaped polymeric workpiece further comprises shaping the polymeric workpiece by one or more of cutting, machining, milling, abrasive blasting, grinding, sanding, and polishing, or a combination thereof.

3. The method of claim 1, wherein the additive manufacturing process comprises three-dimensional printing (3D printing), selective laser sintering (SLS) or sintering laser melting (SLM), fused deposition modeling (FDM), stereolithography (SLA), continuous liquid interface printing (CLIP), or a combination thereof.

4. The method of claim 1, wherein applying the current comprises applying potentiometric (potentiostatic), amperometric (galvanostatic), pulse current, pulse reverse current, modulated current, modulated frequency, or continuous transitioned current electroplating.

5. The method of claim 1, wherein the plurality of alternating layers further comprises third layers, wherein the first layers, the second layers, and the third layers are arranged in a repeating pattern.

6. The method of claim 5, wherein the plurality of alternating layers further comprises fourth layers, wherein the first layers, the second layers, the third layers, and the fourth layers are arranged in a repeating pattern.

7. The method of claim 1, wherein the first metal alloy further comprises Ag, Al, Au, Be, Cr, Cu, Fe, Hg, In, Mg, Mn, Mo, Nb, Nd, Pd, Pt, Re, Rh, Sb, Sn, Mn, Pb, Ta, Ti, W, V, Zn, Zr, or a combination thereof.

8. The method of claim 1, wherein the nanolaminated conductive coating comprises at least 20 layers.

9. The method of claim 1, wherein the shaped polymeric workpiece further comprises one or more tubes for increasing electrolyte flow over one or more portions of the shaped polymeric workpiece.

10. A mold, comprising:
a shaped workpiece comprising an assembly of a substrate of a polymeric material and one or more thieves, one or more shields, or both, on the substrate, the one or more thieves, the one or more shields, or both, being arranged in a manner according to a Computer Assisted Design-optimized geometry that results in a substantially uniform current distribution over the shaped workpiece during electrodeposition, wherein the shaped workpiece comprises one or more ports configured to allow for circulation of liquid or gas through a portion of the mold; and
a nanolaminated conductive coating on each surface of the shaped workpiece, the nanolaminated conductive coating comprising a plurality of alternating layers comprising first layers and second layers, the first layers comprising a first metal alloy comprising nickel and cobalt, the second layers comprising a second metal alloy comprising nickel and cobalt, the nanolaminated conductive coating covering all of a first surface and having a substantially uniform thickness across the first surface, wherein the first surface comprises a first feature and a second feature that have a surface aspect ratio ranging from 1 to 10, the surface aspect ratio being defined as:

$$\left| \frac{\text{(height of the first feature)} - \text{(height of the second feature)}}{\text{distance between the first feature and the second feature}} \right|.$$

11. The mold of claim 10, wherein the polymeric material comprises one or more nonconductive particles, nonconductive filler, nonconductive tow, nonconductive woven fabrics, nonconductive non-woven fabric, nonconductive foam sheets, or a combination thereof.

12. The mold of claim 10, wherein the polymeric material has a melting, softening, or decomposition point greater than 150° C.

13. The mold of claim 10, wherein the polymeric material further comprises a fiber reinforcement material.

14. The mold of claim 10, wherein the first and second layers differ in grain size, defect density, grain orientation, presence of intermetallic compositions, presence of amorphous metallic glass compositions, or a combination thereof.

15. The mold of claim 10, wherein the first metal alloy or the second metal alloy is a fine-grained or ultrafine-grained metal alloy having an average grain size ranging from about 1 nm to about 5,000 nm, based on a measurement of grain size in micrographs.

16. A method of molding an article, comprising:
introducing a settable material, a polymerizable material, a thermoplastic material, or a thermoset material into a mold according to claim 10, the mold having at least one section; and
allowing the settable, polymerizable, thermoplastic, or thermoset material to at least partially cure or cool to form an article that can be separated from the mold.

17. The method of claim 16, wherein introducing the thermoplastic or thermoset material comprises casting, injection molding, rotational molding, blow molding, or extrusion molding.

18. The method of claim 16, further comprising cutting or trimming flash or a sprue from the article, or blast finishing.

19. The method of claim 16, wherein the thermoplastic material has a melting point less than the melting point or Vicat softening point of the polymeric material from which the shaped workpiece is formed including any fillers or fibrous material that are present in the polymeric material; or
the mold is operated at, or during molding operations continuously cooled to, a temperature less than the melting point or Vicat softening point of the polymeric material including any fillers or fibrous material in the polymeric material.

20. The mold of claim 10, wherein the plurality of alternating layers further comprises third layers, wherein the first layers, the second layers, and the third layers are arranged in a repeating pattern.

21. The mold of claim 20, wherein the plurality of alternating layers further comprises fourth layers, wherein the first layers, the second layers, the third layers, and the fourth layers are arranged in a repeating pattern.

22. The mold of claim 10, wherein the first metal alloy further comprises Ag, Al, Au, Be, Cr, Cu, Fe, Hg, In, Mg, Mn, Mo, Nb, Nd, Pd, Pt, Re, Rh, Sb, Sn, Mn, Pb, Ta, Ti, W, V, Zn, Zr, or a combination thereof.

23. The mold of claim 10, wherein the one or more ports are one or more channels that extend from one surface of the mold to another surface of the mold or one or more channels in a single surface of the mold.

* * * * *